(12) United States Patent
Dasgupta et al.

(10) Patent No.: US 10,634,653 B2
(45) Date of Patent: Apr. 28, 2020

(54) SYSTEMS, METHODS AND DEVICES FOR WIDTH-BASED ANALYSIS OF PEAK TRACES

(71) Applicants: Board of Regents, The University of Texas System, Austin, TX (US); DIONEX CORPORATION, Sunnyvale, CA (US)

(72) Inventors: Purnendu K. Dasgupta, Arlington, TX (US); Akinde F. Kadjo, Grand Prairie, TX (US); Kannan Srinivasan, Tracy, CA (US)

(73) Assignees: Dionex Corporation, Sunnyvale, CA (US); Board of Regents, The University of Texas System, Austin, TX (US)

( * ) Notice: Subject to any disclaimer, the term of this patent is extended or adjusted under 35 U.S.C. 154(b) by 323 days.

(21) Appl. No.: 15/824,962

(22) Filed: Nov. 28, 2017

(65) Prior Publication Data

US 2018/0149629 A1    May 31, 2018

Related U.S. Application Data

(60) Provisional application No. 62/427,119, filed on Nov. 28, 2016.

(51) Int. Cl.
*G01N 30/00* (2006.01)
*G01N 30/86* (2006.01)
(Continued)

(52) U.S. Cl.
CPC ....... *G01N 30/8637* (2013.01); *B01D 15/161* (2013.01); *B01D 15/163* (2013.01);
(Continued)

(58) Field of Classification Search
CPC .... G01N 30/8637; G01N 30/02; G01N 30/16; G01N 30/30; B01D 15/161; B01D 15/163
See application file for complete search history.

(56) References Cited

U.S. PATENT DOCUMENTS 4,468,742 A * 8/1984 Jenden ............... G01N 30/8617
702/23
5,121,443 A   6/1992 Tomlinson
(Continued)

FOREIGN PATENT DOCUMENTS

CN    103063751 A    4/2013
WO    2016051357 A1  4/2016

OTHER PUBLICATIONS

J.Ruzicka, A New Protentiometric Gas Sensor—The Air-Gap Electrode, Analytica Chimica Acta. 69 , 1974, pp. 129-141.
(Continued)

*Primary Examiner* — Jamel E Williams
(74) *Attorney, Agent, or Firm* — Haverstock & Owens LLP

(57) ABSTRACT

Systems, methods and devices are taught for providing analytical methods for peak-shaped responses separated in time or space, including quantitation of chromatographic peaks based on a width measurement of a peak trace at a selected height as a quantitation element. Methods of treating a peak trace as a composition of exponential functions representing a leading and a trailing end are included. Methods that facilitate the detection of impurities in peak trace outputs are also included.

43 Claims, 25 Drawing Sheets

(51) Int. Cl.
*B01D 15/16* (2006.01)
*G01N 30/02* (2006.01)
*G01N 30/16* (2006.01)
*G01N 30/30* (2006.01)

(52) U.S. Cl.
CPC ............ *G01N 30/02* (2013.01); *G01N 30/16* (2013.01); *G01N 30/30* (2013.01); *G01N 30/86* (2013.01); *G01N 2030/025* (2013.01); *G01N 2030/027* (2013.01)

(56) References Cited

U.S. PATENT DOCUMENTS

| | | | |
|---|---|---|---|
| 9,347,921 B2* | 5/2016 | Probst | G01N 30/8693 |
| 9,453,825 B2 | 9/2016 | Mito | |
| 2008/0206883 A1 | 8/2008 | Black | |
| 2011/0054804 A1* | 3/2011 | Pfaff | G01N 30/72 702/25 |
| 2011/0149050 A1* | 6/2011 | Imada | H04N 13/111 348/51 |
| 2012/0089344 A1 | 4/2012 | Wright | |
| 2014/0149050 A1 | 5/2014 | Yanagisawa | |
| 2016/0084807 A1* | 3/2016 | Srinivasan | G01N 30/8668 73/1.02 |
| 2018/0099249 A1* | 4/2018 | Kronewitter | B01D 59/44 |
| 2018/0113101 A1* | 4/2018 | Mao | G01N 30/8617 |

OTHER PUBLICATIONS

"Physical Methods in Biochemistry: General", N.I.H. grants No. 5 P01-HE-12157; No. P07 RR00679 and RO1 HL15552, p. 1439.
J. Ruzicka, "Flow Injection Analysis", Analytica Chimica Act.92 (1977), 235-249.
Harry L. Pardue, "Kinetic Treatment of Unsegmented Flow Systems", Analytica Chimica Acta, 124 (1981), pp. 39-63, Elsevier Scientific Publishing Company, Amsterdam Printed in the Netherlands.
A.U. Ramsing, "The Principles and Theory of High-Speed Titrations by Flow Injection Analysis", Anlytica Chimica Acta, 129, (1981) 1-7.
Kent K. Stewart, "Time-Based Flow Injection Analysis", Analytica Chimica Acta 179 (1986) 59-68.
Jae-Seong Rhee et al., "Studies on Peak Width Measurement-Based FIA Acid-Base Determinations", Mikrochimica Acta 1985, 49-64.
Jae-Seong Rhee et al.,"Determination of Acids, Bases, Metal Ions and Redox Species by Peak Width Measurement Flow Injection Analysis With Potentiometric, Conductometric, Fluotometric and Spectrophotometric Detection", Mikrochimica Acta 1985, 107-122.
Stephen R. Bysouth et al."A Microcomputer-Based Peasl Width Method of Extended Calibration for Flow-Injection Atomic Absorption Spectrometry", Analytica Chimica 179 (1986) 481-486, Elsevier Science Publishers B.V. Amsterdam.
Mary K. Carroll, "An Experiment Using Time-Based Detection in Flow Injection Analysis", Journal of Chemical Education, A-210-A-216.
Pumendu K. Dasgupta et al., "A Simple and Veratile Photodetector System for Peak Width Measurement-Based Flow Injection Analysis", vol. 2, No. 10, Spectroscopy 39-43.
Pumendu K. Dasgupta et al., Versatile Instrument for Pulse Width Measurement, Anal Chem 1985, 58, pp. 507-509.
International Search Report and Written Opinion from International Application No. PCT/US17/63536 dated Feb. 13, 2018.

* cited by examiner

SYSTEMS, METHODS AND DEVICES FOR WIDTH-BASED ANALYSIS OF PEAK TRACES

CROSS-REFERENCE TO RELATED APPLICATIONS

This application claims priority under 35 U.S.C. § 119(e) of the U.S. Provisional Patent Application Ser. No. 62/427,119, filed Nov. 28, 2016 and titled, "SYSTEMS, METHODS AND DEVICES FOR WIDTH-BASED ANALYSIS OF PEAK TRACES," which is also hereby incorporated by reference in its entirety for all purposes.

STATEMENT REGARDING FEDERALLY SPONSORED RESEARCH

This invention was made with government support by the U.S. National Science Foundation (NSF CHE-1506572). The government has certain rights in the invention.

TECHNICAL FIELD OF THE INVENTION

This disclosure relates generally to analytical chemistry. More specifically, this disclosure pertains to all analytical techniques that produce peak-shaped responses separated in time or space, for example flow injection analysis, capillary or microchip electrophoresis and especially chromatography techniques. The science of chromatography techniques addresses the separation and analysis of chemical components in mixtures. This disclosure relates to techniques for the quantitation of chromatographic peaks based on a width measurement of a peak trace, and assays of purity of a putatively pure separated band, or detection of impurities therein.

BACKGROUND

Over the last half century, the acquisition of a chromatogram has evolved from fraction collection, offline measurement and manual recording of discrete values, to a chart recorder providing a continuous analog trace, to digital acquisition of the detector response. Present chromatographic hardware/software systems allow fast facile quantitation using either area or height based approaches. As long as one is in a domain where the detector response is linearly proportional to the analyte (i.e., the substance to be separated during chromatography) concentration in the detection cell, the peak trace area is a true representation of the amount of the analyte passing through the detector.

Area and height based quantitation are validated chromatography methods—highly reliable, but often over a limited range. Typical practice involves a single standard linear regression equation covering multiple concentrations/amounts for quantitation. It is well known that while linear regression minimizes absolute errors, the relative error, often of greater importance, becomes very large at low analyte concentrations. Weighted linear regression provides a solution to this, but it is notably absent from popular chromatographic data handling software. Height is often regarded as more accurate than area, especially if peaks are not well resolved in the chromatogram. Height is less affected by asymmetry and overlap, and provides less quantitation error for peaks with limited overlap. In a survey of chromatographers, area was preferred over height for better accuracy and precision. However, poor resolution or significant peak asymmetry (the two are related: high asymmetry increases the probability of overlap) induces greater error in area-based quantitation. Both area and height are affected by detector non-linearity, and detector saturation leads to clipped peaks.

General height and area based approaches to quantitation have not changed since the inception of quantitative chromatography.

SUMMARY OF THE INVENTION

In an aspect, a method of chromatographic quantitation of an analyte comprises flowing the analyte at least at a first concentration, a second concentration, and then a third concentration into a chromatographic column; detecting the analyte at the first concentration, the second concentration, and the third concentration coming out from the chromatographic column by using a chromatographic detector; obtaining a first, second, and third signal curves from the chromatographic detector, the first, second, and third signal curves being a representation of the analyte at the first, second, and third concentrations, respectively, detected by the chromatographic detector; measuring a width of a peak in each of the first, second, and third signal curves at a plurality of peak heights; calculating a plurality of calibration equations based on the first, second, third concentrations and the measured peak widths for each of the plurality of peak heights; and identifying one of the plurality of peak heights that provides the calibration equation having a lowest error.

In some embodiments, the width is determined by using a width-based quantitation algorithm comprising: $W_h = p(\ln \bar{h})^q$, wherein $W_h$ is the width at absolute height h of the peak, $\bar{h}$ is $h_{max}/h$, $h_{max}$ is the peak amplitude of the peak, and p and q are constants. In other embodiments, the method further comprises flowing a sample into the chromatographic column, the sample including the analyte; detecting the analyte of the sample coming out from the chromatographic column by using the chromatographic detector; obtaining a signal curve of the sample from the chromatographic detector, detected by the chromatographic detector; measuring a width of a peak in the signal curve of the sample at the identified peak height; and determining a concentration of the analyte of the sample using the calculated calibration equation with the identified peak height, the calculated calibration equation having a form of: $\ln C = aW_h^n + b$, wherein $W_h$ is the width at absolute height h of the peak, wherein C is a concentration of the analyte, and further wherein n, a, and b are constants. In some other embodiments, the method further comprises a suppressor coupled with the chromatographic column for receiving an output from the chromatographic column, wherein the suppressor is coupled with the chromatographic detector, such that an output from the suppressor is detected by the chromatographic detector.

In another aspect, a method of detecting an impurity in chromatography comprises flowing an analyte of a sample through a chromatographic column; detecting a concentration of the analyte coming out from the chromatographic column by using a chromatographic detector; obtaining a first signal curve from the chromatographic detector, the first signal curve being a representation of the concentration of the analyte detected by the chromatographic detector; measuring a first peak width $W_{h1}$ at a first absolute peak height $h_1$, a second peak width $W_{h2}$ at a second absolute peak height $h_2$, and a third peak width $W_{h3}$ at a third absolute peak height $h_3$ of a peak in the first signal curve, wherein the first absolute peak height $h_1$, the second absolute peak height $h_2$, and the third absolute peak height $h_3$ are different; determining a peak shape index ratio of the sample of the peak in the first signal curve with a formula comprising $\ln(W_{h1}/W_{h2})/\ln(W_{h2}/W_{h3})$; and identifying a presence of the impurity in the sample where the determined peak shape index ratio of the peak in the first signal curve differs from a peak shape index ratio of a standard sample.

In some other embodiments, the method further comprises flowing the analyte of the standard sample through the chromatographic column; detecting a concentration of the analyte of the standard sample coming out from the chromatographic column by using the chromatographic detector; obtaining a second signal curve from the chromatographic detector, the second signal curve being a representation of the concentration of the analyte of the standard sample detected by the chromatographic detector; measuring the first peak width $W_{h1}$ at the first absolute peak height $h_1$, the second peak width $W_{h2}$ at the second absolute peak height $h_2$, and the third peak width $W_{h3}$ at the third absolute peak height $h_3$ of a peak in the second signal curve, wherein the first absolute peak height $h_1$, the second absolute peak height $h_2$, and the third absolute peak height $h_3$ are different; and determining the peak shape index ratio of the standard sample of the peak in the second signal curve with the formula.

In some embodiments, the method further comprises repeating the steps above on multiple injections of the standard sample; calculating a confidence range of the peak shape index ratio at a confidence level above 90% for the standard sample; and identifying the presence of the impurity in the sample where the determined peak shape index ratio of the sample is outside of the calculated confidence range.

In other embodiments, the peak of the standard sample and the analyte peak of the sample under test have a same maximum peak height. In some other embodiments, the method comprises a suppressor coupled with the chromatographic column for receiving an output from the chromatographic column, wherein the suppressor is coupled with the chromatographic detector, such that an output from the suppressor is detected by the chromatographic detector.

In another aspect, a method of detecting an impurity in chromatography comprises flowing an analyte of a sample through a chromatographic column; detecting a concentration of the analyte coming out from the chromatographic column by using a chromatographic detector; obtaining a first signal curve from the chromatographic detector, the first signal curve being a representation of the concentration of the analyte detected by the chromatographic detector; measuring a first peak width $W_{h1}$ at a first absolute peak height $h_1$, a second peak width $W_{h2}$ at a second absolute peak height $h_2$, a third peak width $W_{h3}$ at a third absolute peak height $h_3$, and a fourth peak width $W_{h4}$ at a fourth absolute peak height $h_4$ of a peak in the first signal curve, wherein the first absolute peak height $h_1$, the second absolute peak height $h_2$, the third absolute peak height $h_3$, and the fourth absolute peak height $h_4$ are different; determining a peak shape index ratio of the sample of the peak in the first signal curve with a formula comprising: $\ln(W_{h1}/W_{h2})/\ln(W_{h3}/W_{h4})$; and identifying a presence of the impurity in the sample where the determined peak shape index ratio of the peak in the first signal curve differs from a peak shape index ratio of a standard sample.

In some embodiments, the method further comprises flowing the analyte of the standard sample through the chromatographic column; detecting a concentration of the analyte of the standard sample coming out from the chromatographic column by using the chromatographic detector; obtaining a second signal curve from the chromatographic detector, the second signal curve being a representation of the concentration of the analyte of the standard sample detected by the chromatographic detector; measuring the first peak width $W_{h1}$ at the first absolute peak height $h_1$, the second peak width $W_{h2}$ at the second absolute peak height $h_2$, the third peak width $W_{h3}$ at the third absolute peak height $h_3$, and the fourth peak width $W_{h4}$ at the fourth absolute peak height $h_4$ of a peak in the second signal curve, wherein the first absolute peak height $h_1$, the second absolute peak height $h_2$, the third absolute peak height $h_3$, and the fourth absolute peak height $h_4$ are different; and determining a peak shape index ratio of the peak in the second signal curve with the formula.

In other embodiments, the method further comprises repeating the steps above on multiple injections of the standard sample; calculating a confidence range of the peak shape index ratio at a confidence level above 90% for the standard sample; and identifying the presence of the impurity in the sample where the determined peak shape index ratio of the sample is outside of the calculated confidence range.

In some other embodiments, the peak of the standard sample and the analyte peak of the sample under test have a same maximum peak height. In some embodiments, the method further comprises a suppressor coupled with the chromatographic column for receiving an output from the chromatographic column, wherein the suppressor is coupled with the chromatographic detector, such that an output from the suppressor is detected by the chromatographic detector.

In another aspect, a method of chromatographic quantitation of an analyte comprises flowing a first concentration of the analyte into a chromatographic column; detecting the analyte coming out from the chromatographic column by using a chromatographic detector; obtaining a first signal curve from the chromatographic detector, the first signal curve being a representation of the first concentration of the analyte detected by the chromatographic detector; determining a first width of a first peak in the first signal curve at a first absolute height of the first peak using a computing device; and quantifying the first concentration of the analyte based on the first determined width of the first peak.

In some embodiments, the method further comprises setting the first absolute height to a value between 8 to 12 times a baseline noise level. In other embodiments, the first absolute height is approximately 60% of a maximum height of the first peak of the analyte. In some other embodiments, the method further comprises flowing the analyte at a second concentration into the chromatographic column; detecting the analyte coming out from the chromatographic column by using the chromatographic detector; obtaining a second signal curve from the chromatographic detector, in which the second signal curve also being a representation of the second concentration of the analyte detected by the chromatographic detector; determining a first maximum height of the first peak of the analyte in the first signal curve and a second maximum height of the second peak of the analyte in the second signal curve using the computing device; and setting the first, the second, or both absolute heights of the analyte to a value greater an 8 times a baseline noise level and less than a smallest of the first or second maximum height; and determining a width at the first or the second absolute height.

In some embodiments, the method further comprises determining best fit values of p and q in a formula $W_h = p(\ln h)^q$, wherein $W_h$ is the first width at the first absolute height h of the first peak, $\bar{h}$ is $h_{max}/h$, $h_{max}$ is the peak amplitude, and p and q are constants, which are computed from data of the first peak of the first concentration. In other embodiments, the first absolute height for the first determined width is the smaller of 55%-65% of the height of a peak maximum for the first peak and 55%-65% of the height of a peak maximum for the second peak. In other embodiments, the first signal curve represents a non-Gaussian peak. In some other embodiments, the non-Gaussian peak is modeled by two separate Generalized Gaussian distribution (GGD) functions. In some embodiments, the two separate Generalized Gaussian distribution (GGD) functions have a concentration in a linear relationship with the peak amplitude $h_{max}$ represented by a formula: $\ln C = aW_h^n + b$, wherein C is a concentration of the analyte detected, and further wherein n, a, and b are constants. In other embodiments, the determining the first width of the first peak comprises using independent exponential functions representing leading and trailing edges in the signal curve to model a peak. In some other embodiments, the determining multiple widths of the first peak in the first signal curve at multiple heights of the first peak. In some other embodiments, the determining the first width of the peak is performed below a peak height accommodated by the first signal curve of the lowest analyte concentration of interest. In some embodiments, the determining the first width of the peak is performed at a peak height 60%-90% of a first maximum height of the peak of a lowest analyte concentration. In some embodiments, the first peak is clipped.

In some embodiments, the method further comprises a suppressor coupled with the chromatographic column for receiving an output from the chromatographic column, wherein the suppressor is coupled with the chromatographic detector, such that an output from the suppressor is detected by the chromatographic detector.

In another aspect, a method of chromatographic quantitation of an analyte comprises flowing the analyte into a chromatographic column; detecting the analyte coming out from the chromatographic column by using a chromatographic detector; obtaining a signal curve from the chromatographic detector, the signal curve with a peak being a representation of the analyte detected by the chromatographic detector; fitting a height of the peak of the signal curve to an equation, the equation comprising:

$$h = \begin{cases} h_{max,1} * e^{-\frac{|t|^m}{a}}, & t \leq 0 \\ h_{max,2} * e^{-\frac{t^n}{b}}, & t \geq 0 \end{cases}$$

wherein a top equation, describing a left half of the peak applies only at $t \leq 0$ while a bottom equation, describing a right half of the peak applies only at $t \geq 0$; h is the height of the peak; a maximum height of the peak appears at the intersection point of the above two equations; $h_{max,1}$ is a maximum point in the top equation, while $h_{max,2}$ is the maximum point of the bottom equation, m, n, a, and b are constants; determining a width of the peak in the signal curve at a first height h of the peak using a width equation, wherein the width equation comprising:

$W_h = (a \ln(\bar{h}_1))^{1/m} + (b \ln \bar{h}_2)^{1/n}$ where $W_h$ is the width of the peak at the height h; $\bar{h}_1 = h_{max,1}/h$; $\bar{h}_2 = h_{max,2}/h$; and quantifying a concentration of the analyte based on the determined width of the peak.

In some embodiments, the constants m, n, a and b are used to define a shape criterion for the peak. In other embodiments, the shape criterion is used for the identification of a peak. In some other embodiments, the method further comprises determining a purity of the peak by taking 5% to 95% of the peak maximum to fit the pair of equations above.

In other embodiments, the method further comprises determining an amount of impurity by deducting a maximum area that is fitted by using the pair of equations above from an area of the peak of the analyte detected. In some other embodiments, the two separate Gaussian distribution (GGD) functions have a relationship with the peak width and a concentration of the analyte represented by a formula: $\ln C = aW_h^n + b$, wherein C is a concentration of the analyte detected, and further wherein n, a and b are constants. In some other embodiments, the peak is quantitated on the basis of either of the two separate Gaussian distribution (GGD) functions, such that the concentration of the analyte is related by either a left half-width $W_{h,l}$ or a right half-width $W_{h,r}$ of the peak at any absolute height h; $W_{h,l}$ and $W_{h,r}$ are defined as the respective shortest distances from a perpendicular drawn from the peak apex to the baseline and the left or the right half of the signal curve at the absolute height h, represented by a formula: $\ln C = a' W_{h,l}^{n'} + b'$ or $\ln C = a'' W_{h,r}^{n''} + b''$ wherein C is a concentration of the analyte detected, and further wherein n', n'', a', a'', b' and b'' are constants.

In some other embodiments, the method further comprises a suppressor coupled with the chromatographic column for receiving an output from the chromatographic column, wherein the suppressor is coupled with the chromatographic detector, such that an output from the suppressor is detected by the chromatographic detector.

In another aspect, a system for chromatographic peak quantitation comprises a chromatographic column; a chromatographic detector configured to detect an amount of analyte from the chromatographic column; a signal converter converting the amount of an analyte detected to a signal curve; and an algorithm implemented computing device configured to determine a width of a peak in the signal curve in at least one selected height of the peak and quantify the amount of the analyte.

In some embodiments, the algorithm is $W_h = p(\ln \bar{h})^q$, wherein $W_h$ is the width at the height (h) of the peak, ($\bar{h}$) is $h_{max}/h$, $h_{max}$ is the peak amplitude, wherein p and q are constants. In other embodiments, a goodness of fit to the algorithm $W_h = p(\ln \bar{h})^q$ is used as an indication of the purity of the peak. In some other embodiments, a maximum area that can be fit by $W_h = p(\ln \bar{h})^q$ and which is completely contained in the peak is the portion of the analyte. In some embodiments, determining the width of a peak comprises determining the width of the peak in the signal curve at multiple heights of the peak. In other embodiments, the system further comprises a suppressor coupled with the chromatographic column for receiving an output from the chromatographic column, wherein the suppressor is coupled with the chromatographic detector, such that an output from the suppressor is detected by the chromatographic detector.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

DETAILED DESCRIPTION

Figure 1A:
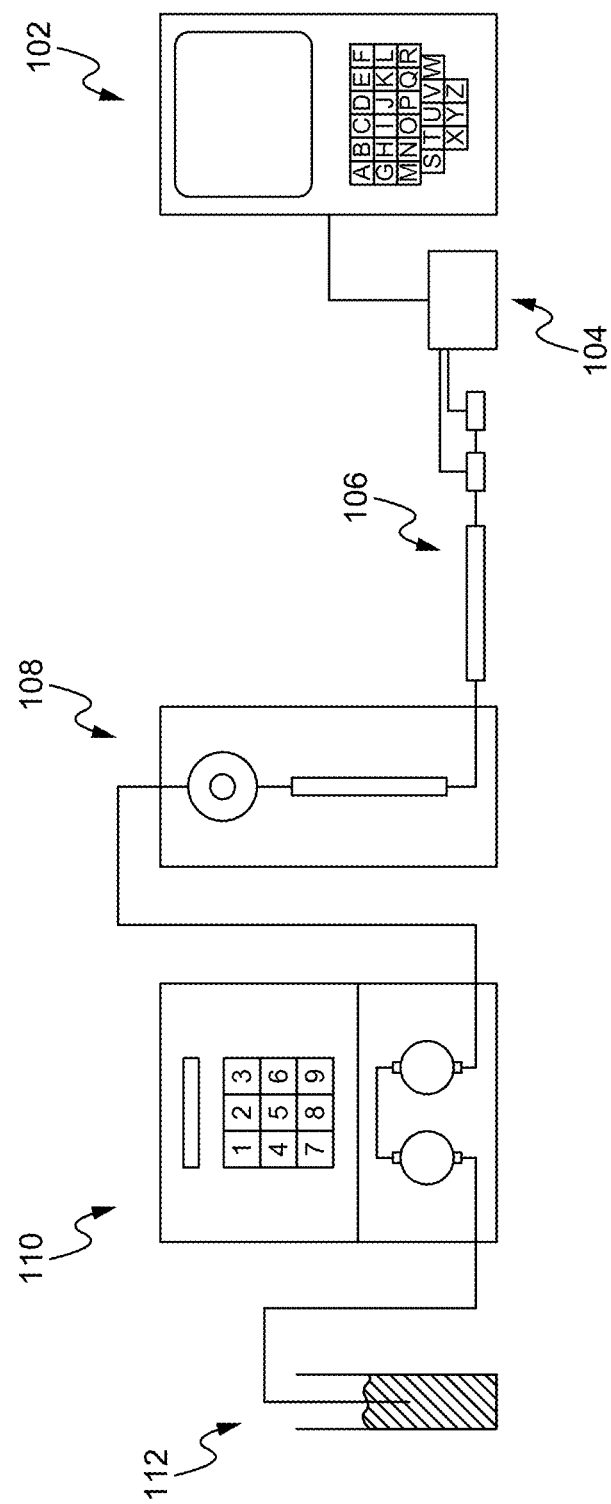
FIG. 1A illustrates chromatographic system in accordance with some embodiments.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Although quantitative chromatography is now many decades old, the width of a peak has not been used for quantitation. This disclosure is applicable to situations where height or area-based quantitation is simply not possible. Width as a function of height describes the shape of a peak; if two halves are considered independently it also describes its symmetry. Embodiments disclosed herein provide a new way to describe peak shapes and symmetry.

Considerations of width as a function of the normalized height provides a way to detect the presence of impurities, not possible with height or area-based quantitation. Unlike height or area-based quantitation, which has a single calibration equation, width based quantitation ("WBQ") can provide a near-infinite number of calibration equations. Spectrum reconstruction of a truncated peak due to detector saturation is possible through width considerations. While this can also be done by other means, the width based approach may readily provide clues to the presence of an impurity.

Embodiments of this disclosure entail WBQ techniques. In many cases WBQ can offer superior overall performance (lower root mean square error over the entire calibration range compared to area or height based linear regression method), rivaling $1/x^2$—weighted linear regression. A WBQ quantitation model is presented based on modeling a chromatographic peak as two different independent exponential functions which respectively represent the leading and trailing halves of the peak. Unlike previous models that use a single function for the entire peak, the disclosed approach not only allows excellent fits to actual chromatographic peaks, it makes possible simple and explicit expressions for the width of a peak at any height. WBQ is applicable to many situations where height or area based quantitation is simply inapplicable.

The disclosed WBQ embodiments present a general model that provides good fits to both Gaussian and non-Gaussian peaks without having to provide for additional dispersion and allows ready formulation of the width at any height. In quantitation implementations, peak width is measured at some fixed height (not at some fixed fraction of the peak maximum, such as asymmetry that is often measured at 5% or 10% of the peak maximum).

This disclosure relates generally to methods of analyzing data obtained from instrumental analysis techniques used in analytical chemistry and, in particular, to methods (and related systems and devices) of automatically identifying peaks in liquid chromatograms, gas chromatograms, mass chromatograms, flow-injection analysis results (fiagrams), electropherograms, image-processed thin-layer chromatograms, or optical or other spectra. To aid in understanding the embodiments of this disclosure, some general information regarding chromatography techniques is in order.

FIG. 1A depicts a chromatographic system 100 in accordance with some embodiments. In some embodiments, the system 100 comprises a controlling and computing device 102, a detecting unit 104, a suppressor unit 106, a separation unit 108 (e.g., chromatographic column), a delivery unit 110 (e.g., pump), and a solvent providing unit 112 (e.g., an eluent providing system or container).

In some embodiments, the controlling and computing device 102 contains a processor and memory. In some embodiments, the device 102 is implemented with executable computing instructions for performing a predetermined specific functions. In some embodiments, the executable computing instructions are compiled or structured as a computer software, which configures the processor and the electron storing structures to store and locate voltages for performing a predetermined functions according to the loaded algorithm (e.g., the peak width determining algorithm disclosed herein). In some embodiments, the controlling and computing device 102 controls/commands the performance of the system 100.

In some embodiments, the detecting unit 104 comprises a chromatography detector, including destructive and non-destructive detectors. In some embodiments, the destructive detectors comprise a charged aerosol detector (CAD), a flame ionization detector (FID), an aerosol-based detector (NQA), a flame photometric detector (FPD), an atomic-emission detector (AED), a nitrogen phosphorus detector (NPD), an evaporative light scattering detector (ELSD), a mass spectrometer (MS), an electrolytic conductivity detector (ELCD), a sumon detector (SMSD), a Mira detector (MD). In some embodiments, the non-destructive detectors comprise UV detectors, fixed or variable wavelength, which includes diode array detector (DAD or PDA), a thermal conductivity detector (TCD), a fluorescence detector, an electron capture detector (ECD), a conductivity monitor, a photoionization detector (PID), a refractive index detector (RI or RID), a radio flow detector, a chiral detector continuously measures the optical angle of rotation of the effluent.

In some embodiments, the separation unit 108 comprises a chromatographic column. The chromatographic column is able to be liquid chromatographic column, gas chromatographic column, and ion-exchange chromatographic column. A person of ordinary skill in the art will appreciate that any other chromatographic column is within the scope of the present disclosure, so long as the chromatographic column is able to be used to separate one analyte from another.

Figure 1B:
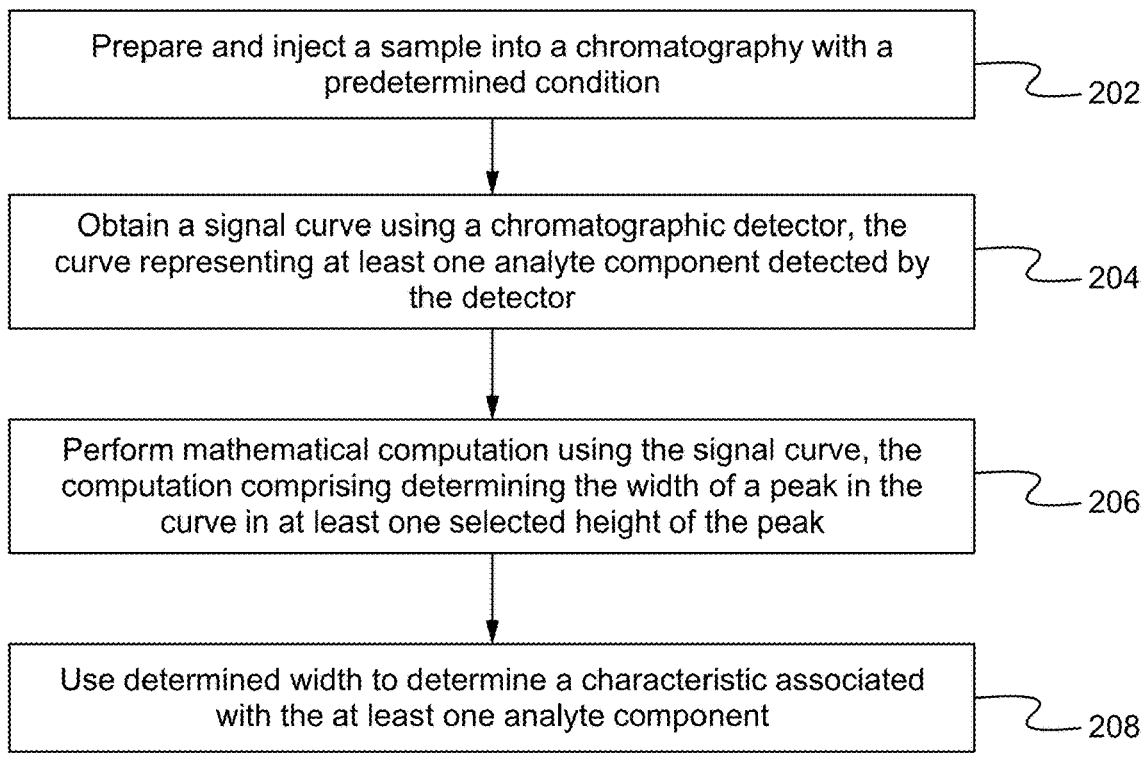
FIG. 1B illustrates a flow chart of a width based single signal curve analyte quantitation method in accordance with some embodiments.

FIG. 1B illustrates a flow chart of a width based single signal curve analyte quantitation method 200 in accordance with some embodiments. At Step 202, a sample is prepared and injected into a chromatography (e.g., ion-exchange chromatography) with a predetermined condition (e.g., 65° C. at a flow rate of 0.5 mL/min.) At Step 204, a signal curve is obtained using a chromatographic detector, the curve being a representation of at least one analyte component detected by the detector. At Step 206, a mathematical computation is performed using the signal curve via the computing device described above with one or more implemented algorithms disclosed herein, wherein the computation comprises determining the width of a peak in the curve in at least one selected height of the peak. At Step 208, the determined width is used to determine a characteristic associated with the at least one analyte component.

Figure 1C:
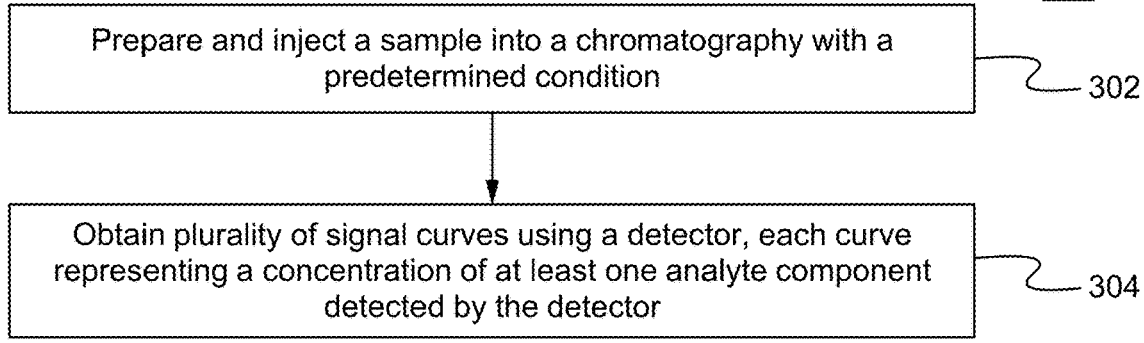
FIG. 1C illustrates a flow chart of a plurality signal curves determining (peak trace analysis) method 300 in accordance with some embodiments.
Figure 1C:
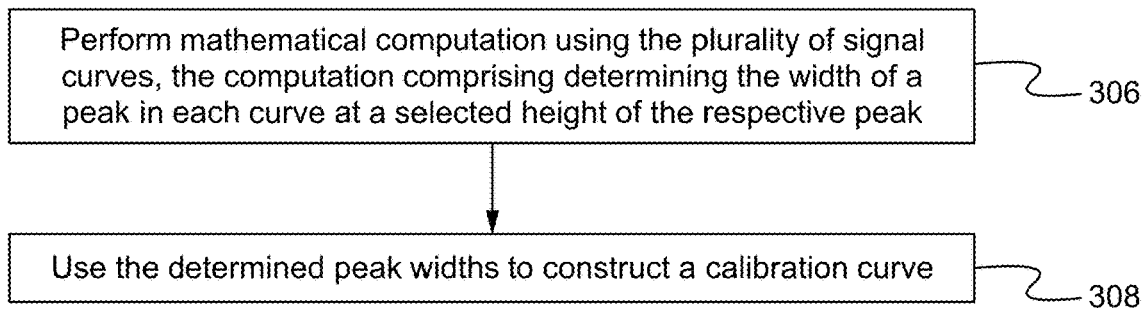

FIG. 1C illustrates a flow chart of a plurality of signal curves determining (peak trace analysis) method 300 in accordance with some embodiments. At Step 302, a sample is prepared and injected into a chromatography with a predetermined condition. At Step 304, a plurality of signal curves are obtained using a detector, each curve being a representation of a concentration of at least one analyte component detected by the detector. At Step 306, a mathematical computation is performed using the plurality of signal curves, wherein the computation comprises determining the width of a peak in each curve at a selected height of the respective peak. At Step 308, the determined peak widths are used to produce at least one calibration curve.

Figure 1D:
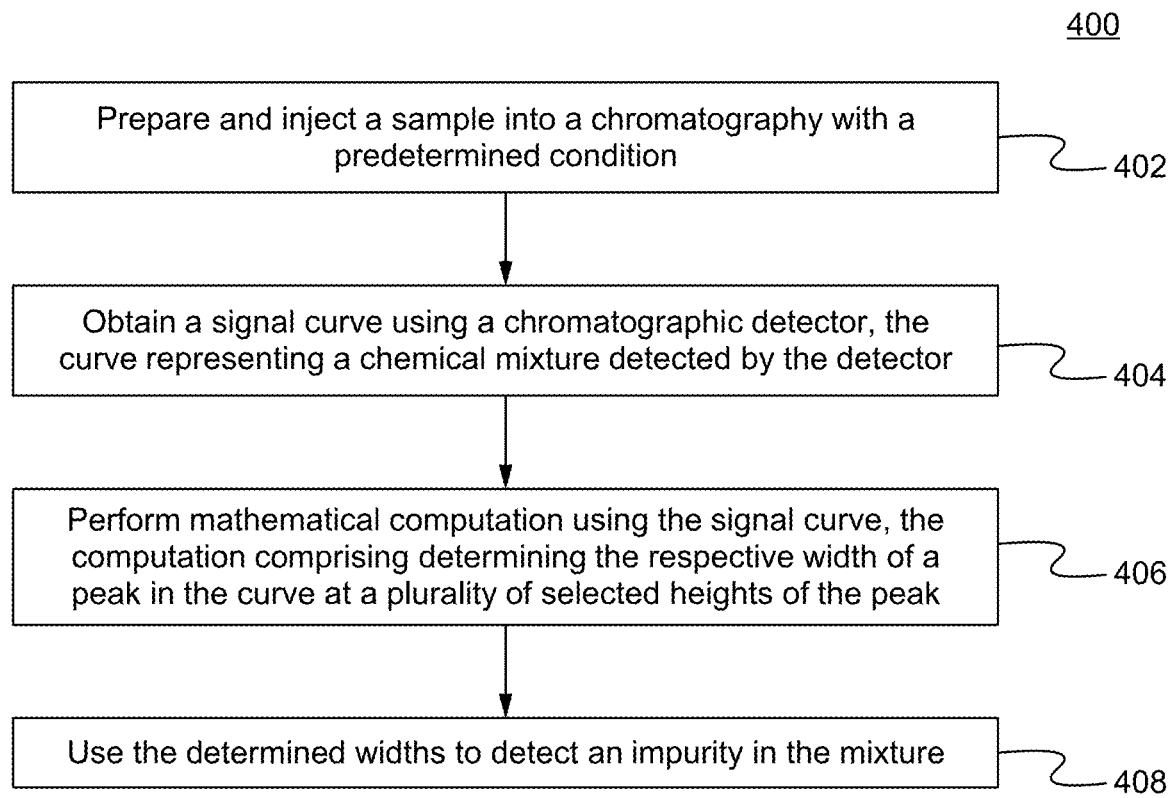
FIG. 1D illustrates a flow chart of an impurity detecting method in accordance with some embodiments.

FIG. 1D illustrates a flow chart of an impurity detecting method 400 in accordance with some embodiments. At Step 402, a sample is prepared and injected into a chromatography with a predetermined condition. At Step 404, a signal curve is obtained using a chromatographic detector, the curve being a representation of a chemical mixture detected by the detector. At Step 406, a mathematical computation is performed using the signal curve, wherein the computation comprises determining the respective width of a peak in the curve at a plurality of selected heights of the peak. At Step 408, the determined widths are used to detect an impurity in the mixture.

Figure 1E:
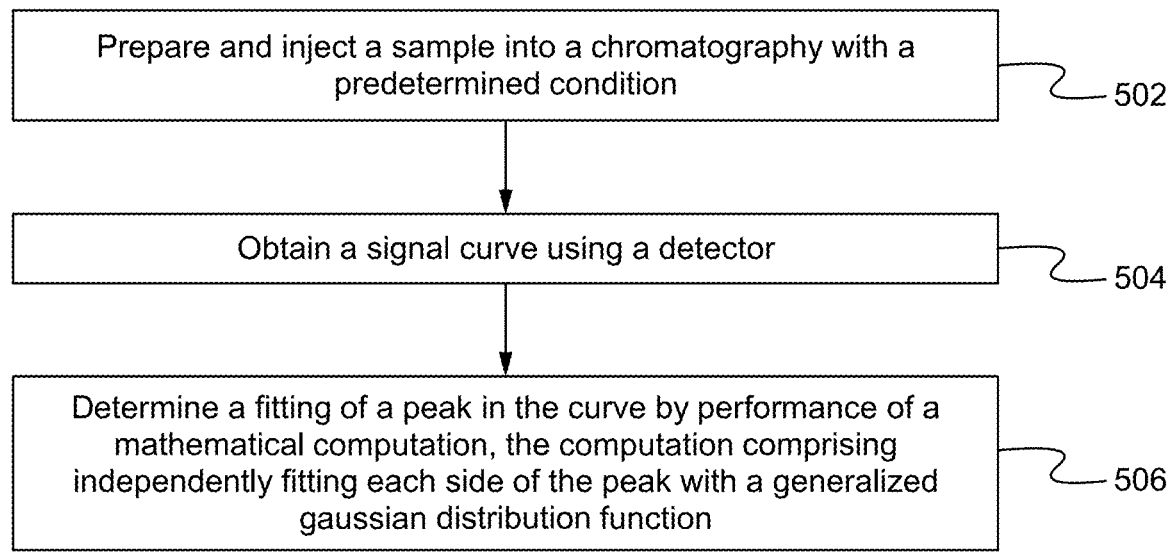
FIG. 1E illustrates a peak trace analyzing method in accordance with some embodiments.

FIG. 1E illustrates a peak trace analyzing method 500 in accordance with some embodiments. At Step 502, a sample is prepared and injected into a chromatography with a predetermined condition. At Step 504, a signal curve is obtained using a detector. At Step 506, a fitting of a peak in the signal curve is determined by performing a mathematical computation, wherein the computation comprises independently fitting each side of the peak with a generalized Gaussian distribution function.

Figure 1F:
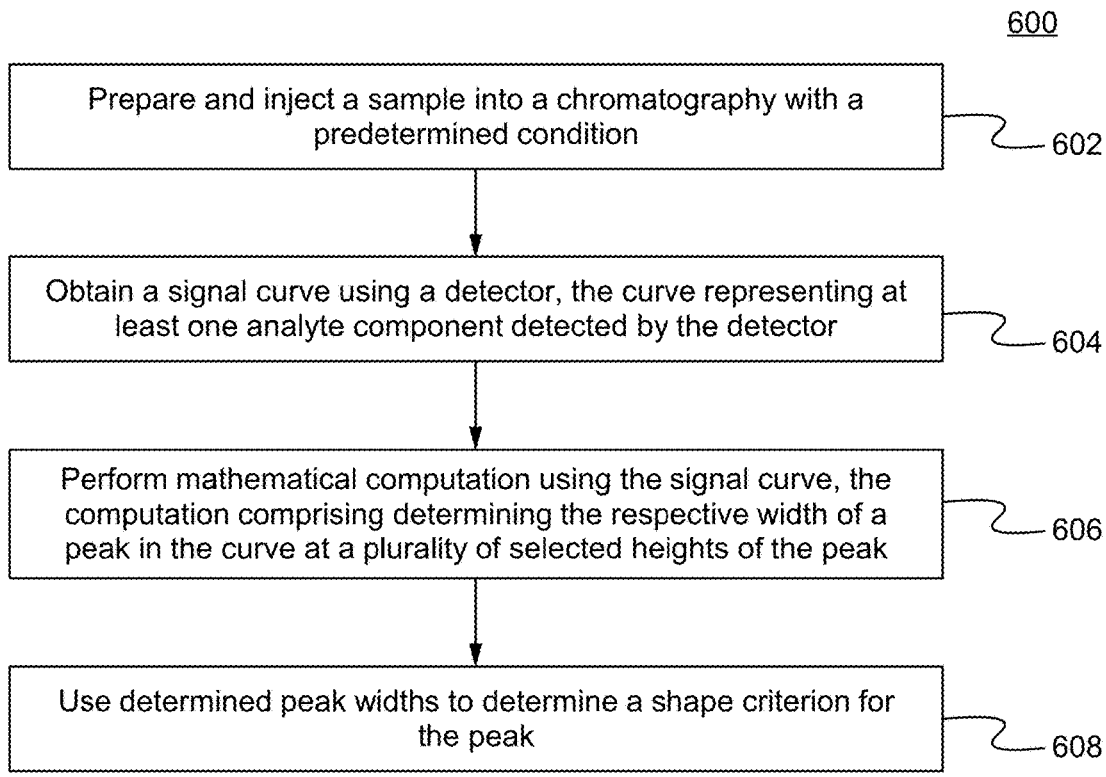
FIG. 1F illustrates a peak trace analyzing method in accordance with some embodiments.

FIG. 1F illustrates a peak trace analyzing method 600 in accordance with some embodiments. At Step 602, a sample is prepared and injected into a chromatography with a predetermined condition. At Step 604, a signal curve is obtained using a detector, the curve being a representation of at least one analyte component detected by the detector. At Step 606, a mathematical computation is performed using the signal curve, wherein the computation comprises determining the widths of a peak in the curve at a plurality of selected heights of the peak. At Step 608, the determined peak widths are used to determine a shape criterion for the peak. The computations are performed via the techniques disclosed herein.

Figure 1G:
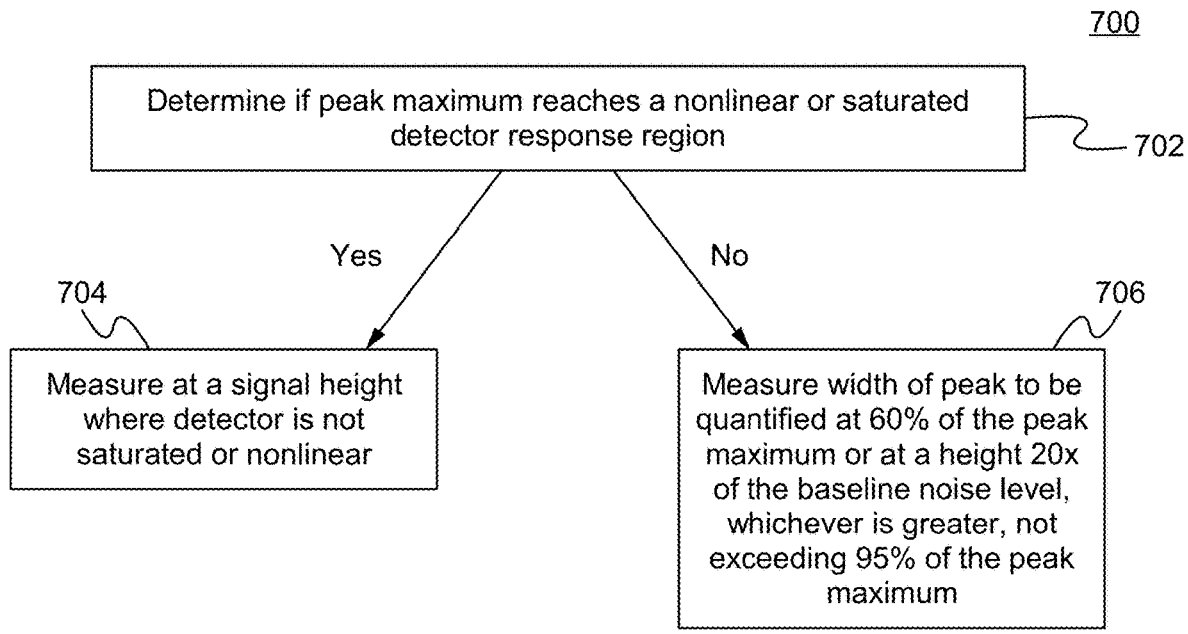
FIG. 1G illustrates a width-based analyte peak quantitation method in accordance with some embodiments.

FIG. 1G illustrates a width-based analyte peak quantitation method 700 in accordance with some embodiments. At a Step 702, it is determined if the peak maximum reaches a nonlinear or saturated detector response region. At the Step 702, the process goes to Step 704 if it is determined that the peak maximum reaches a nonlinear or saturated detector response region, and the process goes to Step 706 if it is determined that the peak maximum does not reach a nonlinear or saturated detector response region. At the Step 704, the width is measured at a signal height, where the detector is not saturated or nonlinear. In some embodiments, the height is chosen as high as possible in the permissible range. In other embodiments, the height is chosen at a height where calibration has already been computed. In some other embodiments, the height is chosen where the width of the unknown peak is measured. Next, a calibration curve is constructed at that height from stored calibration peaks. Next, the calibration curve is used to interpret the concentration of the unknown. At the Step 706, the width of the peak is measured at the greater of 60% of the peak maximum or at a height 20× the baseline noise level but not exceeding 95% of the peak maximum. Next, a calibration curve is constructed at that height from stored calibration peaks. Next, the calibration curve is used to interpret the concentration of the unknown. Alternatively, a height is chosen for quantitation for which a calibration already exists as long as it is not below 5% of the peak height or 20× the baseline noise level.

As described herein, the disclosed Width-Based Quantitation (hereinafter "WBQ") measuring methods and devices are applicable to both Gaussian and non-Gaussian peaks of one or more analytes from a chromatography device, with the merit that the resulting RMS errors are comparable to those using height or area-based quantitation using weighted regression. Advances in memory storage and computing speed have made it practical to store not just height or area but the entire details of analyte peaks for use in calibration. For an unknown, it becomes practical not only to determine its height and area but also to refer either to the stored width-based calibration nearest to the optimum height (or to generate a calibration equation for the optimum height ($1/\bar{h}=0.6$) from the stored data. Embodiments of the disclosed WBQ method, process, and system may also be used as a complement to conventional techniques: quantitation can be height-based at the low-end, width-based at the high end (where detector saturation/nonlinearity may set in) and area-based at intermediate concentrations.

WBQ provides notable advantages, including: (a) lower overall RMS error without weighting compared to unweighted area or height based quantitation, (b) applicability over a large range of concentrations, (c) accurate quantitation when (i) the detector response is in the nonlinear response range, (ii) the detector response is saturated at the high end, and (iii) the detector response is not a single valued function of concentration, and (d) detection of co-eluting impurities, none of which situations can be handled by area or height-based quantitation.

Gaussian Peaks.

Chromatographic peaks ideally are Gaussian and many in reality closely follow a Gaussian shape, which is the expected norm for a partition model. The relationship between the width at any particular height and the concentration of a Gaussian peak are first explored. For simplicity, it is assumed that the Gaussian peak is centered at t=0. The Gaussian distribution expression then takes the simple form:

$$h = h_{max} * e^{-\frac{t^2}{2*s^2}} \qquad (1)$$

Where s is the standard deviation (SD) and $h_{max}$ is the amplitude of the perfectly Gaussian peak.

In order to calculate the width $W_h$ at any particular height h, the two corresponding t values are ($\bar{h}$ having been previously defined as $h_{max}/h$):

$$t = \pm s\sqrt{2\ln\bar{h}} \qquad (2)$$

The width is then the difference between these two t values:

$$W_h = 2s\sqrt{2\ln\bar{h}} \qquad (3)$$

Thus, an expression of $\ln h_{max}$ becomes:

$$\ln h_{max} = \left(\frac{1}{8s^2}\right) * W_h^2 + \ln h \qquad (4)$$

In some embodiments, the height h at which width is being measured is low enough to be in the linear response domain of the detector/analyte/column system. The ascending peak has no foreknowledge of whether the peak maximum will remain within the linear response domain, or in the extreme case, become completely clipped. Similarly, when descending through h on the trailing edge it has no memory if the actual maximum value registered was within the linear domain or well beyond it. Consequently, $h_{max}$ computed from Equation (4) is the height that would have been registered if the analyte peak remained within the linear domain, regardless of whether it actually was or not. $h_{max}$ is therefore linearly related to the concentration C, providing a more general form of Equation (4):

$$\ln C = aW_h^2 + b \quad (5)$$

or $$W_h = k(\ln C)^{1/2} + g. \quad (6)$$

Non-Gaussian Peaks.

Non-Gaussian peaks (tailing or fronting or peaks that do both) have been modeled as exponentially modified Gaussian (EMG) or polynomial modified Gaussian (PMG) peaks. The width at a particular height for a specific EMG function is easily numerically computed.

For all real non-Gaussian peaks, practicing chromatographers are aware that the peak is not just non-Gaussian, it is inevitably asymmetric: the trailing edge of the peak is obviously different from the leading edge. Yet the focus has been on modeling the entire peak with a single function. This disclosure considers that there are advantages to model the peak as a separate function on each side, specifically generalized Gaussian distribution functions. The most general situation is a floating delimitation between two distributions:

$$h = \begin{cases} h_{max} * e^{-\frac{|t|^v}{\alpha}}, & t < q \\ h_{max} * e^{-\frac{|t|^u}{\beta}}, & t \geq q \end{cases} \quad (7)$$

This includes the possibility of the peak apex not being the dividing point between the two functions.

However, essentially all real peaks fit very well with delimitation at the apex (t=0). In the rare case that a departure is observed, this occurs very close to the peak apex, this particular region is of low value for WBQ. The general situation of the delimitation occurring at t=0 may be given as:

$$h = \begin{cases} h_{max} * e^{-\frac{|t|^m}{a}}, & t < 0 \\ h_{max} * e^{-\frac{t^n}{b}}, & t \geq 0 \end{cases} \quad (8)$$

where the top equation pertains to one half of the peak and the bottom to the other:

$$W_h = (a \ln(\bar{h}))^{1/m} + (b \ln \bar{h})^{1/n}. \quad (9)$$

There are limitations on the ranges of parameters in Equations (7)-(9) that can be easily imposed. A consideration of peak shapes of the exponential functions in Equations (7)-(8) will indicate that for real chromatographic peaks the values of m and n would usually lie between 1 and 2, the reciprocals 1/m and 1/n therefore lie between 1 and 0.5.

The parenthetical term (h) in the expression in Equation (9) can be readily expressed reciprocally as $\bar{h}^{-1}$, which has obvious bounds of 0 and 1, more typically between 0.05 and 0.95, meaning width is to be measured between the bounds of 5% and 95% of $h_{max}$ with the only modification of a negative sign before the logarithmic terms. With these constraints, it is readily shown numerically (see the following mathematical calculations) that the sum expression in Equation (9) above can always be expressed by a single similar term $p(\ln \bar{h})^q$ as in Equation (10) below, with ≤1% root-mean-square error (RMSE), at least within the domain $\bar{h}$ of 1.05-20 (h being 5-95% of peak maximum).

$$W_h = p(\ln \bar{h})^q \quad (10)$$

Calculations for Equations (9)-(10).

Let $$x = \ln\left(\frac{h_{max}}{h}\right)$$

and approximate the summation $W_h = 0.33x + 0.5x^{0.5}$. The typical range of $$\frac{h_{max}}{h}$$

is 1.05 to 20 by the choice of height value which needs to be above the noise level but stay below peak value for stability. We set: $f(x) = 0.33x + 0.5x^{0.5}, x \in [\ln(1.05), \ln(20)]$, and consider our objective function $S^*(x) = cx^r, x \in [\ln(1.05), \ln(20)], c \in [0,1], r \in [0,1]$.

We seek to minimize the error function:

$$\min \|f(x) - S^*(x)\|_2^2 = \min_{\substack{c \in [0,1] \\ r \in [0,1]}} \|0.33x + 0.5x^{0.5} - cx^r\|_2^2 =$$

$$\min_{\substack{c \in [0,1] \\ r \in [0,1]}} \int_{\ln(1.05)}^{\ln(20)} (0.33x + 0.5x^{0.5} - cx^r)^2 dx.$$

Figure 2:
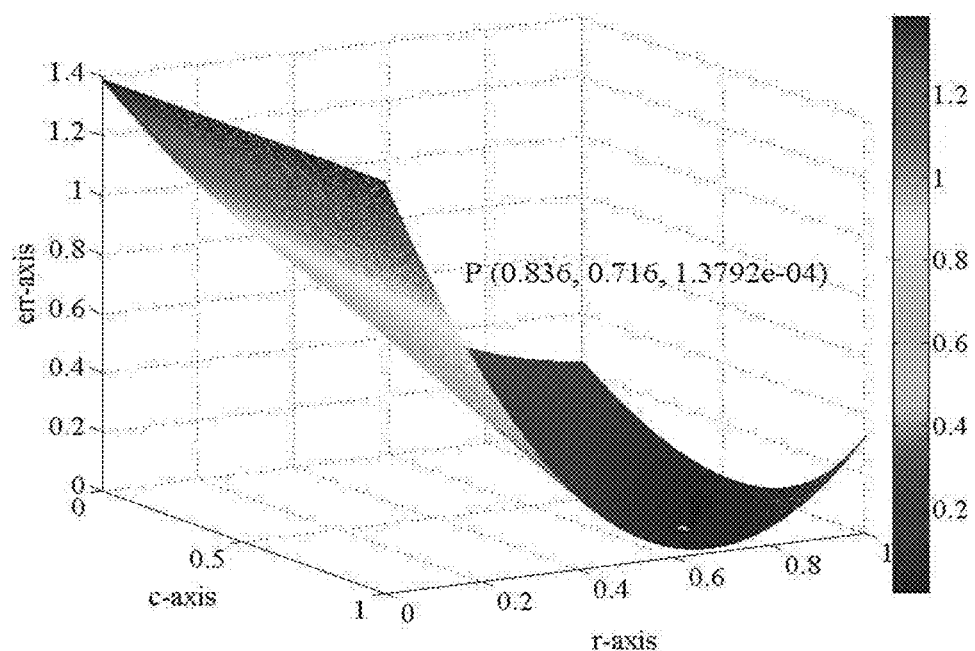
FIG. 2 illustrates a plot of an error function in accordance with some embodiments.

As we can verify, the L2-norm error function is convex in parameter space (c, r). Thus, the problem has a unique global minimum point. FIG. 2 illustrates a plot of L2 error function in the parameter space (c, r) for the region [0,1]×[0,1] in accordance with some embodiments. In the region $\{(c,r) \in [0,1]\times[0,1]\}$, we compute the error function as depicted in FIG. 2. We find the best fit (the least value of error function) at c=0.836 and r=0.716, e.g., there is a point P (0.836, 0.716) in FIG. 2 shown by a dot, with minimum error at:

$$\min\|f(x) - S^*(x)\|_2^2 = \int_{\ln(1.05)}^{\ln(20)} (0.33x + 0.5x^{0.5} - 0.836x^{0.716})^2 dx \approx 0.00013792.$$

The relative error is:

Relative L2 Error =

$$\frac{\|f(x) - S^*(x)\|_2}{\|f(x)\|_2} = \frac{\sqrt{\int_{\ln(1.05)}^{\ln(20)} (0.33x + 0.5x^{0.5} - 0.836x^{0.716})^2 dx}}{\sqrt{\int_{\ln(1.05)}^{\ln(20)} (0.33x + 0.5x^{0.5})^2 dx}} \approx 0.98\%.$$

To numerically approximate the RMSE and the relative root-mean-square error (Relative RMSE), we divide the interval [ln(1.05),ln(20)] equally into 100 partition points $\{x_i, i=1, 2, \ldots 100\}$. Let $$F(x) = (f(x_i)), \overline{S}^*(x) = (S^*(x_i)), i = 1, 2, \ldots, 100,$$

$$RMSE = \frac{\sqrt{\sum_{1}^{100}(f(x_i) - S^*(x_i))^2}}{10} = 0.0119;$$

$$\text{Relative } RMSE = \frac{\sqrt{\sum_{1}^{100}(f(x_i) - S^*(x_i))^2}}{\sqrt{\sum_{1}^{100}(f(x_i))^2}} = 1.00\%.$$

We assign some randomly chosen values to the variables in Equation (8) above for illustrative purposes; for instance:

$$h = \begin{cases} h_{max} * e^{-\frac{(-t)^2}{0.5}}, & t < 0 \\ h_{max} * e^{-\frac{t}{0.33}}, & t \geq 0 \end{cases} \quad (11)$$

Figure 3:
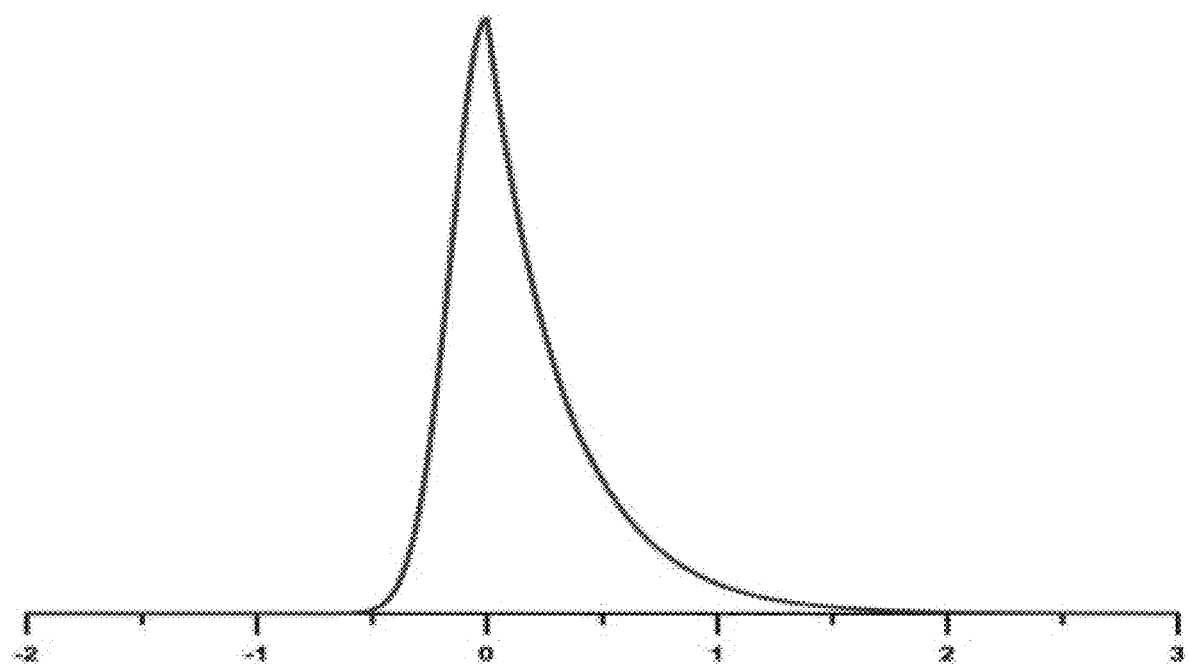
FIG. 3 illustrates a plot of a Non-Gaussian peak generated by different functions in accordance with some embodiments.

The peak resulting from these two functions is illustrated in FIG. 3 in accordance with some embodiments.

Figure 4A:
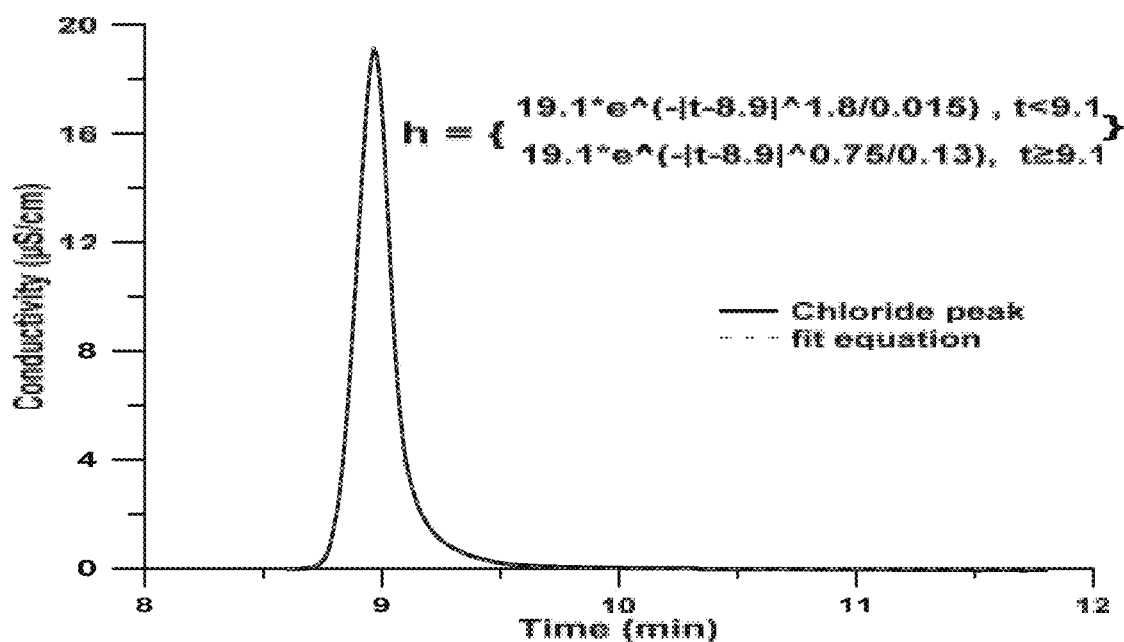
FIGS. 4A-4G illustrate some real chromatographic peaks of separated chemical components as well as fits computed by functions disclosed herein in accordance with some embodiments.
Figure 4B:
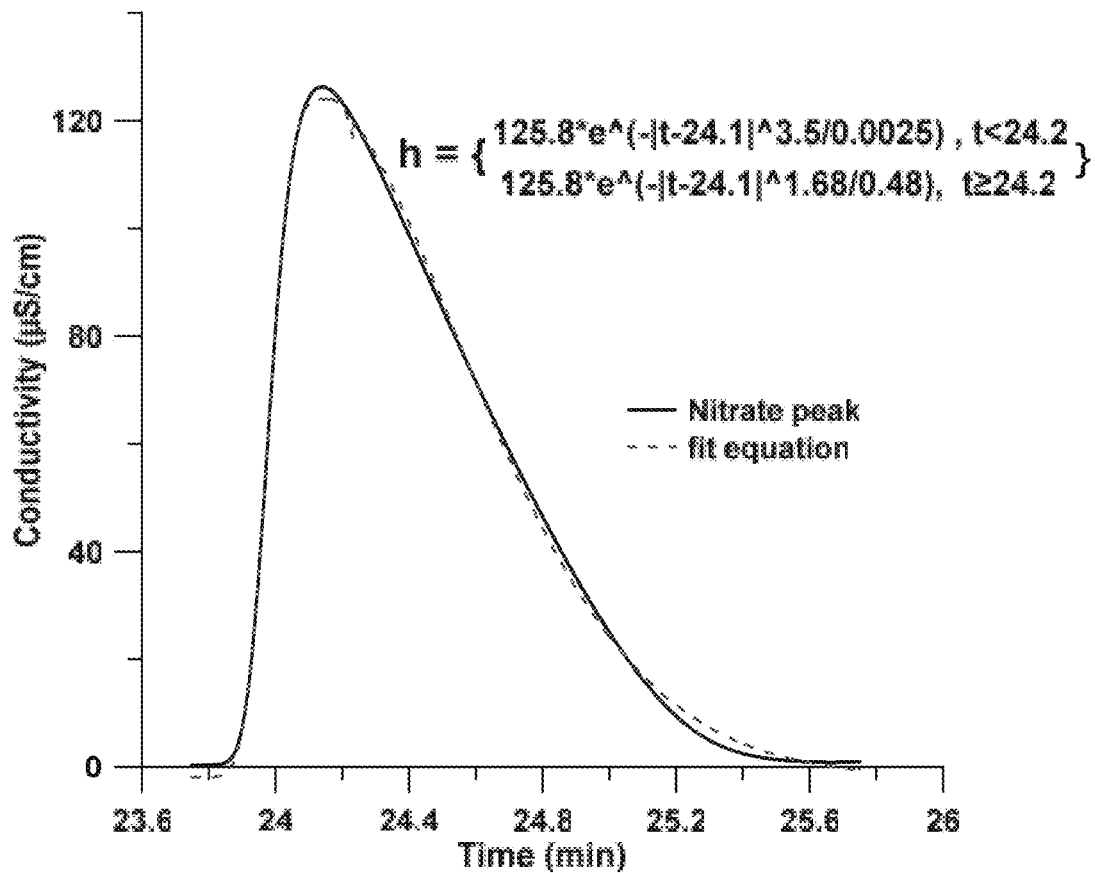
Figure 4C:
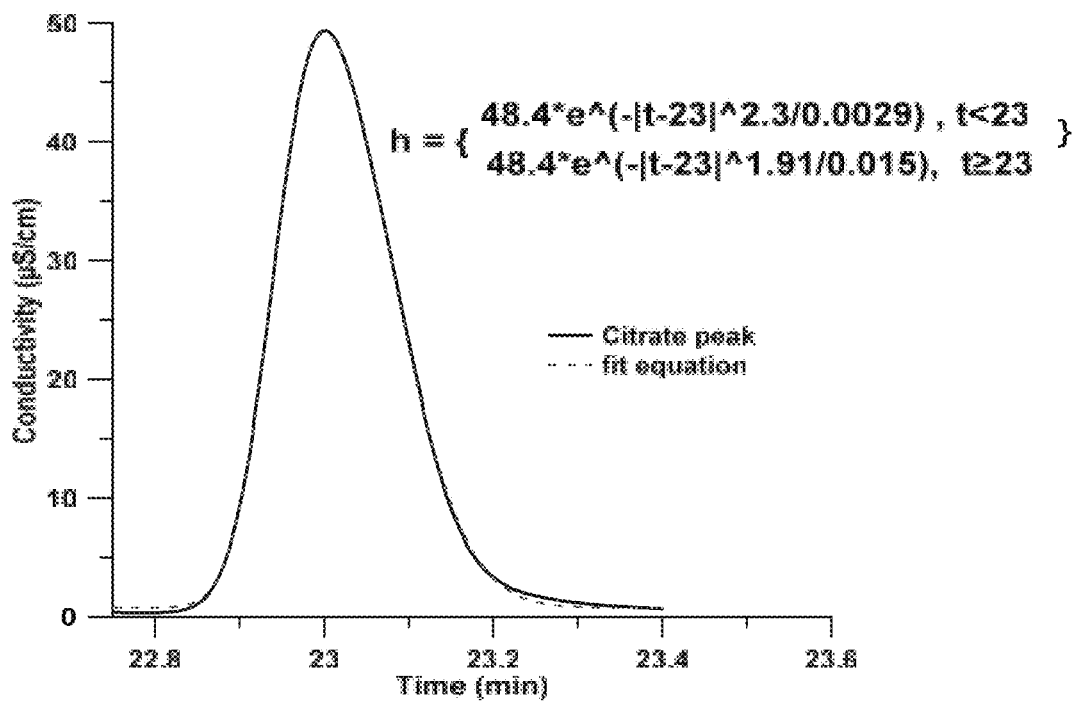
Figure 11:
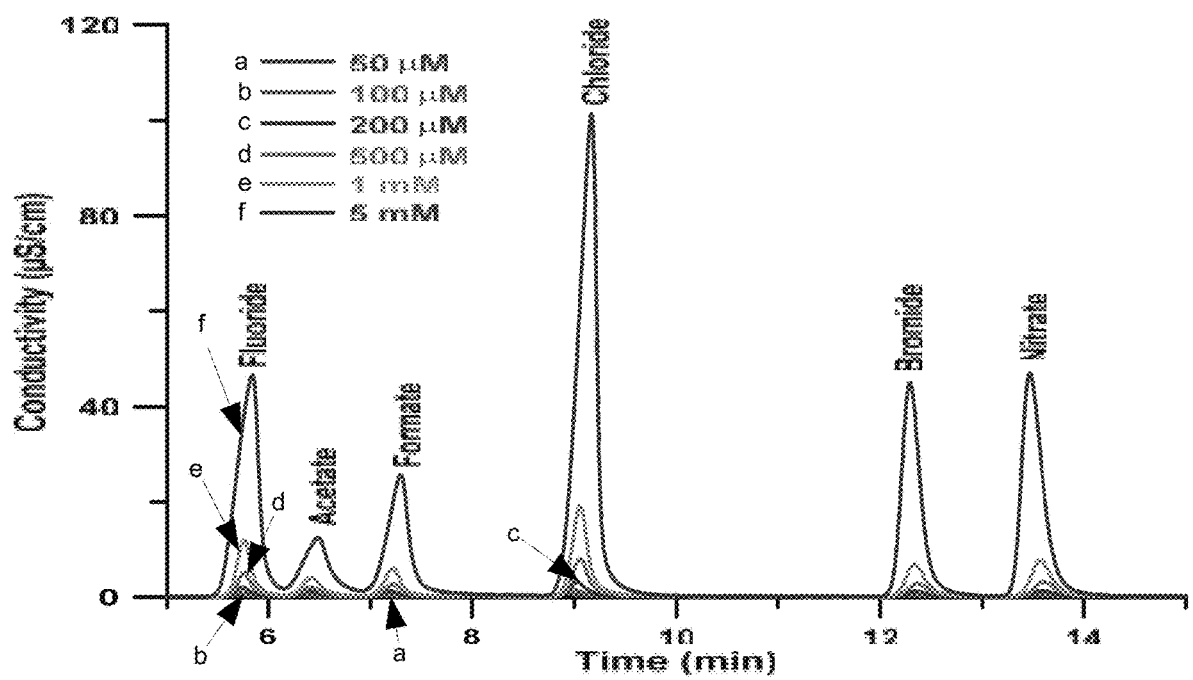
FIG. 11 illustrates peak signal curve responses of certain chemical components produced in accordance with some embodiments.

Fits to similar equations for a number of illustrative real peaks are illustrated in FIGS. 4A-4G in accordance with some embodiments. FIG. 4A illustrates the fit of the 1 mM chloride to Equation (9) analog. FIG. 4B illustrates the fit of the 6 mM nitrate to Equation (9) analog. The chromatographic conditions for the chloride fit are illustrated in FIG. 11 and in FIG. 12 for the nitrate fit. From 1%-99% of peak height, RMSE as a percentage of $h_{max}$: Chloride: 0.66% ($r^2$ 0.9996), Nitrate: 1.2% ($r^2$ 0.9987). FIG. 4C illustrates the fit of experimental 5 mM citrate peak to Equation (9) analog. The chromatographic conditions being as illustrated in FIG. 11, the RMSE as a percentage of $h_{max}$: 0.55% ($r^2$ 0.9998).

Figure 4D:
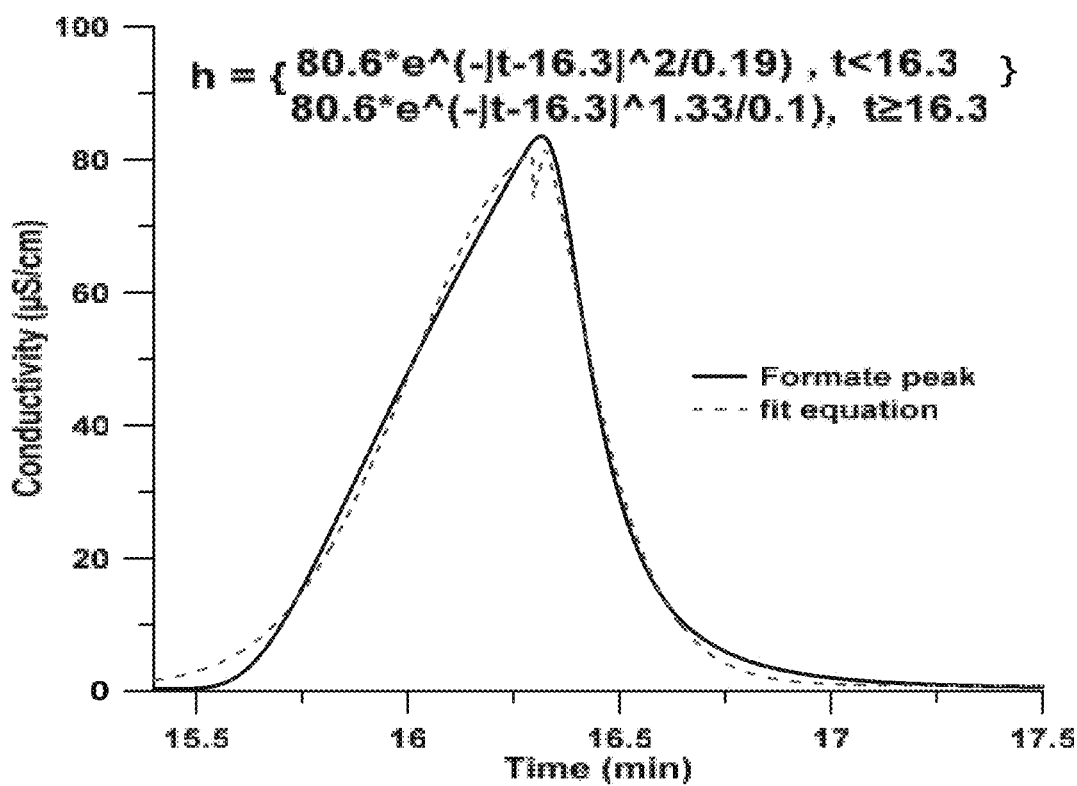
Figure 4E:
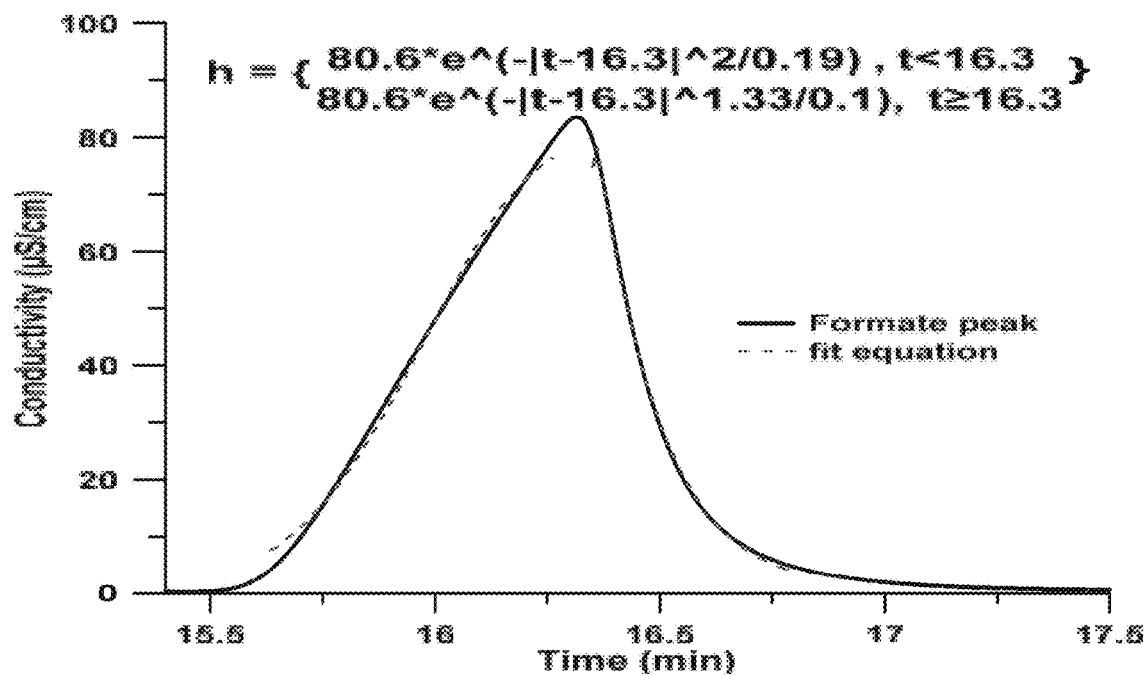

FIGS. 4D and 4E illustrate the Equation (9) analog fits for 6 mM formate. FIG. 4D has the best fit using the data for the entire peak. This fit is obviously poorer at the low and especially high h extremes compared to FIGS. 4A-4C. Considering that neither extreme of height will typically be used for WBQ, it makes more sense to fit the curve excluding the extremes, e.g., as in FIG. 4E, where only the time intervals that comprises 5-95% of the peak height in the original data are used. The RMSE as a fraction of $h_{max}$ improves from 2.4 to 1.4%; $r^2$ improves from 0.9944 to 0.9975.

Figure 4F:
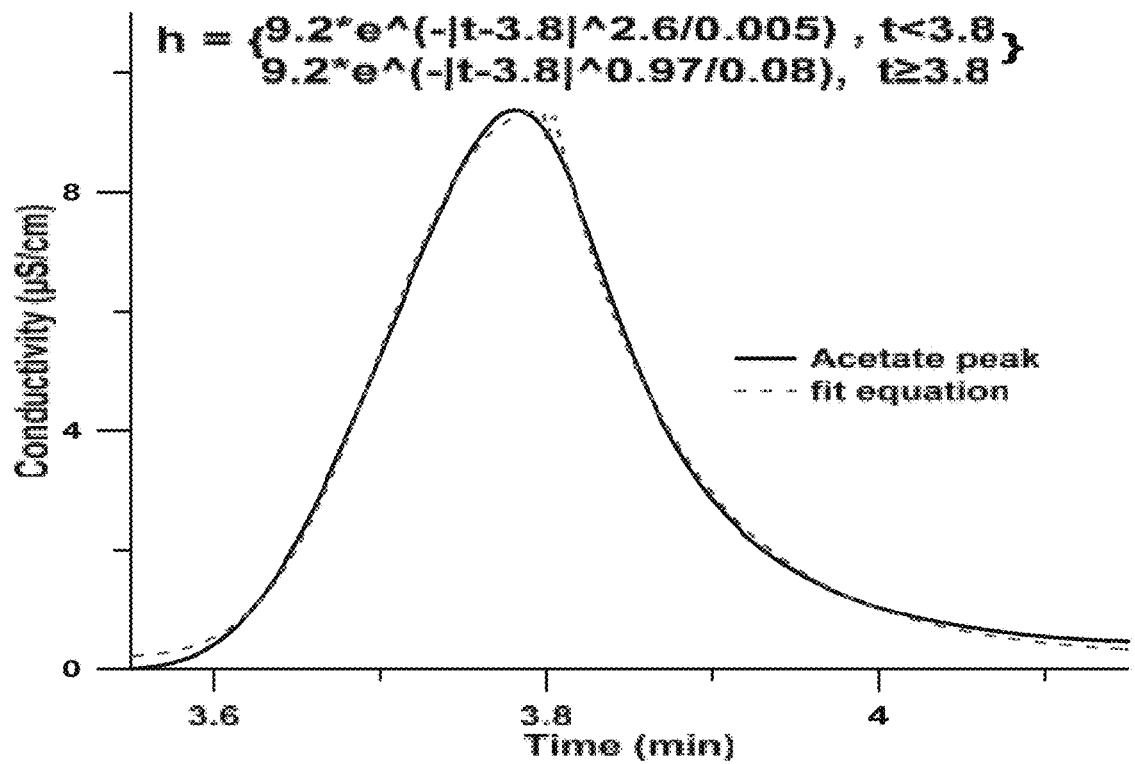
Figure 4G:
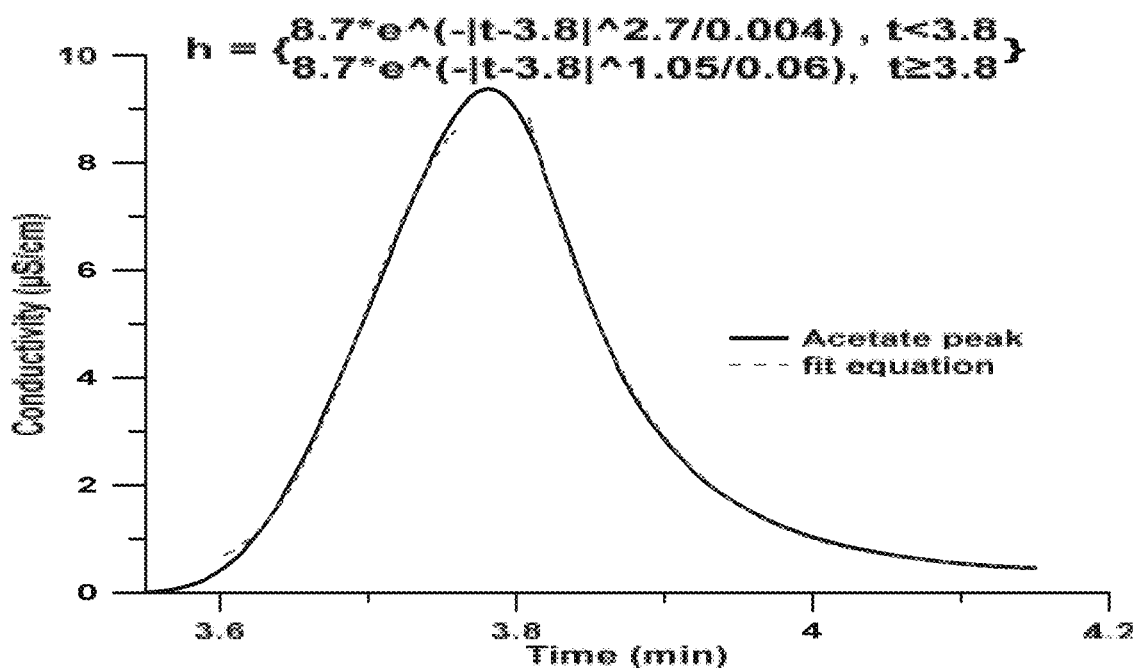

FIGS. 4F-4G illustrate the Equation (9) analog fits for 2 mM acetate. Similar to FIGS. 4D-4E, FIG. 4F has the best fit using the data for the entire peak. In FIG. 4G, only the time intervals that comprise 5-95% of the peak height in the original data are used. The RMSE as a fraction of $h_{max}$ improves from 1.2 to 0.81%; $r^2$ improves from 0.9986 to 0.9991.

Following Equation (9), $W_h$ for the peak of FIG. 3 can be explicitly given as:

$$W_h = 0.33 * \ln \overline{h} + 0.5 * \sqrt{\ln \overline{h}}. \quad (12)$$

This is approximated with high accuracy to:

$$W_h \approx 0.8329 * [\ln \overline{h}]^{0.7234} \quad (13)$$

$\ln h_{max}$ can in this case be then expressed as:

$$\ln h_{max} = 1.29 * W_h^{1.38} + \ln h. \quad (14)$$

The general form for any binary combination of generalized Gaussian distribution functions can thus be expressed by:

$$\ln C = aW_h^n + b \quad (15)$$

or $$W_h = k(\ln C)^{1/n'} + g. \quad (16)$$

Equation (5), the case for a purely Gaussian peak, is simply a special case of Equation (15) with n=2. It is noteworthy that values of n>2 produce a flat-topped peak (increasingly with increasing n, this is not commonly encountered in chromatography. In some embodiments, the value of n' is equal to n. In other embodiments, the value of n' is different from n. In some embodiments, n' is a constant like n. In some embodiments, Eq (16) is derived from Eq (9) through approximations, similarly Eq (15) is derived from Eq (9) through approximations. In actual cases, the value of n' is often close to that of n. In some embodiments, n'=n would not be exact, since Eq (16) is not derived from Eq (15).

Theoretical Limits, Height Vs. Area Vs. Width-Based Quantitation.

It is useful to first examine the theoretical limits of each of these disclosed quantitation methods for an ideal condition. The limits being calculated here pertain to the accuracy with which one can evaluate the height, or area, or the width of a peak (at some specified height) for a perfectly Gaussian band with a realistic amount of noise. An uncertainty in height or area is linearly translated into the uncertainty in quantitation as we are dealing with ideal situations. We simulate a situation involving a Gaussian band of SD is observed by a UV absorbance detector with the true peak amplitude being 1 mAU. With a realistic level of 0.05% stray light, there will be a minute (−0.05%) error in the measured absorbance. We assume that the peak to peak baseline noise is 20 µAU at a sampling frequency of 10 Hz, this would be the best case for a present-day diode array detector. As is well known, the true absorbance amplitude of 1 mAU will not be observed unless the sampling frequency is sufficiently high but the computed area is not affected.

Embodiments of this disclosure entail the detection of the beginning and the end of a peak, generally through the specifications of a threshold slope or a minimum area of a peak. Finding the height maximum is thereafter straightforward as it corresponds to the maximum value observed within the domain of the peak so-defined. However, the measured maximum is affected by the noise and that translates both into inaccuracy and uncertainty. To simulate random noise, the results below represent 10,000 trials. Taking 1 mAU as the true value, the error in the average height (consider this as the bias or accuracy) ranges from −1.7% at 10 Hz to +1.6% at 50 Hz, the errors are a combined result of inadequacy of sampling frequency (this is the dominant factor at low sampling rates), noise and stray light; the relative SD ("RSD") of this perceived height (the uncertainty) is quite low and is in the 0.3-0.4% range from 10-50 Hz.

Figure 5:
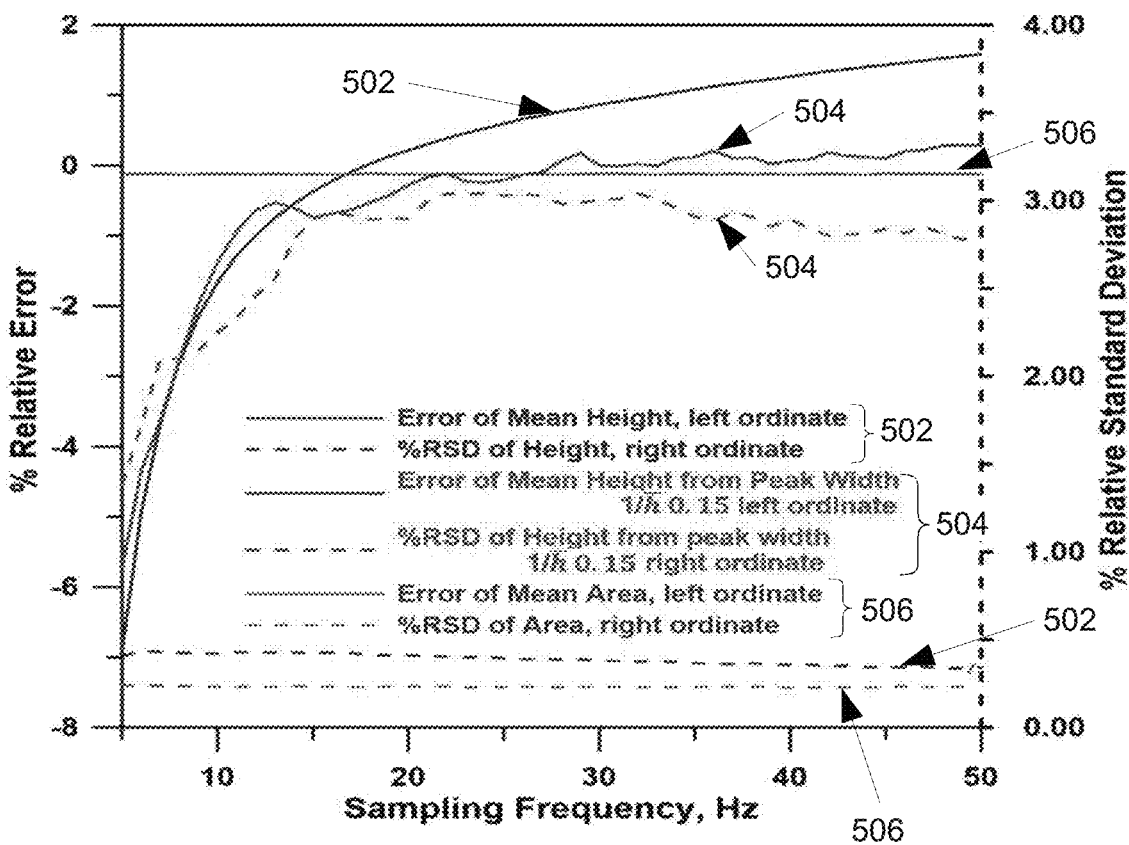
FIG. 5 illustrates a plot of relative bias and relative precision computed for a case of absorbance detection in accordance with some embodiments.

FIG. 5 illustrates the relative bias (solid lines, left ordinate) and relative precision (dashed lines right ordinate) computed for a case of absorbance detection in accordance with some embodiments. The situation assumes a Gaussian analyte peak with a true absorbance amplitude of 1 mAU, a SD of 1 s, 20 µAU of peak to peak random noise at 10 Hz and 0.05% stray light. The results shown depict averages and SDs of 10,000 computational trials. 502, 504 and 506 traces respectively depict height, width, and area-based quantitation; width measured at 150 µAU. Both bias and precision improves as absorbance increases until bias is affected by the stray light.

Errors and uncertainties in area measurement stem from locating the beginning and the end of the peak, in the presence of noise. The success of different algorithm embodiments in doing so will differ. However, the accuracy will essentially be unaffected if the detection span ranges ±5σ or greater. A lower span will result in an increasingly negative error while integrating over a larger span will increase the uncertainty due to noise. Under the present constraints, the error is negligible (~<-0.1%, arising primarily from stray light), while the uncertainty is also very small, under 0.5% (integrated over ±5σ).

Figure 6:
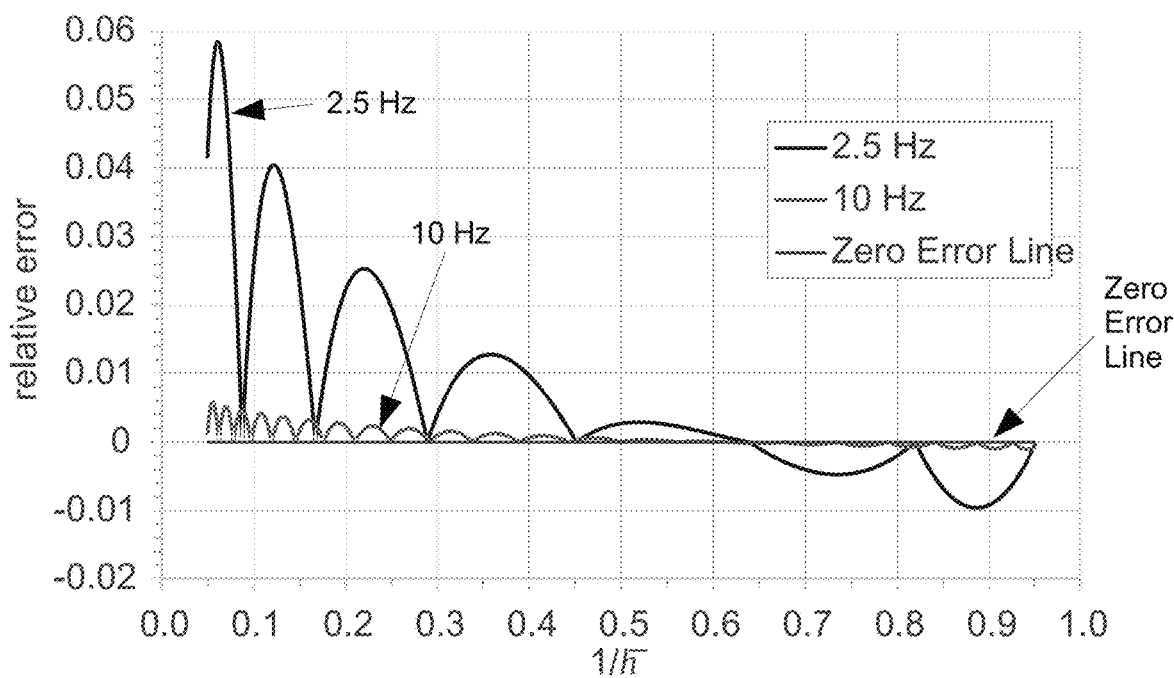
FIG. 6 illustrates a plot of relative error due to linear interpolation in accordance with some embodiments.

Some embodiments to determine the width at a given height first proceed to determine the location of the specified height h on the signal curve on the ascending and descending edges of the signal and determine the times $t_1$ and $t_2$ corresponding to h, and hence determine $W_h$ as $t_2-t_1$. It is unlikely, however, that the discrete data collected will have any datum precisely located at h, but the location of h will be interpolated from discrete data present at locations h-h' and h+h" corresponding to temporal locations of t' and t", where the data acquisition frequency f is given by $1/|(t'-t")|$. The error arises from linear interpolation of points within a Gaussian curve and is expected to oscillate, reaching a maximum when h' and h" are large (h'=h"≠0) and a minimum when either h' or h" is zero. As may be intuitive, with increasing f, the oscillation frequency increases and the error amplitude decreases. FIG. 6 depicts the relative error due to linear interpolation as a function of $1/\bar{h}$, assuming no noise in accordance with some embodiments. At occasions where the black or red error curves touch the blue zero error line, the width is being measured across points actually sampled where no interpolations are needed. But regardless of f, with increasing $1/\bar{h}$, much as FIG. 6 will indicate, the error decreases, with the minimum error being reached at an abscissa value of ~0.6; the direction of the error changes thereafter. In the presence of noise, however, additional errors arise, first in locating h. It will be appreciated that if the location of h is being sought starting from the baseline, the statistical probability is that h will be reached prematurely compared to its true location, resulting a value of $W_h$ higher than the true value and a positive error in concentration. Conversely, if the location of h is sought from the top, the statistical probability will be a lower $W_h$ than the true value and hence a negative error in concentration. However, these errors largely cancel if we take the average of the two locations suggested from bottom-up and top-down searches.

FIG. 5 illustrates the relative error in $h_{max}$ computed based on the width-based quantitation using Equation (5) for the same base case as above as a function of f and ranges from -1.4% at 10 Hz to <0.3% at 50 Hz, better than that based strictly on height (FIG. 5). But at 2-3% RSD, uncertainties in this range are significantly higher than either height or area based quantitation, although hardly in the unacceptable range considering the width measurement is actually being made at a height below the limit of quantitation (LOQ, at 10 times the noise level this would be 200 µAU). At 10 mAU for example, the bias and precision are already -0.5% and 0.7%, respectively at a sampling frequency of 20 Hz (See FIG. 7).

Figure 7:
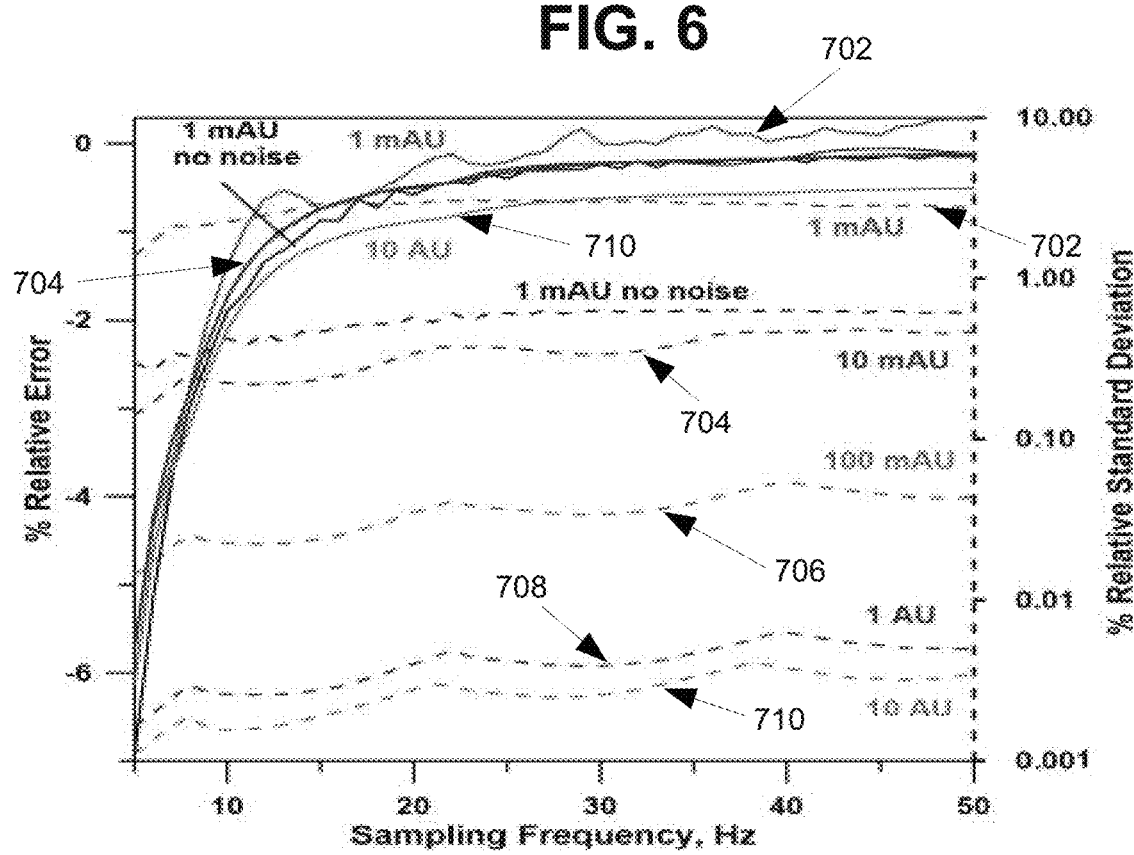
FIG. 7 illustrates a plot of relative error and relative standard deviation computed for width-based quantitation in accordance with some embodiments.
Figure 8:
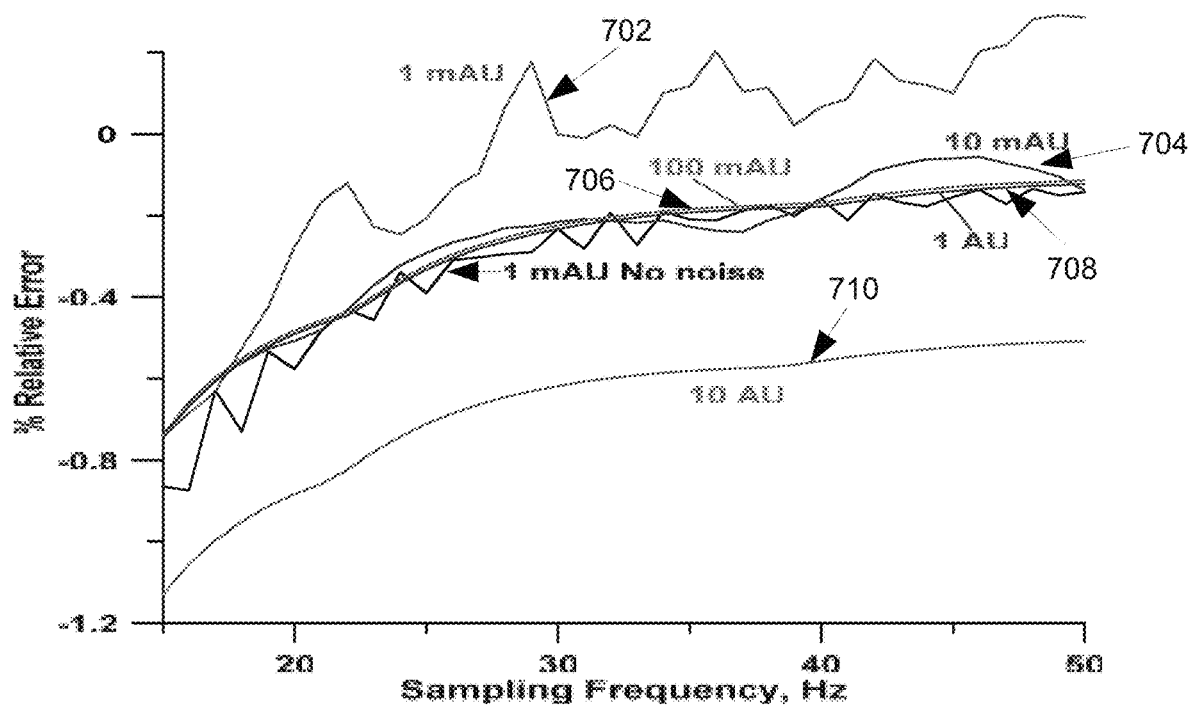
FIG. 8 illustrates the plot of FIG. 7 in a magnified form in accordance with some embodiments.

FIG. 7 illustrates the relative error (solid lines, left ordinate) and RSD (dashed lines right ordinate, note logarithmic scaling) computed for a case of absorbance detection and WBQ. The situation assumes a Gaussian analyte peak with a true absorbance amplitude of 1, 10, 100, 1000, and 10,000 mAU (red 702, blue 704, green 706, purple 708, and orange 710 traces respectively), all measured at $1/\bar{h}$ of 0.15, a SD of 1 s. The peak to peak random noise is 20 µAU at 10 Hz and corresponding noise values under other conditions. The stray light is assumed to be 0.05%. The results shown depict averages and SDs of 10,000 computational trials. The black trace indicates the 1 mAU case without any noise. While the 1 mAU case without noise displays an RSD, it has an RSD higher than all the other higher absorbance traces that do include noise. This is because the interpolation errors are still present and are relatively much greater at lower absorbances. The relative errors are also illustrated in FIG. 8 in a magnified form over a more limited range of f.

Theoretically one expects the precision to be poorer in width, compared to height-based measurement, because two separate points contribute to the uncertainty. However, even for the 1 mAU peak amplitude case, the precision can be improved by choosing a measurement height >150 µAU. We can deduce the optimum $1/\bar{h}$ for measuring width of a Gaussian peak in absence of noise.

Figure 9A:
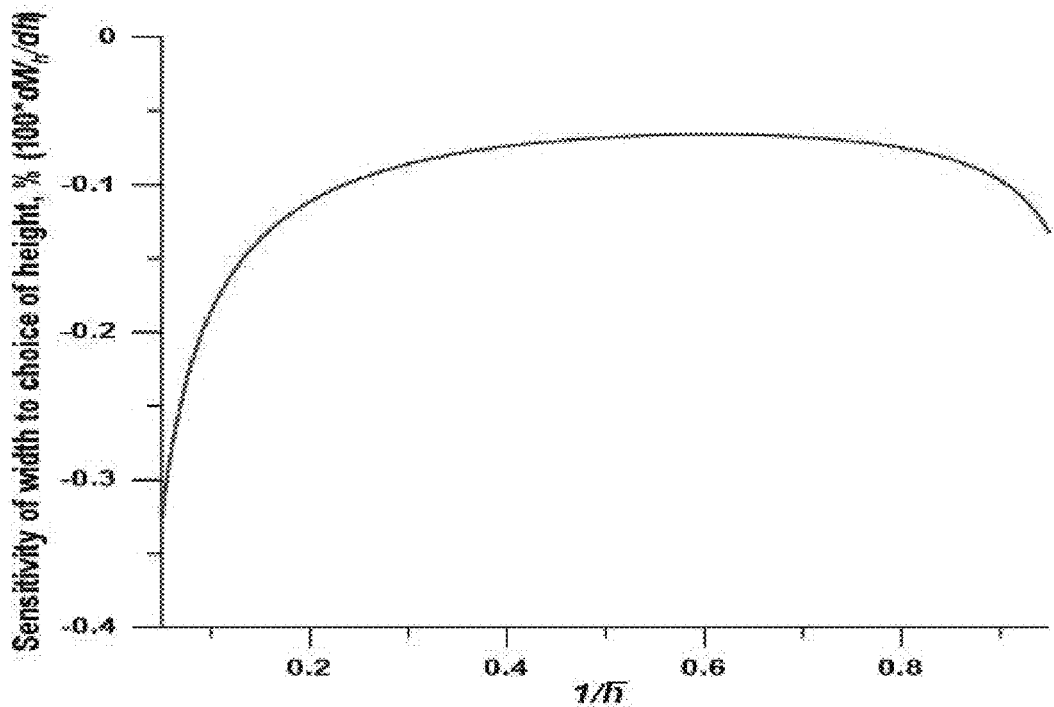
FIG. 9A illustrates a plot of the sensitivity of a width measurement over a selected range in accordance with some embodiments.
Figure 9B:
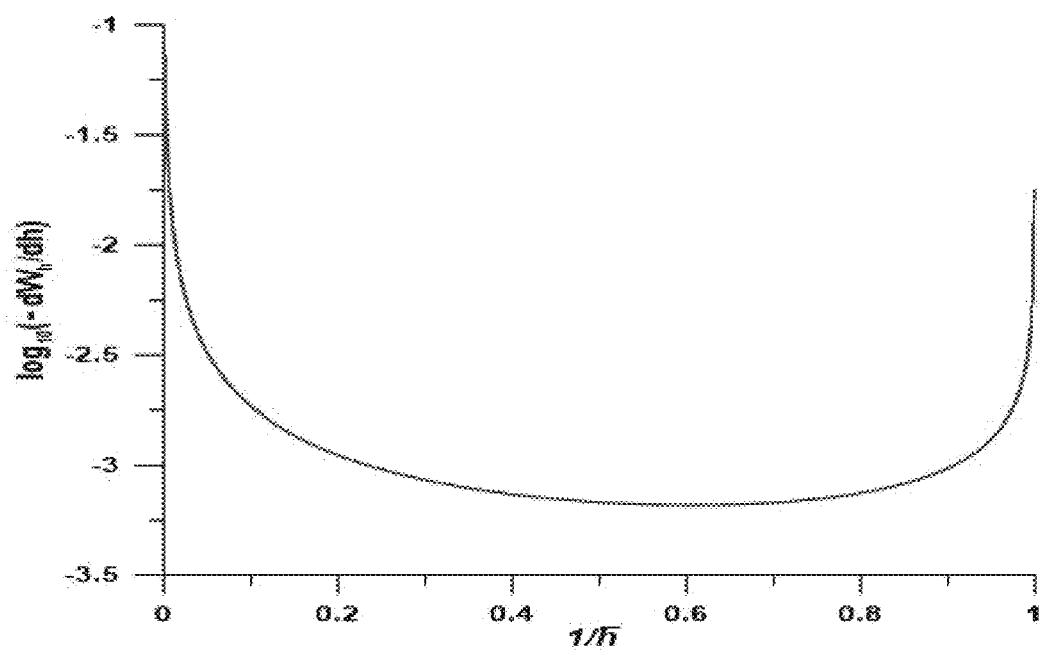
FIG. 9B illustrates a logarithmic plot of the width measurement sensitivity data of FIG. 9A in accordance with some embodiments.

FIGS. 9A-9B illustrate the sensitivity of the width measurement due to uncertainty in height in two different ways in accordance with some embodiments. FIG. 9A covers the primary range of interest, 5% to 95% of peak height; the negative sign of the ordinate values results from the fact that width always decreases with increasing height, the absolute values have been multiplied by 100 to indicate percentage dependence. The magnitude of this sensitivity increases steeply at either end. To see the terminal ends, for an abscissa span of 0.1-99.9% of the peak height, FIG. 9B illustrates a plot of the log of $dW_h/dh$ after changing its sign (to permit logarithmic depiction) vs. $1/\bar{h}$.

Sensitivity of $W_h$ to h for a Gaussian Peak.

$$W_h = 2s\sqrt{2\ln\left(\frac{h_{max}}{h}\right)}$$

So, the height at which W resists changes the most is the h at which $$\frac{d^2W_h}{dh^2} = 0$$

$$\frac{dW_h}{dh} = 2s\sqrt{2} * \frac{d}{dh}\left[\ln\left(\frac{h_{max}}{h}\right)\right]^{1/2}$$

$$d(f^n) = nf^{n-1}df$$

$$\frac{d}{dx}(\ln x) = \frac{1}{x}, x > 0.$$

$$\frac{dW_h}{dh} = 2s\sqrt{2} * \frac{1}{2}\left[\ln\left(\frac{h_{max}}{h}\right)\right]^{-1/2} * \frac{d}{dh}\left[\ln\left(\frac{h_{max}}{h}\right)\right]$$

$$\frac{dW_h}{dh} = -\frac{2s\sqrt{2}}{2*h*\sqrt{\ln\left(\frac{h_{max}}{h}\right)}}$$

$$\frac{d^2W_h}{dh^2} = \frac{2s\sqrt{2} * (2*\ln h_{max} - 2*\ln h - 1)}{4*h^2*(\ln h_{max} - \ln h)^{3/2}}$$

-continued $$\frac{2s\sqrt{2} *(2*\ln h_{max}-2*\ln h-1)}{4*h^2*(\ln h_{max}-\ln h)^{3/2}}=0 \Leftrightarrow h=\frac{h_{max}}{\sqrt{e}}=0.6065*h_{max}$$

First principle considerations suggest that the minimum sensitivity of $W_h$ to h occurs at $$\frac{h_{max}}{\sqrt{e}},$$

e.g., at about 60% of the peak maximum. However, the sensitivity remains relatively flat over a large span of $1/\bar{h}$ from ~0.3 to 0.9, (and virtually constant between 0.4 and 0.8, FIG. 9A). The errors also decrease with increasing f as the error in locating h decreases. The error curves for $1/\bar{h}$=0.60 and 0.85 can be barely distinguished.

Figure 10:
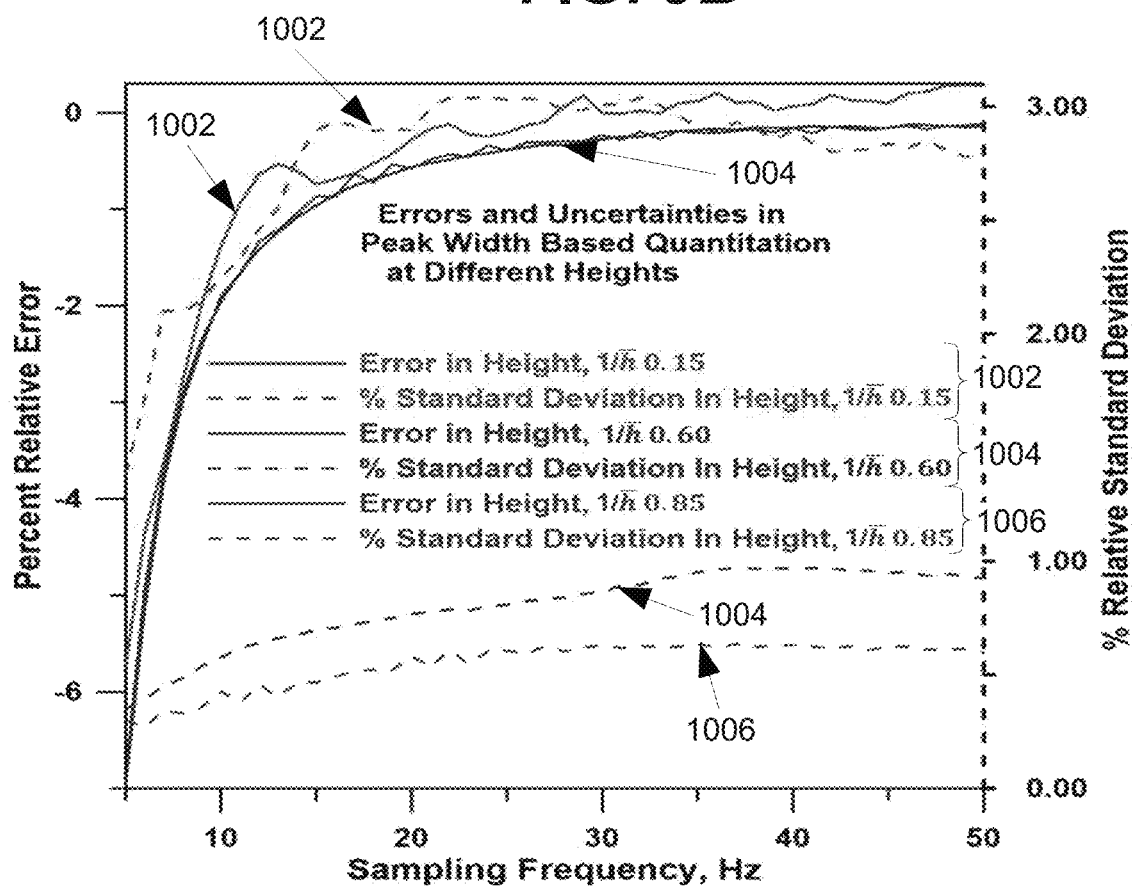
FIG. 10 illustrates a plot of relative error and relative standard deviation computed for width-based quantitation in accordance with some embodiments.

FIG. 10 illustrates the relative error (or relative bias, solid lines, left ordinate) and RSD (or relative precision, dashed lines right ordinate) computed for a case of absorbance detection and WBQ in accordance with some embodiments. The situation assumes a Gaussian analyte peak with a true absorbance amplitude of 1 mAU, a SD of 1 s, 20 µAU of peak to peak random noise at 10 Hz and 0.05% stray light. The results shown depict averages and SDs of 10,000 computational trials. Red 1002, purple 1004 and brown 1006 traces respectively measured at $1/\bar{h}$ of 0.15, 0.60 and 0.85.

At 50 Hz and $1/\bar{h}$=0.60 and 0.85, the error is –0.12% and –0.14%, respectively, and the relative precision under the same conditions are 0.92% and 0.60%, respectively, much better than the 2.8% at $1/\bar{h}$=0.15 at the same f. The fact that the observed precision at $1/\bar{h}$=0.85 is better than that $1/\bar{h}$=0.60, but the difference is very small. By measuring here at a height of 850 µAU, we have moved further away from the noise floor and reduced the uncertainty. Accordingly, the relative uncertainty dramatically improves with increasing absorbance as the signal to noise ratio improves; the absolute precision does not change much until very high absorbance where detector noise due to light starvation becomes dominant (realistically one would choose a lower height to measure the width but here we compare on an equivalent $1/\bar{h}$ basis). The bias and precision for $1/\bar{h}$=0.15 is illustrated in FIG. 7 for peak maxima of 1, 10, 100, 1000, and 10,000 mAU. The base case for 1 mAU is also depicted with noise being hypothetically absent. The accuracy for 10-1000 mAU are all generally better than –0.5% (at f≥30 Hz) and are all superior to that at 1 mAU (See FIG. 8 for a closer view of the relevant part of FIG. 7) but becomes worse at 10 AU (width is being measured at 1.5 AU) due to stray light. This accuracy (still largely better than –1%) is notable, as in any real detector, height or area based quantitation will not be possible at all with any acceptable accuracy.

In general, if sufficiently above noise, the relative error is likely to be the least at $1/\bar{h}$=0.60 while precision will continue to improve with increasing $1/\bar{h}$, however, the improvements are going to be modest.

Tests with Real Chromatographic Data; Width vs Height and Area.

The foregoing disclosure on the limits of accuracy and precision on the quantitation of a single ideal Gaussian peak indicate that even under relatively stringent test conditions of our base case, the performance parameters are similar for the different quantitation approaches. Most quantitation scenarios are different from this ideal world: Had all calibrations behaved so well, all linear regression equations describing a calibration plot would have had a unity coefficient of determination ($r^2$) and an intercept of zero. We would focus below on real data on quantitation by the three different approaches. As an indication of conformity to linearity, the linear $r^2$ value is often cited. But such an algorithm minimizes absolute errors, increasing relative errors, of greater interest to an analytical chemist, at the low end of the measurement range. Weighted linear regression addresses this but is not commonly provided in chromatographic software. The success of a quantitation protocol across the range of interest is perhaps best judged by the Relative RMSE as an index of performance. Ion chromatographic data is used in the following because this represents a demanding test: responses of different analytes can be intrinsically linear or nonlinear, fronting and tailing or both are not uncommon, and while a detector response may become nonlinear it is never completely saturated and thus not giving any obvious cue to abnormal behavior.

(Near-)Gaussian Peaks.

Figure 12:
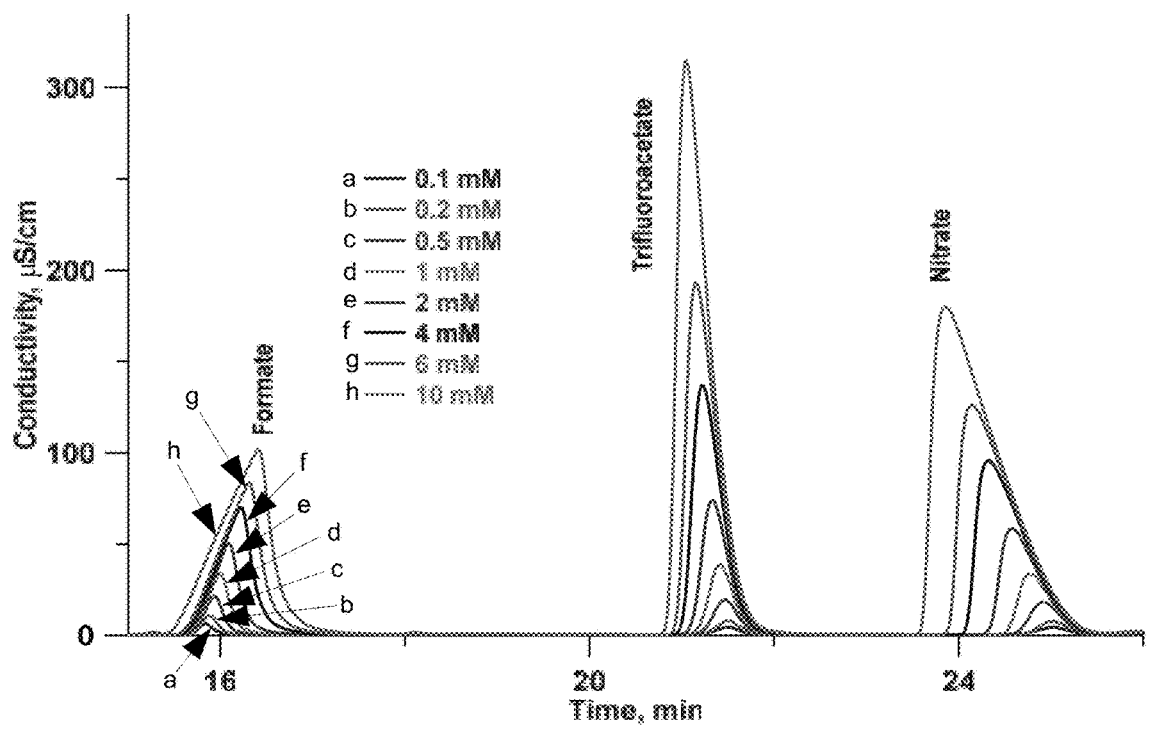
FIG. 12 illustrates peak signal curve responses of certain chemical components produced in accordance with some embodiments.

Turning to FIG. 11, ion chromatographic data for gradient elution of a 6-anion standard mixture over a 100-fold range in concentration is illustrated in accordance with some embodiments. The responses of fluoride, acetate, formate, chloride, bromide and nitrate are eluted under gradient conditions. The peaks may not be perfectly Gaussian but do not exhibit major fronting or tailing. Only chloride is completely separated from the flanking analytes, all others show small but discernible overlap with the following analyte. The concentrations are injected concentrations with a injection volume of 10 µL, unless otherwise indicated. The setup entailed a ThermoFisher/Dionex: IC-25 isocratic pump, EG40 electrodialytic eluent generator, 2 mm bore AG20/AS20 guard and separation column, LC30 temperature controlled oven (30° C.), ASRS-Ultra II anion suppressor in external water mode, CD-25 conductivity detector. An electrogenerated KOH gradient at 0.25 mL/min was used as follows: Time, min (Concentration, mM): 0(4), 3(4), 15(10), 19(40), 27(40), 27.5(4), 30(4). As illustrated in FIG. 12, formate, trifluoroacetate and nitrate eluted under a specific gradient condition show extensive tailing and/or fronting. The experimental setup relating to FIG. 12 was similar to that of FIG. 11, except for KOH eluent: (0.3 mL/min) 0-10 min, 2.0 mM; 10-15 min, 2.0-10 mM; 15-32, min, 10 mM.

The choice of the height (above the baseline) at which the width is measured is obviously important. It must be low enough to accommodate the lowest concentration of interest while this should be high enough to be not unduly affected by the noise. For the chromatogram in FIG. 11, p-p baseline noise was 21-25 nS/cm, while for fluoride, acetate, formate, chloride, bromide and nitrate, the width was measured at 230, 150, 170, 300, 170, and 210 nS/cm, ~8-12 times the noise level. For formate, acetate, and bromide, these heights are below the normally accepted limit of quantitation (S/N=10). For the respective stated heights (conductance values) and the $K_a$ values, the extent of dissociation of fluoride, formate, and acetate is estimated to be 99+, 99+ and 93%.

In Table 1A below, the RMS percentage errors are shown for height and area (both based on best-fit unweighted linear regression equations) and width (based on best fit to Equation (6), the Gaussian model) in columns 2-4; and the same values obtained under a $1/x^2$-weighted regimen are listed in columns 5-7 respectively. The first observation is that weighting makes little or no difference in the errors for the WBQ protocol; logarithmic transformation of the concentration values is akin to $1/x^2$-weighting. Second, without $1/x^2$-weighting, WBQ significantly outperforms area and height-based calibration. Only for the weak acids, area or height based weighted regression outperformed WBQ.

TABLE 1A

Weighted and Unweighted % RMS Errors. Area, Height, Width based Quantitation. (Near)-Gaussian Peaks

| | % RMS Errors, unweighted | | | % RMS Errors, $1/x^2$ weighted | | |
|---|---|---|---|---|---|---|
| | Area | Height | Width | Area | Height | Width |
| Fluoride | 40.6 | 65.8 | 9.7 | 8.2 | 8.1 | 9.4 |
| Acetate | 128.4 | 213.0 | 13.6 | 16.7 | 22.9 | 13.2 |
| Formate | 23.3 | 31.2 | 16.5 | 6.9 | 4.6 | 15.1 |
| Chloride | 53.5 | 31.3 | 4.2 | 9.5 | 8.1 | 4.1 |
| Bromide | 61.2 | 80.4 | 7.3 | 10.8 | 15.6 | 7.2 |
| Nitrate | 67.1 | 67.5 | 6.3 | 13.2 | 13.4 | 6.2 |

Tailing/Fronting Peaks.

Because of variable dissociation of weak acid analytes and the interplay of both electrostatic and hydrophobic retention mechanisms where gradient elution largely alters only the electrostatic push, non-Gaussian peaks are common in ion chromatography (IC) (FIG. 11). Width was measured at 3.0, 1.5, and 2.0 µS/cm for formate, trifluoroacetate and nitrate, respectively, substantially above the baseline noise levels but still below the height of the lowest concentration peak in each case. The data were fit to Equation (16) to obtain the best fit values of n' using a nonlinear least squares sum minimization routine (Microsoft Excel Solver™) and g and k were calculated as the slope and the intercept of the best fit line. The results are shown in Table 1B below using the same format as Table 1A above.

TABLE 1B

Tailing and/or Fronting Peaks

| | % RMS Errors, unweighted | | | % RMS Errors, $1/x^2$ weighted | | |
|---|---|---|---|---|---|---|
| | Area | Height | Width | Area | Height | Width |
| Formate | 110.1 | 388.0 | 4.5 | 13.7 | 36.5 | 4.5 |
| Nitrate | 7.2 | 188.2 | 3.7 | 3.7 | 18.9 | 3.7 |
| Trifluoro-acetate | 11.4 | 54.5 | 2.4 | 3.1 | 6.4 | 2.4 |

Once again, there were no benefits of $1/x^2$-weighted regression over unweighted for WBQ. WBQ substantially outperforms area or height based quantitation by unweighted regression and rivals $1/x^2$-weighted regression.

Fixing the Exponent at 2 vs. Allowing a Floating Fit for Near-Gaussian Peaks.

The responses in FIG. 11 were treated according to the Gaussian model. This already provided superior error performance relative to area or height based quantitation, but a question remains whether there are improvements yet to be made with the general equation (Equation (16)) which allows n' to be fit as well. The responses in FIG. 11 are not strictly Gaussian (the chloride peak depicted readily allows this conclusion). Table 2 below compares the results obtained for the different error levels for the analytes in FIG. 11 in using Equation (6) vs. Equation (16): Allowing a floating n' produces a smaller RMS error for all the analytes, albeit the difference is not always marked.

TABLE 2

Performance Comparison. Eq. 6 vs. Eq. 16 for Close but Not Perfectly Gaussian Peaks

| | | n Fixed at 2; Eq. 6 | | | | Floating n; Eq. 16 | | | | |
|---|---|---|---|---|---|---|---|---|---|---|
| Analyte | h, nS/cm | k | g | $r^2$ | % RMS Error | n' | k | g | $r^2$ | % RMS Error |
| Fluoride | 230 | 0.53 | −0.91 | 0.9951 | 9.7 | 30.0 | 18.17 | −18.88 | 0.9992 | 3.9 |
| Acetate | 150 | 0.61 | −1.09 | 0.9929 | 13.6 | 46.0 | 32.89 | −33.78 | 0.9985 | 7.6 |
| Formate | 170 | 0.72 | −1.36 | 0.9886 | 16.5 | 0.8 | 0.07 | −0.30 | 0.9971 | 8.9 |
| Chloride | 300 | 0.80 | −1.40 | 0.9993 | 4.2 | 1.4 | 0.41 | −0.87 | 0.9998 | 2.2 |
| Bromide | 170 | 0.82 | −1.49 | 0.9979 | 7.3 | 5.2 | 3.67 | −4.66 | 0.9992 | 4.5 |
| Nitrate | 210 | 0.90 | −1.65 | 0.9983 | 6.3 | 1.6 | 0.58 | −1.23 | 0.9985 | 6.0 |

Choice of Height for Width Measurement.

The choice of the height may be made after the peak height is measured. For a single calibration equation to be used for quantitation, the height for width measurement should be low enough to be below the peak height of the lowest concentration of interest but it should not be so low that the measurement is severely impacted by noise. In addition, if the analyte of interest is not completely separate from the adjacent eluites, it is intuitive that the effect of the adjacent peaks on the measured widths will be more pronounced at lower heights than higher. Results are shown below in Table 3 below.

TABLE 3

Errors as a Function of the Height Chosen for Width Measurement

| Fluoride | | | Acetate | | | Formate | | |
|---|---|---|---|---|---|---|---|---|
| Height for Width Msmt, uS/cm | Eq 15 Best fit $r^2$ | RMS % Error | Height for Width Msmt, uS/cm | Eq 15 Best fit $r^2$ | RMS % Error | Height for Width Msmt, uS/cm | Eq 15 Best fit $r^2$ | RMS % Error |
| 0.11 | 0.9983 | 7.0 | 0.06 | 0.9853 | 24.1 | 0.08 | 0.9885 | 16.7 |
| 0.17 | 0.9994 | 4.0 | 0.09 | 0.9898 | 19.6 | 0.11 | 0.9922 | 13.7 |
| 0.23 | 0.9991 | 3.9 | 0.12 | 0.9955 | 12.3 | 0.14 | 0.9959 | 10.0 |
| 0.29 | 0.9974 | 6.3 | 0.15 | 0.9985 | 7.6 | 0.17 | 0.9971 | 8.9 |
| 0.50 | 0.9995 | 2.8 | 0.50 | 0.9977 | 5.6 | 0.50 | 0.9997 | 2.2 |

| Chloride | | | Bromide | | | Nitrate | | |
|---|---|---|---|---|---|---|---|---|
| Height for Width Msmt, uS/cm | Eq 15 Best fit $r^2$ | RMS % Error | Height for Width Msmt, uS/cm | Eq 15 Best fit $r^2$ | RMS % Error | Height for Width Msmt, uS/cm | Eq 15 Best fit $r^2$ | RMS % Error |
| 0.10 | 0.9890 | 15.1 | 0.08 | 0.9988 | 6.0 | 0.09 | 0.9977 | 7.1 |
| 0.20 | 0.9993 | 3.8 | 0.11 | 0.9988 | 6.0 | 0.13 | 0.9972 | 8.2 |
| 0.30 | 0.9998 | 2.2 | 0.14 | 0.9990 | 5.4 | 0.17 | 0.9986 | 5.8 |
| 0.40 | 1.0000 | 0.9 | 0.17 | 0.9992 | 4.5 | 0.21 | 0.9985 | 6.0 |
| 0.50 | 0.9996 | 3.0 | 0.50 | 0.9985 | 4.5 | 0.50 | 0.9979 | 5.6 |

Note that the highest height at which the width can be measured depends on the analyte, whereas a height of 0.5 μS/cm can be used readily for 50 μM chloride, the same concentration of the other analytes leads to a peak response below this value, making it impossible to choose this height for width measurement.

It will be observed that $r^2$ monotonically increases and the percent RMSE monotonically decreases (or does not change) beyond a certain point. Table 4 below also shows detailed error distribution at individual heights for chloride with a similar pattern. However, relative to the overall concentration span and the range of peak heights (exceeding 100 μS/cm for chloride), even the highest h used in Table 4 (5 μS/cm) is relatively low. Note that the sensitivity or error plot as a function of 1/h is fundamentally asymmetric (FIG. 7) and the error probability is decreased by measuring within 1/h=0.4-0.9. At the low end, the probability of incurring additional errors increases from noise and influence of adjacent peaks. A caveat for the upper limit of choosing h is it should be within the linear response region.

TABLE 4

Individual and Overall RMS Error at Different Heights for Chloride (Eq. 16)

| Conctn, mM/ h, μS/cm | 0.05 | 0.1 | 0.2 | 0.5 | 1 | 5 |
|---|---|---|---|---|---|---|
| 0.05 | −39.8 | −14.8 | −2.7 | −3.1 | | |
| 0.1 | 40.5 | 6.8 | 5.2 | 4.6 | −3.6 | |
| 0.2 | 30.7 | 21.3 | 1.8 | 2.3 | 7.8 | |
| 0.5 | 100.3 | 9.4 | −6.6 | −3.5 | −4.2 | 0.0 |
| 1 | 28.8 | 5.8 | 1.8 | −1.6 | −0.1 | 0.0 |
| 5 | −62.8 | −22.8 | 1.0 | 1.4 | 0.5 | 0.0 |
| % RMS Error | 56.3 | 15.1 | 3.8 | 4.3 | 3.0 | 0.0 |

Having described the basic principles and characteristics of WBQ embodiments and their performance compared with height or area-based paradigms, we now focus on aspects where WBQ is effective while height or area-based calibration fail. For example, this may occur when the detector reaches a nonlinear response region, or are simply inapplicable, as when the detector/data system is in the saturation region causing clipping/truncation of the signal, or the detector signal is not a single valued function of concentration, as when a fluorescence signal goes into the self-quenched domain. WBQ can also benefit post-column reaction based detection methods which exhibit a finite detector background from the post-column reagent because it is not necessary to have a stoichiometric amount of the post-column reagent to accommodate the highest analyte concentration of interest. WBQ can make use of the two-dimensional nature of chromatographic data: If multiple heights are used for quantitation or if used in conjunction with height or area based quantitation it is possible to check for and detect co-eluting impurities.

Nonlinear response situations include scenarios where the detector response is not a single valued response of concentration, a notable example being fluorescence behavior of a fluor at high enough concentrations in the self-quenched domain. While such phenomena have occasionally been used advantageously in indirect fluorometric detection using fluorescent eluents at high concentrations to produce positive signals, a fluorescent substance with a peak concentration in the self-quenched domain will produce an M-shaped peak. A single quantitation paradigm involving both the low concentration unquenched and the higher concentration self-quenched domain has not been possible. Similar situations may be encountered in post-column reaction detection. WBQ can be applied in these situations to provide accurate quantitation.

Width can be measured at many heights. The present ability to store large amounts of data (e.g., entire profiles of calibration peak traces) and the ability for fast computation makes it trivial for embodiments to generate a width-based calibration plot at any height on demand. Co-eluting impurities by definition are smaller than the principal component in the peak, and therefore contribute to a greater degree to the peak width towards the bottom than towards the top. As such, the presence of an impurity may not be readily apparent from asymmetry changes. But, if the concentration of the examined band is ascertained by a calibration curve generated from pure standards, the telltale indication of an impurity is a significantly higher predicted concentration when interpreted with a width-based measurement at a lower height compared to one at a higher height.

For situations in which the peak apex can be located (signal is not truncated), the width of the left half and the right half can be independently measured and their depiction as a function of height directly (or in a transformed form) provides information about asymmetry and other characteristics of the band not available from any single parameter description of peak asymmetry.

Effects of Detection with Peak Maximum in Nonlinear Response Regime.

Virtually all detectors go into a nonlinear response region and eventually saturate. With fluorescence detection, the signal may eventually decrease with increasing concentration due to self-quenching. Detector nonlinearity is a real issue in particular in absorbance and conductance measurements, two very commonly used detectors in high performance liquid chromatography (HPLC) and IC. Obviously under such conditions, area or height based quantitation has intrinsic limitations.

Figure 13:
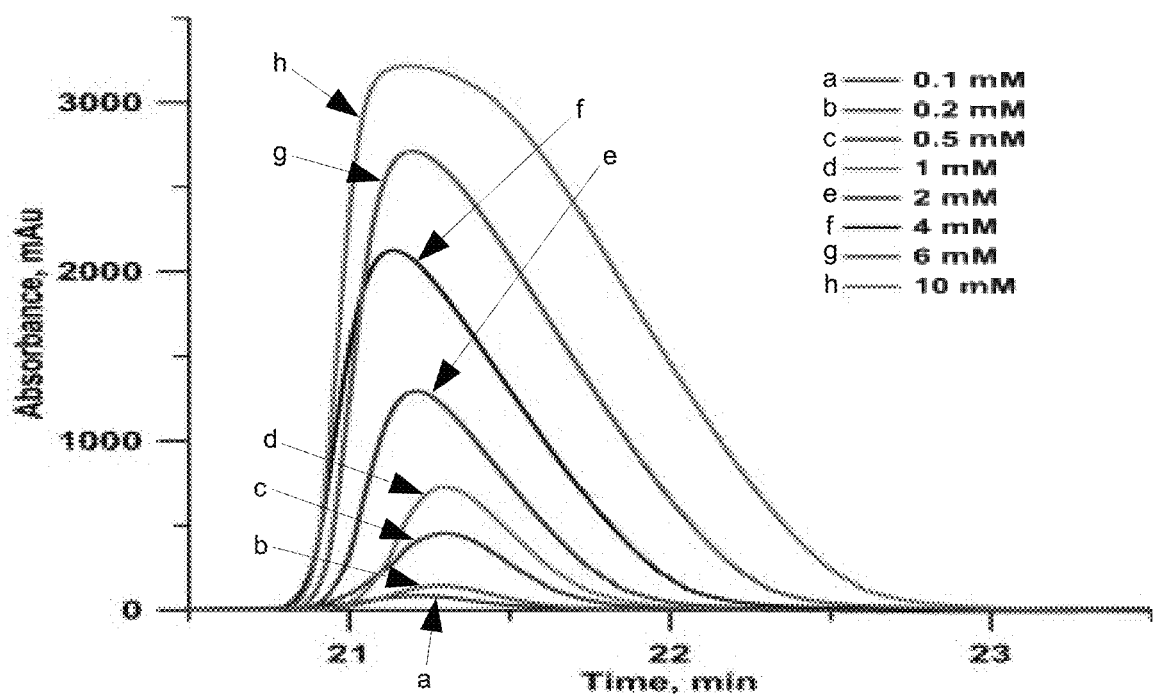
FIG. 13 illustrates a nitrate chromatographic peak in accordance with some embodiments.

FIG. 13 illustrates a nitrate peak chromatogram detected at 200 nm with the concentration spanning two orders of magnitude on an Agilent 1290 DAD instrument—chromatographic details ICS 5000 IC system: AG11 (2×50 mm)+AS11 (2×250 mm) columns. KOH gradient at 0.3 mL/min: 0-10 min, 2.0 mM; 10-15 min, 2.0-10 mM; 15-32 min, 10 mM; Injection volume, 10 µL. The width was measured at 20 mAU, far above baseline noise, and could be represented by the equation (in the form of Equation (16)):

$$W_h, \min = 1.82 * 10^{-4}(\ln C, mM)^{\frac{1}{0.25}} + 0.52, r^2 = 0.9988. \quad (17)$$

The quantitation errors in the three paradigms (height-based, area-based and WBQ) are shown in Table 5 below. WBQ outperforms area and especially height-based quantitation in both unweighted and $1/x^2$-weighted regression. Height has a much higher error than other paradigms because it is the most affected by nonlinearity. WBQ is not significantly affected by weighting, it outperforms the other paradigms always but more so in the unweighted regression mode.

TABLE 5

Weighted and unweighted calculated % RMSE of Area, Height, Width based quantitations for the nitrate responses shown in FIG. 13

| | % RMS Errors, unweighted | | | % RMS Errors, $1/x^2$ weighted | | |
|---|---|---|---|---|---|---|
| | Area | Height | width | Area | Height | width |
| Nitrate | 10.2 | 282.2 | 6.6 | 7.1 | 13.1 | 6.6 |

When the Measured Signal does not Monotonically Change with Concentration.

As a result of quenching at higher concentrations, in fluorescence detection the signal at first linearly increases with concentration then plateaus out and finally decreases with further increases in concentration. Obviously, height or area-based quantitation do not work. Interestingly, sometimes it may be desirable for a peak to be clipped off, if it could still be quantitated. (Aside from all other considerations, digitization resolution improves if an analog to digital converter spans a lower input voltage range.) Consider post-column reaction detection schemes where a reagent is continuously added to the column effluent to form a more easily detectable product. Commonly, the post-column reagent ("PCR") has a finite detector response and thus adds to the background signal and increases noise. Thus, it is detrimental to add a lot of PCR, but if insufficient, the upper limit of measurable analyte concentration becomes limited. A well-known example is the detection of metal ions after chromatographic separation with a chromogenic dye. A unique relevant example is the detection of acidic eluites by introducing a small amount of a base post-column (the column background is pure water) and then allowing the mixture to flow through a conductivity detector, which we have explored for some time. The detector background reflects the conductivity from the base added; when an acid eluite comes out, the acid HX is neutralized forming $X^-$ and water. The net result is thus the replacement of $OH^-$ by $X^-$. As $OH^-$ has the highest mobility of all anions, a negative response in the conductivity baseline results. However, if the eluite acid concentration exceeds the base concentration, the conductivity will go back up as the peak concentration is approached.

Figure 14:
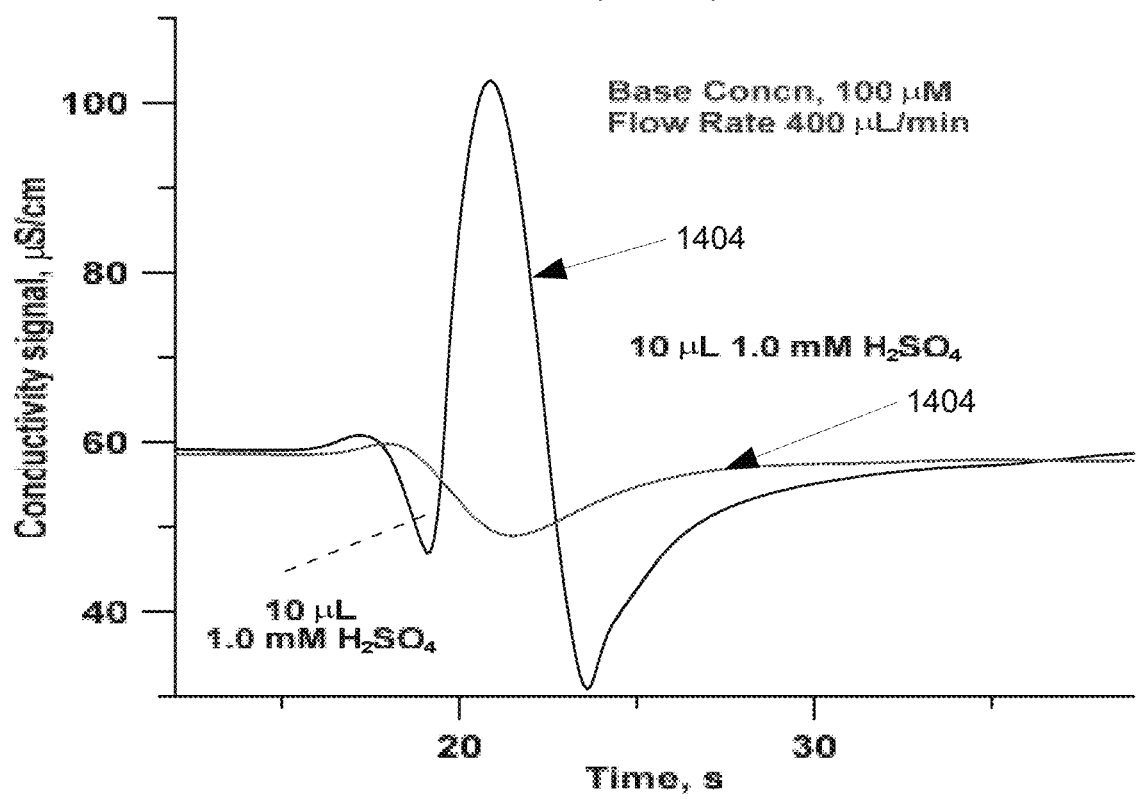
FIG. 14 illustrates a plot of a system responding nonlinearly at two different concentrations in accordance with some embodiments.

FIG. 14 illustrates two different concentrations of $H_2SO_4$ injected into a 100 µM strong base carrier in accordance with some embodiments. At lower injected concentrations, a negative peak results (red trace 1402). When the acid concentration at the peak exceeds the base concentration, a W-shaped peak results (black trace 1404). Note that if a fluorescent substance is injected into a nonfluorescent carrier, and the resulting signal monitored with a fluorescence detector, an M-shaped peak will result if the fluorescence is in the self-quenched domain at the peak. Both belong to a general case where the response is not a single-valued function of the concentration.

Figure 15:
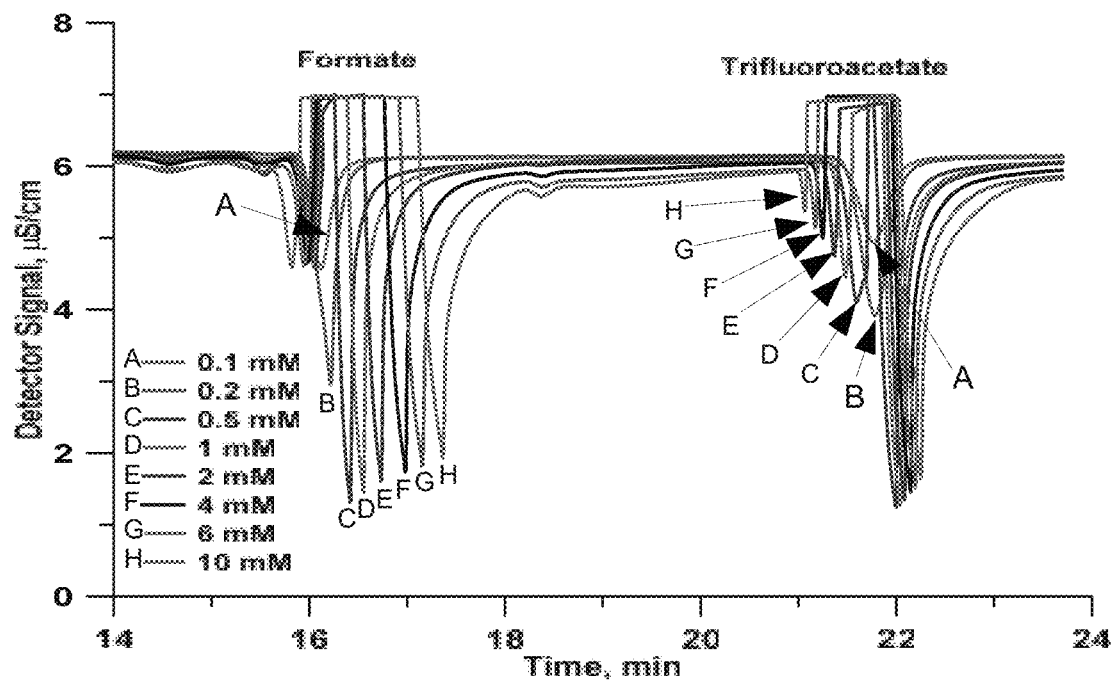
FIG. 15 illustrates a plot of conductometric responses in accordance with some embodiments.

FIG. 15 illustrates conductometric responses of two anions, each over two orders of magnitude, to a detection system using a permeative amine introduction system (PAID) in accordance with some embodiments. Formic acid is moderately weak ($pK_a$ 3.75); trifluoroacetic acid is almost a strong acid ($pK_a$ 0.25). These responses cannot be quantitated by height or area-based methods. The depicted set of illustrative data is from a post-column reaction system where a base ($Et_2NH_2OH$) is introduced to react with formic and trifluoroacetic acid eluites to produce the resulting salt that is detected in a background of base. Since $Et_2NH_2OH$ itself has a measurable detector background, it is desirable to minimize the added amount to reduce the baseline noise. In the present case, the width was measured at a fixed height (1.2 and 0.4 S/cm for formate and trifluoroacetate, respectively) below the baseline to construct a calibration plot. The Relative RMSE over the two orders of magnitude range of concentration was 6.6% for formate and 13.6% for trifluoroacetate. The error is relatively high in the second case because the peak shape actually changes at the higher concentrations. However, given that area or height-based quantitation is not possible at all, WBQ still provides a viable option.

Depiction of Peak Shapes and Asymmetry.

Figure 16:
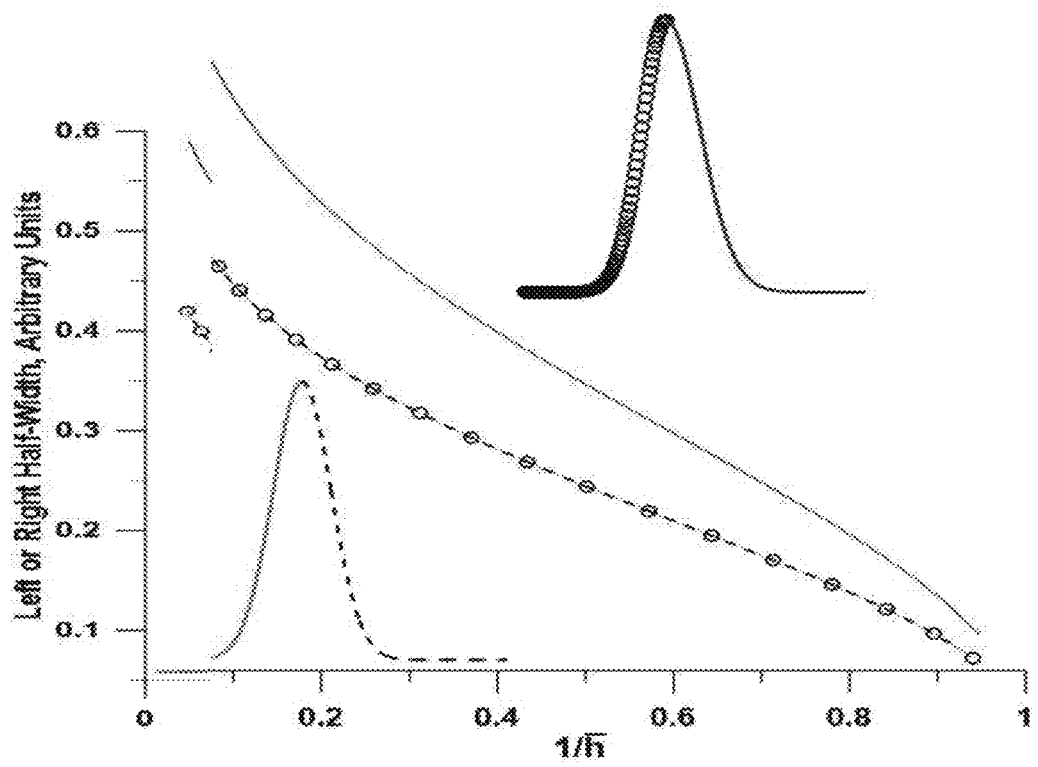
FIG. 16 illustrates a Gaussian plot in accordance with some embodiments.

Perhaps because of our inherent love for symmetry, our visual acuity in assessing peak asymmetry is limited, as illustrated in FIG. 16 in accordance with some embodiments. In FIG. 16, the bottom inset peak is a completely symmetric Gaussian peak that obeys the equation $h=\exp(-t^2/0.058)$, where the peak is centered at $t=0$. The orange solid trace and the dashed black trace in the main plot respectively shows the left and right half width for this peak as a function of $1/\bar{h}$ ($\bar{h}$ being $h_{max}/h$). The two halves are mirror images and the half-width plots therefore appear superimposed. The top inset peak has an identical left half but the right half, while also being Gaussian, has a squared standard deviation (SD) term that is twice that of the left half, the relevant equation being h=exp ($-t^2/0.116$). As the left half of the top inset peak is identical to that of the bottom inset peak, not surprisingly, the circles representing the leading half of the top peak completely overlap the previous half-width vs. 1/$\bar{h}$ traces. The right half of the top peak, however, provides a very different half-width vs. 1/$\bar{h}$ trace. This figure emphasizes that peak symmetry (or lack thereof) is much easier to ascertain in combined left half-width and right half-width vs. 1/$\bar{h}$ plots than in the original chromatographic peaks.

Numerous efforts have been made to limit the description of peak asymmetry to one or two numerical values, most involving some form of a ratio, the simplest being b/a where a and b are respectively the leading and trailing half-widths of the peak at some specific values of 1/$\bar{h}$, (h being defined as $h_{max}$/h) often 0.05 or 0.10. A tailing factor has also been defined by the U.S. Pharmacopeia as (a+b)/2a at 1/$\bar{h}$=0.05. The skewness calculated from the third central moment is yet another measure of asymmetry in use; these and many other ways of describing asymmetry have been discussed by others. It has been recognized, however, that no approach can fully describe peak asymmetry. When calibration is carried out at multiple heights, WBQ is essentially a depiction of width as a function of height. A clear visual depiction of asymmetry appears if the left and right half widths are independently shown as a function of height. In FIG. 16, and subsequent related figures, the 1/$\bar{h}$ bounds are deliberately limited to 0.05 to 0.95 (in our experience, conformity of each side of real chromatographic peaks to a generalized Gaussian distribution model (GGDM) is better attained within these limits (See FIGS. 4D-4G)). As such, in these depictions, greater concern was given to the general shape of the peak rather than fronting or tailing only near the peak base.

Figure 17:
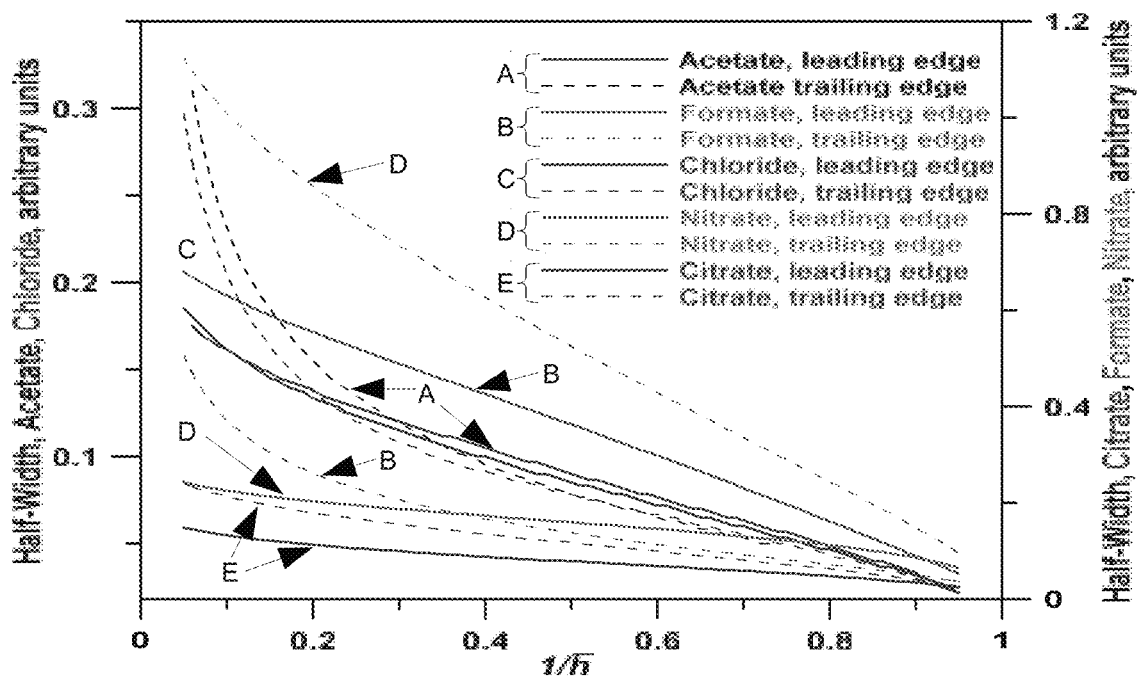
FIG. 17 illustrates a plot of leading and trailing half-widths for certain chemical components in accordance with some embodiments.

FIG. 17 indicates how this type of depiction reveals symmetry in real peaks in accordance with some embodiments. FIG. 17 illustrates the left (leading) and right (trailing) half-width vs. 1/$\bar{h}$ plots for acetate, formate, chloride, nitrite, nitrate, and citrate. The original chromatograms can be seen in FIGS. 4A-4G. Note that while generally the trailing half is wider than the leading half, it is the reverse for the formate peak which fronts quite obviously. For chloride and acetate, the leading and trailing edge traces, although not superimposed, lie very close to each other down approximately to 1/$\bar{h}$=0.30 but the trailing half becomes wider towards the base (classic tailing). The absolute value of the width is dependent on the SD of the peak and the injected concentration. With the exception of formate, which has a strongly fronting peak, the trailing halves are always wider than the leading halves. As FIG. 15 depicts, for a Gaussian peak, a plot of $W_h$ vs. 1/$\bar{h}$ is not expected to be linear, but departs increasingly from linearity as 1/$\bar{h}$ decreases. (A linear $W_h$ vs. 1/$\bar{h}$ plot connotes a triangle, a near-triangular shape can be seen for the strongly fronting leading edge of the formate peak). Nitrate exhibits the largest asymmetry; the trailing half is much wider than the leading half throughout and increasingly so with decreasing 1/$\bar{h}$.

We are unaware of depictions of asymmetry in the form of FIG. 17 and the like but believe them to be particularly revealing. However, while depictions as in FIG. 17 indicate the general nature of asymmetry as a function of 1/$\bar{h}$, they do not provide any quantitative information about departure from a Gaussian shape. A peak may be perfectly symmetric but far from a Gaussian (as in an isosceles triangle). If we rewrite Equation (3) to describe the leading or trailing peak half-width ($W_{h(l,t)}$) for a true Gaussian distribution as:

$$W_{h(l,t)} = 1.41s(\ln \bar{h})^{0.5}, \quad (18)$$

for a generalized Gaussian distribution, the exponent of ln h can have a value m other than 0.5. The departure from the ideal Gaussian distribution can be judged from how far m departs from 0.5 (illustrative distributions are illustrated in FIGS. 1A-1B, exponent n in these figures equals 1/m). A logarithmic transformation of Equation (18) produces a linear form:

$$\ln W_{h(l,t)} = \ln 1.41s + m \ln(\ln \bar{h}). \quad (19)$$

A plot of $\ln W_{h(l,t)}$ as a function of $\ln (\ln \bar{h})$ thus produces m as the slope and the SD s is given by 0.707*exp(intercept).

Figure 18:
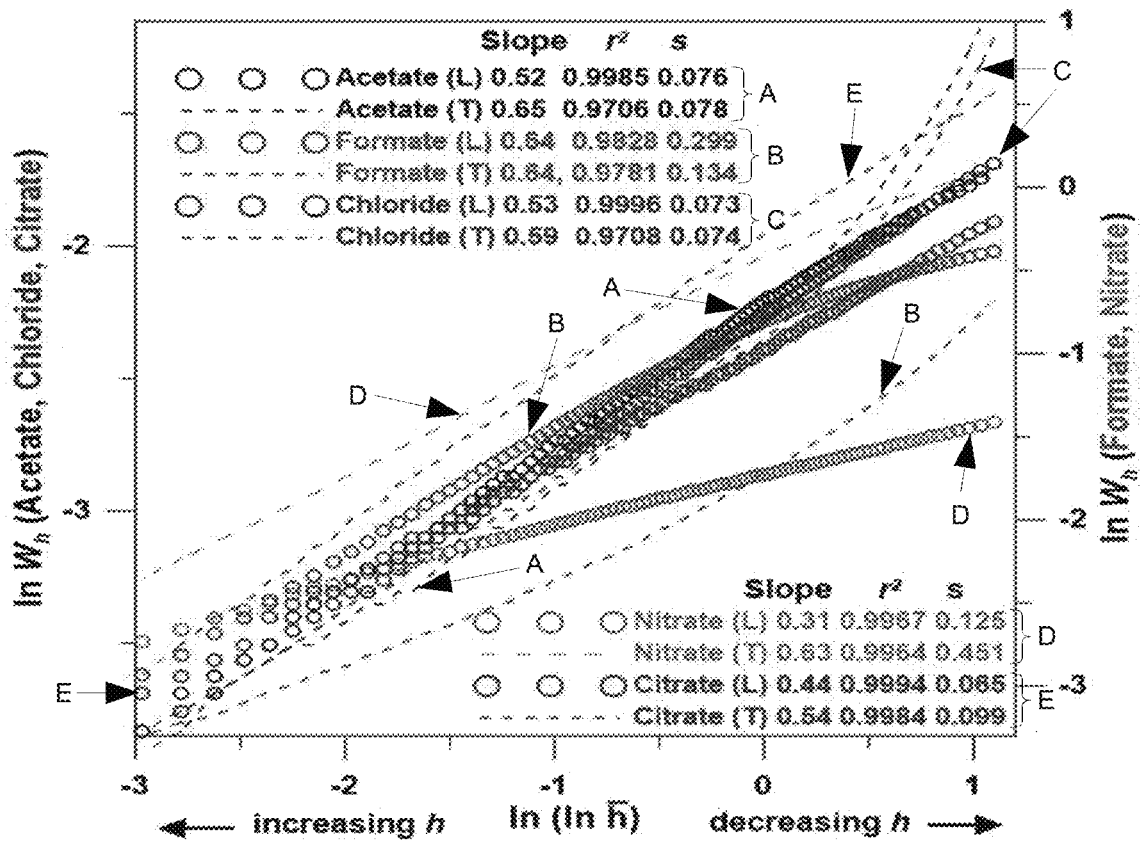
FIG. 18 illustrates plots for both the leading and trailing halves for certain analyte peaks in accordance with some embodiments.

FIG. 18 illustrates the relevant plots for both the leading and trailing halves for the five analyte peaks (shown in FIGS. 4A-4G) along with the slope (an index of departure from true Gaussian distribution) and the coefficient of determination (an index of conformity to GGDM), and the SD (an index of the width of the corresponding halves of the peak). In FIG. 18, the circles represent the leading edge, dashed lines represent the trailing edge. We posit that these six parameters (slope, $r^2$, and s for each half of the peak) provide a more complete description of the peak compared to extant approaches. Conventional asymmetry numerics can be estimated in principle at any value of 1/$\bar{h}$ from these specifications, but are generally not reliable at 0.05≥1/$\bar{h}$ as fit to the GGDM becomes poor. The leading edge always fits a generalized Gaussian distribution better, albeit for nitrate and citrate the difference is insignificant. Except for formate that produces a fronting peak, the SD is also always greater for the trailing half although the difference is minor for chloride and acetate. The slopes for the generalized Gaussian distribution fits indicate that the leading edges of the acetate and chloride peaks and the trailing edge of the citrate peak are very nearly Gaussian. For all the others, except for the leading edges of nitrate and citrate, the slope is >0.5 (referring to FIGS. 1A-1B, n is <2). Some of the traces are highly linear throughout, the departure from linearity for the others takes place towards the base of the peak (higher abscissa or ordinate values).

Purity Analysis. Detection of Impurities.

A powerful aspect of WBQ, and one that takes advantage of its multidimensional nature, is the possibility of utilizing multiple calibration curves at multiple heights for use in the detection of co-eluting impurities. Presently available strategies for ascertaining the presence of impurities depend on some orthogonality of the detection method. The most commonly used method uses dual wavelength absorbance detection and relies on the ratio of the extinction coefficients of the analyte and the impurity being different at the two wavelengths; this approach is now 4 decades old. There are limitations to the approach; changes in composition of the solvent, as during gradient elution, can be a serious issue. Other substantially more complex and computationally intensive approaches such as iterative target—transformative factor analysis, evolving factor analysis, fixed size moving window evolving factor analysis, etc., have been developed but never became popular. Ratioing has also been performed in ion chromatography using orthogonal detection methods using two detectors—one major problem with serial detector approaches is the need to correct for dispersion and time lag between the two detectors.

The presence of an impurity in an eluting band results in a distortion of the shape of the band with the caveat that the impurity also responds to some degree in the detector. However, this distortion may range from an easily perceptible abnormality to a subtle change that would not appear abnormal by casual visual inspection. No simple algorithms have been advanced to rapidly, much less automatically, check if there have been any changes in the shape of the target analyte peak in a real sample compared to that elicited by a known pure standard. WBQ at multiple heights in a fashion really looks at the peak shape.

There are several ways the detection of the presence of an impurity can be performed with WBQ. One is to always perform quantitation at (at least) two different heights, one at a relatively high and the other at a relatively low value of $1/\bar{h}$ with interpretations based on the established behavior of the standard calibration with the pure compounds, when a pure standard is available and a calibration with chromatography of pure standards have already been conducted. By definition, the impurity is always less (strictly, is producing a lower overall response) than the analyte of interest and its retention time is somewhere within the retention window of the analyte peak. No conventional method can detect low levels of an impurity that has similar detection characteristics (e.g., identical absorption spectrum) that appear at an identical retention time as the analyte. Although such an extreme case is not common, WBQ is capable of detecting a difference in principle even under these conditions if there is a difference in peak shape between the impurity and the analyte.

Impurity has Identical Retention Time.

Figure 19:
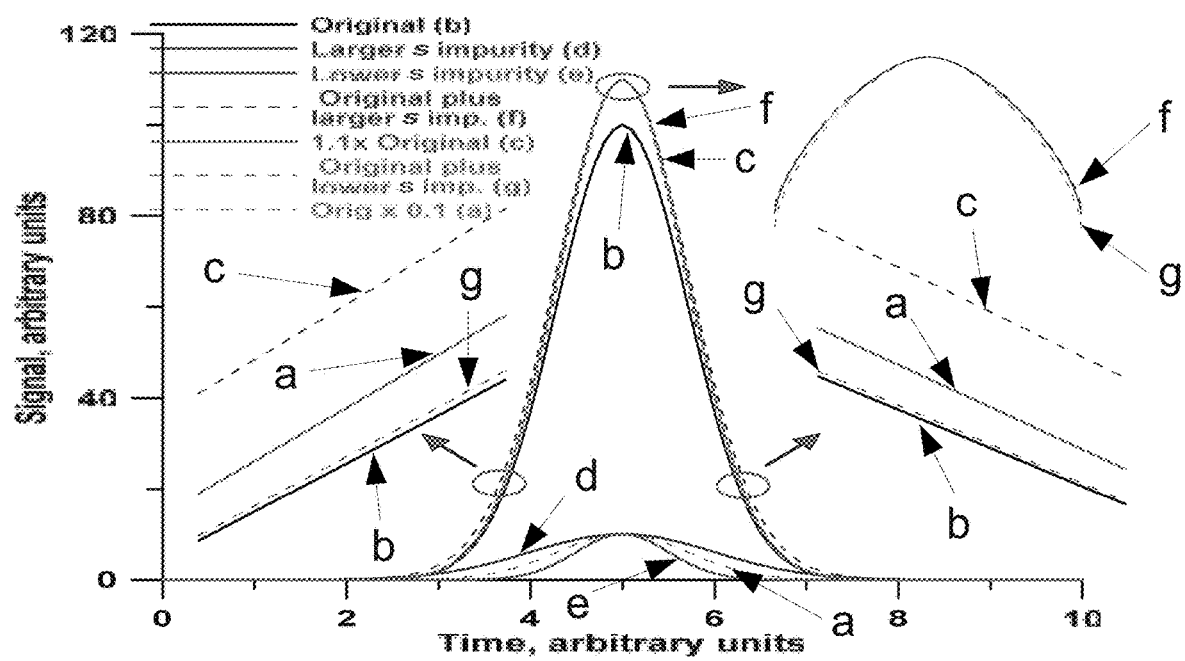
FIG. 19 illustrates a plot of an analyte and an impurity peak in accordance with some embodiments.

FIG. 19 illustrates a situation where the analyte and the impurity peak are both Gaussian and the impurity peak has a peak amplitude 10% of that of the principal analyte peak and both are centered at the same point in time in accordance with some embodiments. The original analyte (a) 10, (b) 100, and (c) 110 unit amplitudes are shown in dashed gray, solid black and solid gray traces; they are all centered at t=5 and have a SD of 1 arbitrary time unit. The sum of (a) and (b) thus results in (c). The impurities themselves are shown in the (d) solid blue and (e) solid red traces, both are centered at t=5 and have an amplitude of 10. The respective SDs are 1.41 and 0.71 units. The dashed blue (f) and dashed orange traces (g) are respectively the sum of (d) and (e), with (b). Indicated circled areas in magnified views: all four traces are seen: the outermost is (f), the innermost is (b) with (g) running very close to (b) and (f) considerably beyond (c). Near the top, however, trace (b) is so much lower than the rest that it is below the view of the amplified plot. Both trace (f) and (g) run extremely close to (c) near the top. It would be obvious that WBQ for either (f) or (g) at anywhere near $1/\bar{h}=0.9$ will predict an amplitude (and concentration) close to that of (c). Conversely applying WBQ for (f) and (g) respectively near $1/\bar{h}=0.2$ (near the circled areas) will produce a concentration prediction considerably beyond (c) and close to but slightly beyond (b), respectively. The analyte peak has a SD equal to 1 arbitrary unit of time; if the impurity peak had the same SD and was centered at the same time, the sum response would be theoretically and experimentally identical to the pure analyte peak 10% greater in concentration and of course there would be no possibility of impurity detection. Although in theory efficiencies should be analyte-independent and thus the SDs should be the same for all eluites at the same retention time, it is well-known that analyte-specific interactions often result in different degrees of peak broadening even if the retention times are the same. We therefore examine the effect of an impurity that has a SD a factor of √2 greater (s=1.41) or smaller (s=0.71) than that of the analyte peak. As noted, applying WBQ in both of these cases near $1/\bar{h}=0.9$ will result in a concentration prediction of 1.1x the original analyte concentration. In contrast, applying WBQ to the case of the peak containing the smaller SD impurity at $1/\bar{h}=0.2$, the predicted concentration will be only slightly greater than the original analyte concentration; whereas the larger SD impurity will provide a concentration prediction considerably greater than 1.1x the original analyte concentration. Subtle changes in shape of the peak due to the presence of the impurity will change WBQ-based concentration predictions differently at the top than at the bottom. For co-elution at the same retention time, WBQ predictions for a lower SD impurity at a higher $1/\bar{h}$ will mean a greater relative change in concentration compared to that at a lower $1/\bar{h}$ and the reverse would be the case when the SD of the impurity is higher than that of the analyte. With identical retention times, other factors remaining the same, increasing SD of the impurity will increase the width and thence the concentration prediction more and more at lower $1/\bar{h}$ values, whereas near the apex the contribution of the impurity will remain the same if its amplitude remains the same.

Figure 20:
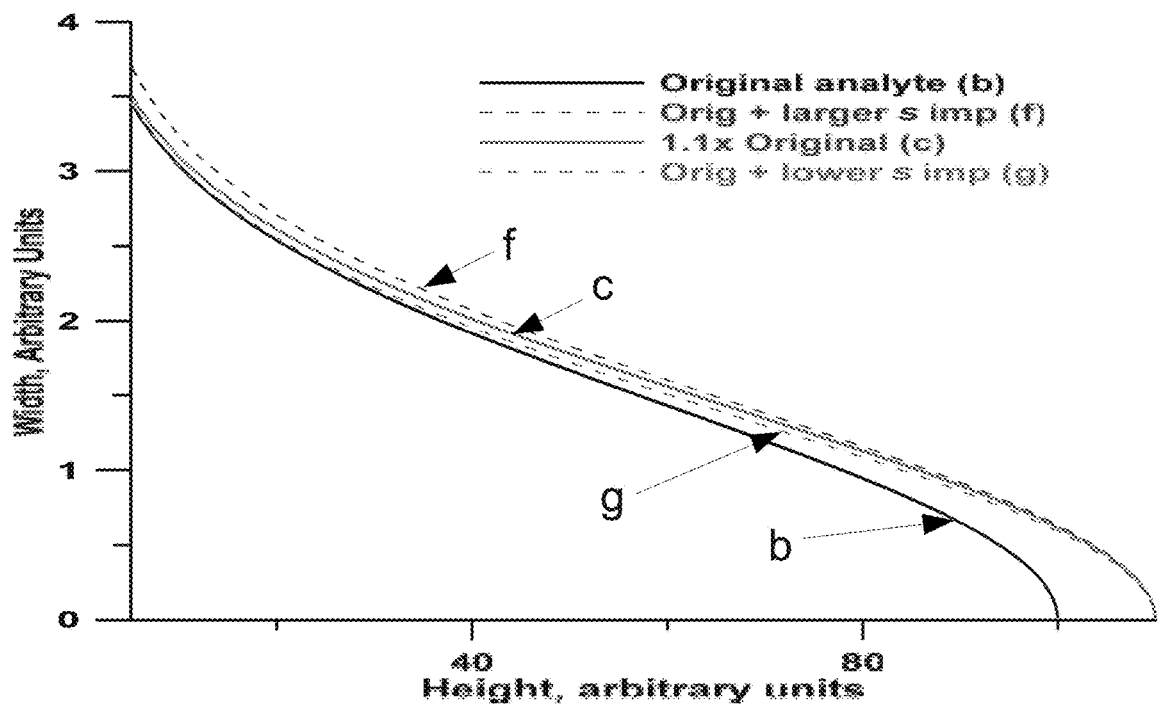
FIG. 20 illustrates a plot of width vs. height for the situation of FIG. 19 in accordance with some embodiments.

FIG. 20 illustrates a width vs. height plot for the situation in FIG. 19 in accordance with some embodiments; the same conclusions are reached. The width is plotted as a function of height covering approximately $1/\bar{h}=0.05$-0.95. It can be readily observed that at high height both (f) and (g) are very close to (c), but at low heights (g) becomes close to (b) (predicted concentration decreases) while (f) goes beyond (c) (predicted concentration increases).

Impurity with Different Retention Time.

Figure 21:
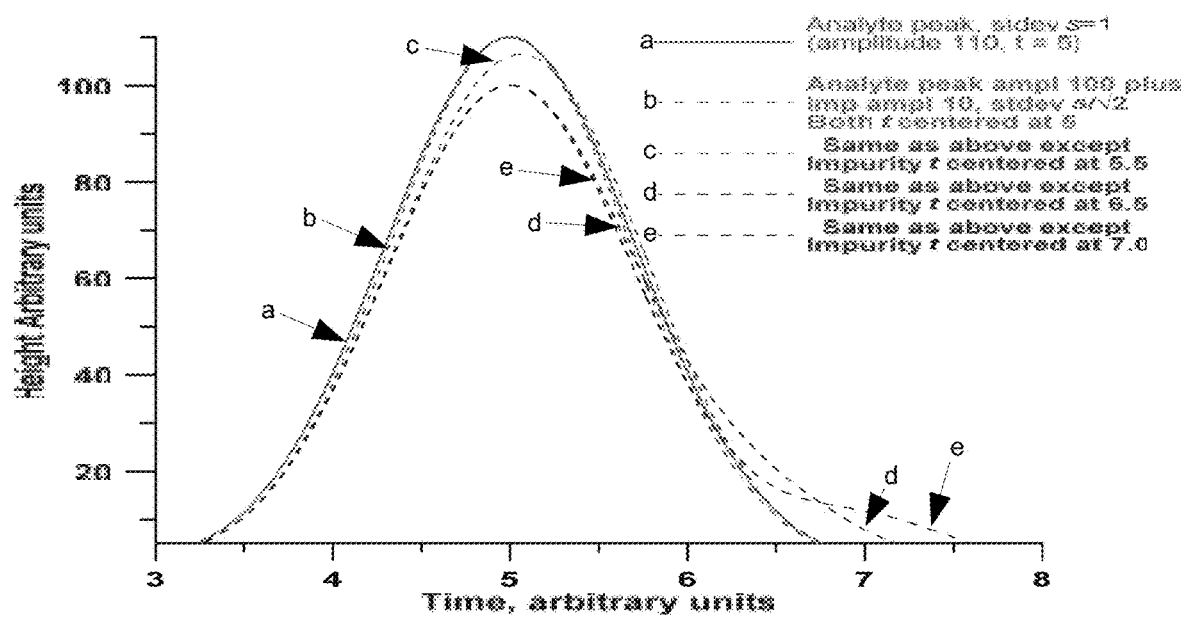
FIG. 21 illustrates a plot of an analyte and an impurity peak in accordance with some embodiments.

As the impurity retention time moves away from the analyte retention time, the contribution of the impurity towards widening the width towards the bottom of the peak increases, all other factors (impurity amplitude and SD remaining the same). For the case discussed in FIG. 19, FIG. 21 illustrates the situation if we increase the retention of the SD=0.71 impurity (trace (e)) by 0.5, 1.5 and 2 units in accordance with some embodiments. FIG. 21 illustrates changes in peak shape as impurity retention time shifts relative to analyte retention time. The impurity peak is assumed to be 10% in amplitude and has 0.71 times the SD of the analyte peak. The presence of an impurity is unlikely to be suspected by a casual observer for all but the brown trace. From the depiction of the peak shapes it becomes clear that detection of the impurity becomes easier. With a 0.5 SD shift, WBQ towards the bottom may not shift very much from 1.1x the original, but WBQ at the top will provide a much lower value. Further shift of the impurity to +1.5 and +2SD units will make WBQ produce the original concentration of the analyte at the top while at the bottom WBQ will predict concentrations considerably beyond the 1.1x original value. In all of these cases, if in the original situation with no impurity being present, the ratio of the concentrations predicted from WBQ at a specific low $1/\bar{h}$ to that at a specific high $1/\bar{h}$ is x (ideally, for a peak conforming to the GGDM, x=1), in the presence of the impurity the new ratio is going to be greater than x. If the retention time of the impurities shifts in the other direction, essentially, we will have constructed a mirror image of FIG. 21. The conclusions will be the same: The larger the differences in the retention times of the analyte and the impurity, the greater will be the difference between WBQ-predicted concentrations based on high and low heights, the latter generally predicting a greater value. It is also evident that the greater the difference in the retention time, the more likely it is that the presence of the impurity can be visually discerned.

Detection of Impurities from Width Ratios at Multiple $\bar{h}$.

For a truly Gaussian peak, it is readily derived from the general expression of width as a function of $\bar{h}$ that:

$$W_{h1}/W_{h2} = \sqrt{\frac{\ln \bar{h}_1}{\ln \bar{h}_2}}. \qquad (20)$$

Thus, for example, the width ratio for $\bar{h}=0.2$ and 0.8 may readily be calculated to be 2.686 for a Gaussian peak. As discussed above with reference to Equation (10), the master equation for chromatographic peaks following the GGDM is:

$$W_h = p(\ln \bar{h})^q.$$

In this case because the exponent q in the GGDM is not known a priori, width determination at least three different heights are needed to attain a constant numerical value, it can be readily shown that for any peak obeying the GGDM, the terms $\ln (W_{h1}/W_{h2})/\ln(W_{h3}/W_{h2})$ or $\ln (W_{h1}/W_{h2})/\ln (W_{h3}/W_{h4})$ are readily derivable constants that may be computed from the specific values of $\bar{h}_r$ chosen. We derive, for example, $\ln (W_{h0.2}/W_{h0.4})/\ln(W_{h0.4}/W_{h0.8})$ is expected to be 0.3988. This is essentially a shape criterion. Even if a peak does not perfectly follow the GGDM, we suggest that $\ln (W_{h0.2}/W_{h0.4})/\ln(W_{h0.4}/W_{h0.8})$ or a similar parameter be determined for calibration standard peaks nearest to, or bracketing the height of the peak suspected to contain an impurity. The corresponding value for the suspect peak can then be compared with that for the standard(s), including the uncertainty and it can be determined whether within the desired limits of uncertainty the suspect peak falls within the expected shape parameter range. As this approach does not require detailed calibration curves, its use is illustrated below in impurity detection.

Illustrative Example. Bromide Peaks with a Nitrate Impurity

Figure 22:
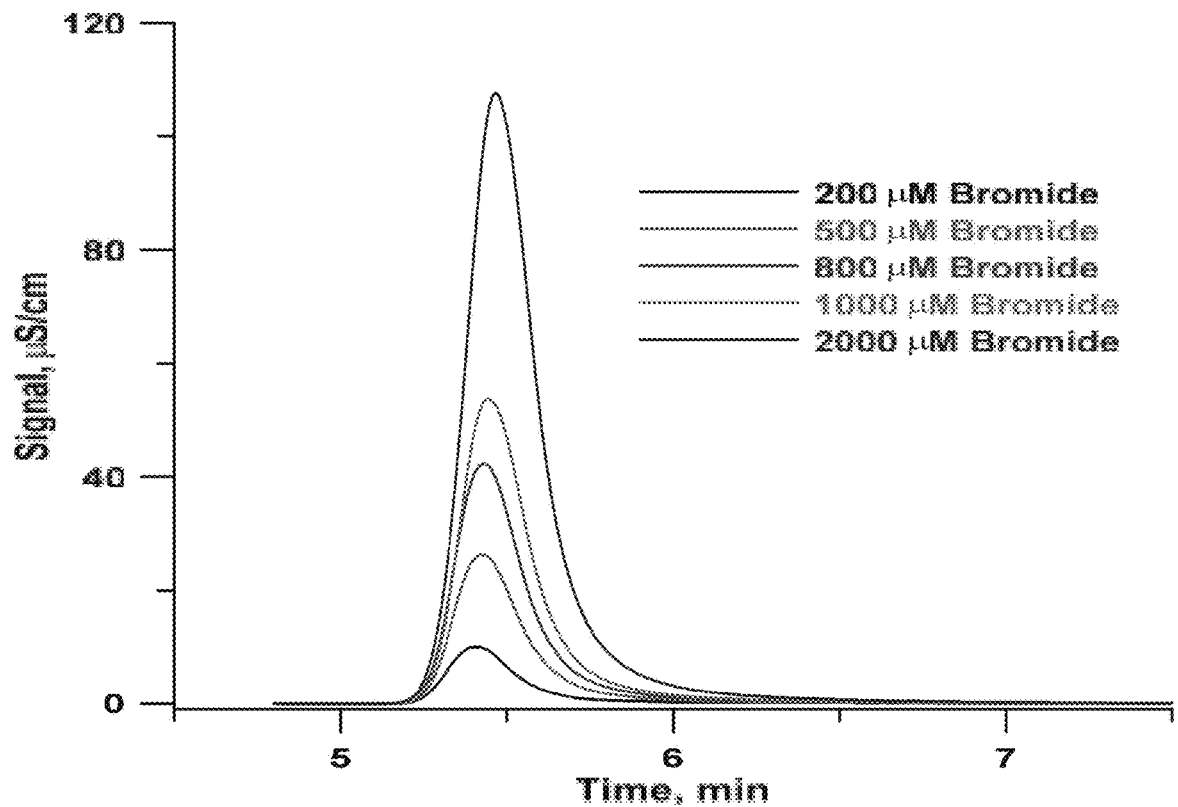
FIG. 22 illustrates a plot of a set of chromatograms for a bromide ion in accordance with some embodiments.
Figure 23:
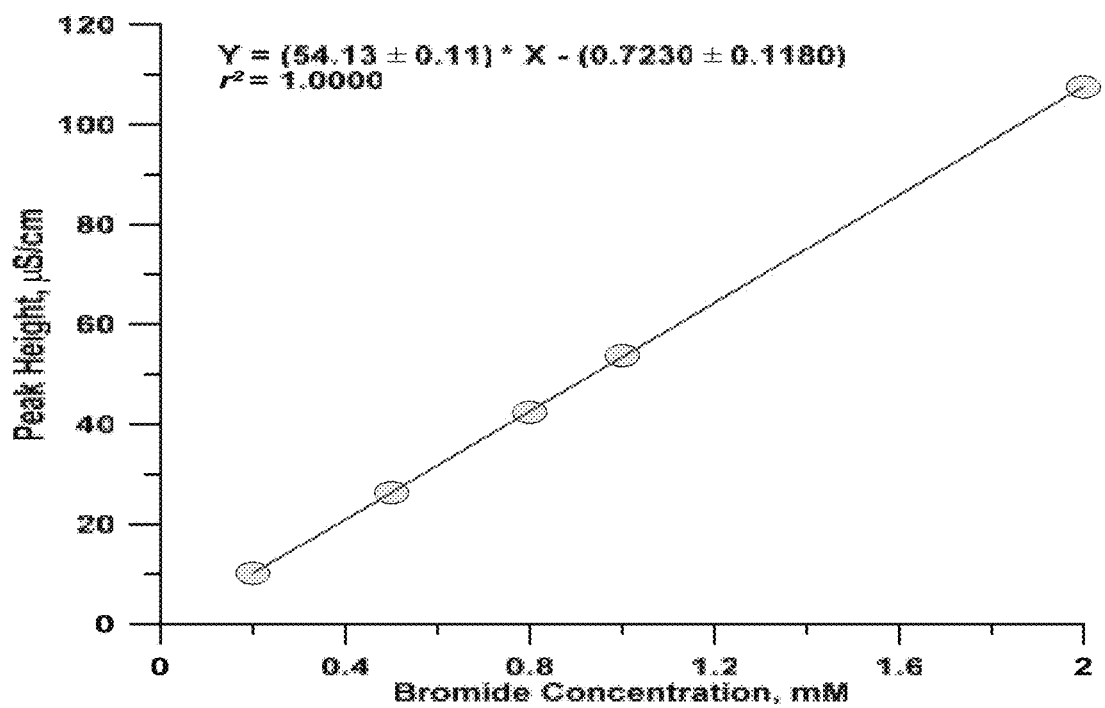
FIG. 23 illustrates a height-based calibration plot for the data in FIG. 22 in accordance with some embodiments.

FIG. 22 illustrates a set of chromatograms from an injection of bromide ion at concentrations of 200, 500, 800, 1000 and 2000 µM in a typical suppressed ion chromatographic setup in accordance with some embodiments. Chromatographic conditions: ThermoFisher Dionex ICS-5000 system, AG20 (2×50 mm)+AS20 (2×250 mm), Electrogenerated KOH eluent 8.0 mM, 0.25 mL/min, Dionex AERS 500 2 mm suppressor. This is a typical response set for this type of chromatogram, either the height or area data has an excellent linear correlation with concentration, but has a statistically significant negative intercept. WBQ relies at least in part on isomorphic peak shape regardless of concentration. Also, see FIG. 23, illustrating a height-based calibration plot for the data in FIG. 22 in accordance with some embodiments.

Figure 24:
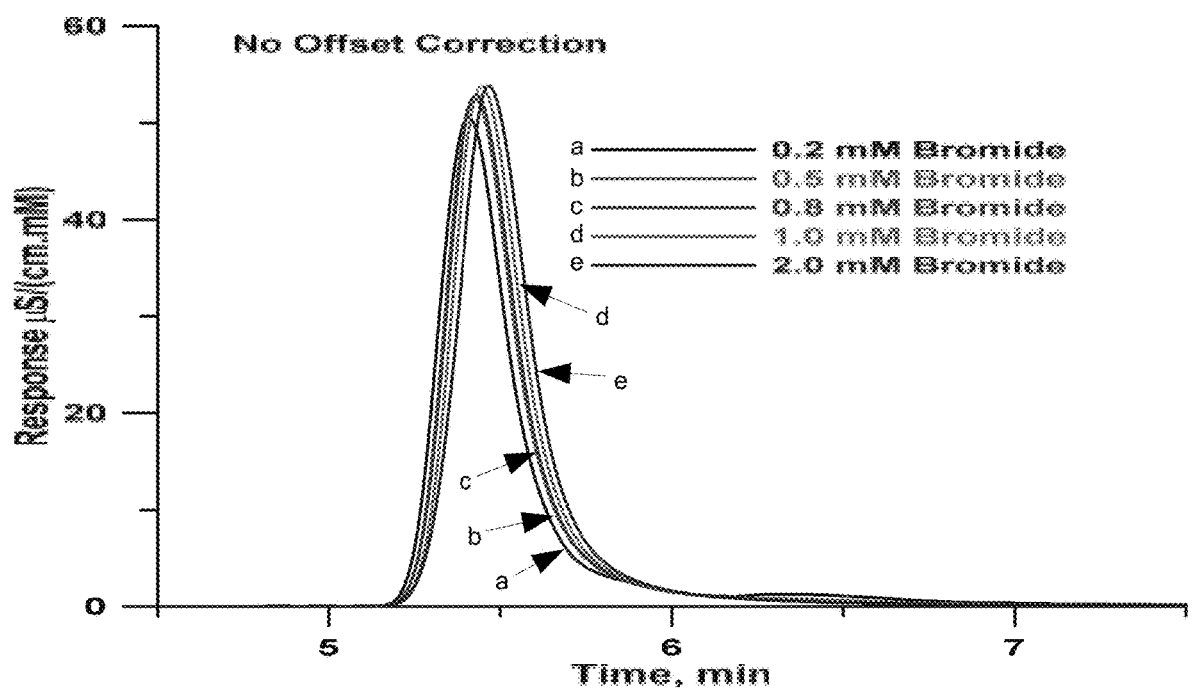
FIG. 24 illustrates a plot of peak shape conformity in accordance with some embodiments.
Figure 25:
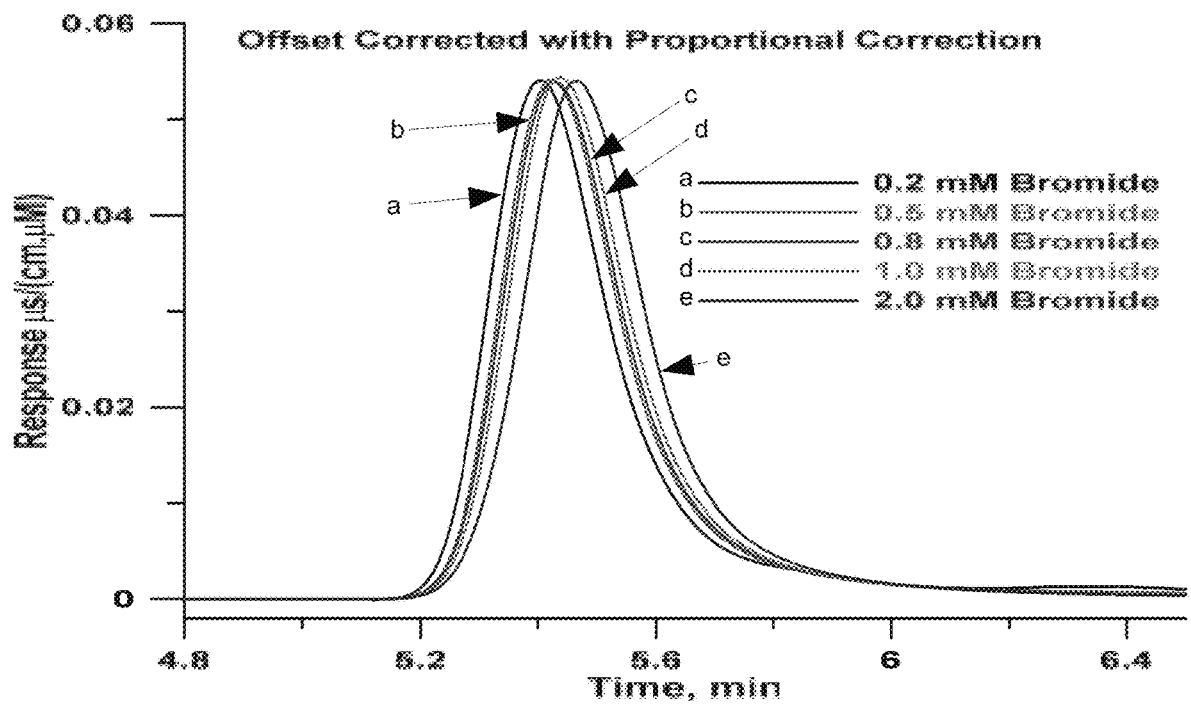
FIG. 25 illustrates a plot of peak shape conformity with offset corrections according to some embodiments.

Comparing the chromatographic responses after dividing by the injected concentration shows nearly isomorphic peaks. FIG. 24 shows that peak shape conformity at different concentrations as obtained by dividing the chromatographic response by the injected concentration is reasonable but not perfect because of the significant zero intercept in accordance with some embodiments. After proportional correction for this intercept, the isomorphism is nearly perfect as seen in FIG. 25 in accordance with some embodiments. The offset correction is performed by applying a proportionate correction for each chromatogram: plotted ordinate value= (original value–zero intercept/$\bar{h}$)/injected concentration. The amplitudes all match, albeit minor shifts in the peak retention time can be observed.

Figure 26:
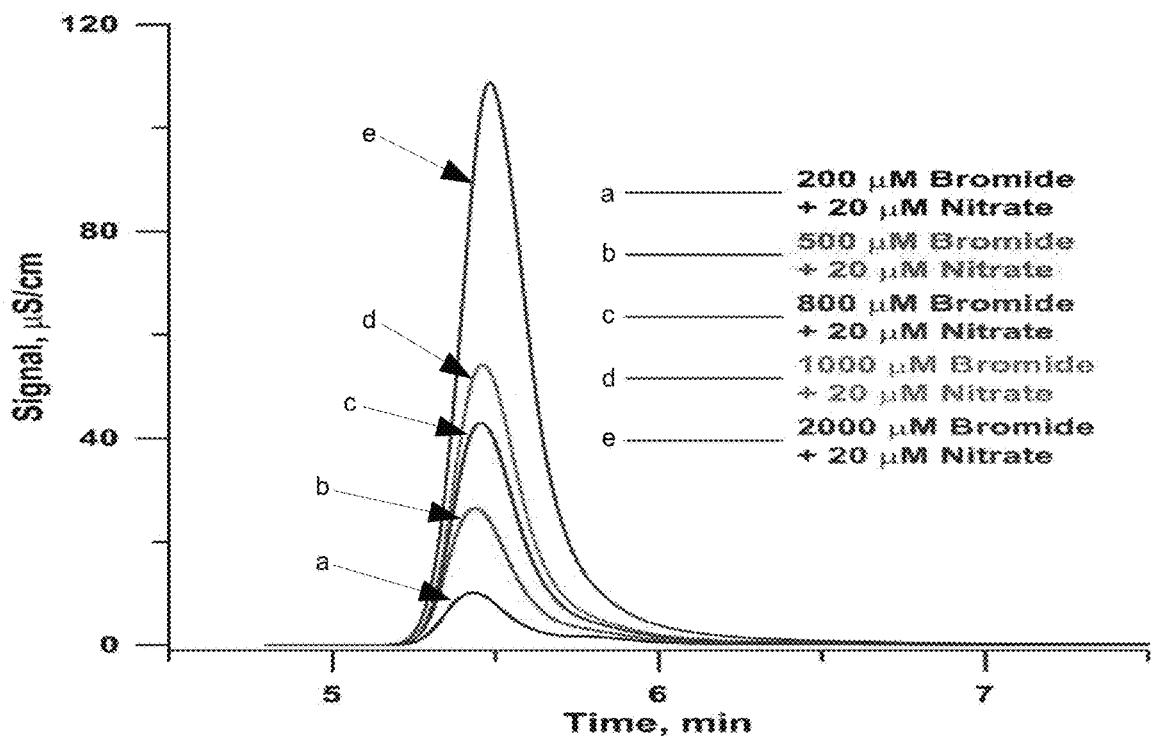
FIG. 26 illustrates a plot of a set of chromatograms for bromide samples in accordance with some embodiments.

FIG. 26 illustrates the chromatograms for the same bromide samples except that they now contain the same constant concentration of nitrate (20 µM) as impurity, the relative amount thus being 1-10% on a relative molar basis. With the possible exception of the 10% case, the presence of the impurity is not readily discernible by visual examination. Table 6 below presents data on impurity detection based on this criterion (the numbers in red in the last column indicate values outside the 95% confidence range and hence that peak shapes are different from that of the standards: an impurity may be present). It will be observed that this strategy was able to detect a change in peak shape (and hence a presence of an impurity) in all but the three cases where the impurity concentration was the lowest (in the 1-2% range). When the confidence limits are improved by running more standards or if the width at $\bar{h}=0.2$ is replaced by a measurement at $\bar{h}=0.1$ where the width is more affected by the presence of an impurity, the remaining three cases are also identified as statistical outliers.

TABLE 6

Detection of Impurity based on Shape Criterion $\ln (W_{h0.2}/W_{h0.4})/\ln(W_{h0.4}/W_{h0.8})$ 95% Confidence range Concn, mM ID

| Standards Concn, mM ID | $W_{0.2}$ | $W_{0.4}$ | $W_{0.8}$ | $\ln (W_{h0.2}/W_{h0.4})/\ln (W_{h0.4}/W_{h0.8})$ | $\ln (W_{h0.2}/W_{h0.4})/\ln (W_{h0.4}/W_{h0.8})$ | suspects | $W_{0.2}$ | $W_{0.4}$ | $W_{0.8}$ | $\ln (W_{h0.2}/W_{h0.4})/\ln (W_{h0.4}/W_{h0.8})$ |
|---|---|---|---|---|---|---|---|---|---|---|
| 0.2 a | 0.3648 | 0.2589 | 0.1248 | 0.4699 | 0.4590-0.4928 | nom 0.2 a | 0.3812 | 0.2585 | 0.1231 | 0.5236 |
| 0.2 b | 0.3656 | 0.2583 | 0.1256 | 0.4818 | | nom 0.2 b | 0.3833 | 0.2603 | 0.125 | 0.5276 |
| 0.5 a | 0.3666 | 0.2593 | 0.1263 | 0.4814 | 0.4742-0.4964 | nom 0.5 a | 0.3775 | 0.2619 | 0.1261 | 0.5002 |
| 0.5 b | 0.3688 | 0.2599 | 0.1271 | 0.4892 | | nom 0.5 b | 0.3764 | 0.2613 | 0.1263 | 0.5020 |
| 0.8 a | 0.3692 | 0.2611 | 0.127 | 0.4807 | 0.4762-0.4901 | nom 0.8 a | 0.3757 | 0.2616 | 0.1275 | 0.5037 |
| 0.8 b | 0.3698 | 0.2611 | 0.1275 | 0.4856 | | nom 0.8 b | 0.377 | 0.2627 | 0.1277 | 0.5008 |
| 1.0 a | 0.3715 | 0.2624 | 0.1265 | 0.4765 | 0.4672-0.4961 | nom 1.0 a | 0.3776 | 0.2634 | 0.1274 | 0.4959 |
| 1.0 b | 0.3708 | 0.2619 | 0.1282 | 0.4867 | | nom 1.0 b | 0.3769 | 0.2631 | 0.1279 | 0.4983 |
| 2.0 a | 0.3789 | 0.2655 | 0.1264 | 0.4792 | 0.4778-0.4822 | nom 2.0 a | 0.3836 | 0.2671 | 0.1259 | 0.4813 |
| 2.0 b | 0.3789 | 0.2655 | 0.1267 | 0.4808 | | nom 2.0 b | 0.3842 | 0.2675 | 0.1261 | 0.4814 |
| 0.3 a | 0.3626 | 0.2580 | 0.1254 | 0.4722 | 0.4621-0.4931 | | | | | |
| 0.3 b | 0.3640 | 0.2588 | 0.1278 | 0.4831 | | | | | | |
| 0.6 a | 0.3634 | 0.2579 | 0.1256 | 0.4767 | 0.4748-0.4775 | | | | | |
| 0.6 b | 0.3640 | 0.2587 | 0.1261 | 0.4757 | | | | | | |
| 0.9 a | 0.3650 | 0.2584 | 0.1259 | 0.4804 | 0.4782-0.4849 | | | | | |
| 0.9 b | 0.3668 | 0.2596 | 0.1269 | 0.4828 | | | | | | |

TABLE 6-continued

Detection of Impurity based on Shape Criterion In $(W_{h0.2}/W_{h0.4})$/In$(W_{h0.4}/W_{h0.8})$ 95% Confidence range Concn, mM ID

| | | | | | |
|---|---|---|---|---|---|
| 1.5 a | 0.3695 | 0.2606 | 0.1262 | 0.4814 | 0.4759-0.4840 |
| 1.5 b | 0.3706 | 0.2618 | 0.1267 | 0.4786 | |

| Standards Concn, mM ID | $W_{0.1}$ | $W_{0.4}$ | $W_{0.8}$ | In $(W_{h0.1}/W_{h0.4})$/In $(W_{h0.4}/W_{h0.8})$ | In $(W_{h0.1}/W_{h0.4})$/In $(W_{h0.4}/W_{h0.8})$ | suspects | $W_{0.2}$ | $W_{0.4}$ | $W_{0.8}$ | In $(W_{h0.1}/W_{h0.4})$/In $(W_{h0.4}/W_{h0.8})$ |
|---|---|---|---|---|---|---|---|---|---|---|
| 1.0 a | 0.4848 | 0.2624 | 0.1265 | 0.8414 | 0.8255-0.8737 | nom 1.0 a | 0.5173 | 0.2634 | 0.1274 | 0.9292 |
| 1.0 b | 0.4835 | 0.2619 | 0.1282 | 0.8583 | | nom 1.0 b | 0.5166 | 0.2631 | 0.1279 | 0.9354 |
| 2.0 a | 0.4955 | 0.2655 | 0.1264 | 0.8408 | 0.8364-0.8497 | nom 2.0 a | 0.5130 | 0.2671 | 0.1259 | 0.8677 |
| 2.0 b | 0.4962 | 0.2655 | 0.1267 | 0.8455 | | nom 2.0 b | 0.5127 | 0.2675 | 0.1261 | 0.8650 |

Detection of Impurities from Width$^n$ vs. Ln h Plots.

Equation (10) is readily rewritten in the form $$W_h^{1/q} = p^{1/q} \ln h_{max} - p^{1/q} \ln h \quad (21)$$

which can be more simply written as:

$$W_h^n = a \ln h + b \quad (22)$$

Figure 27:
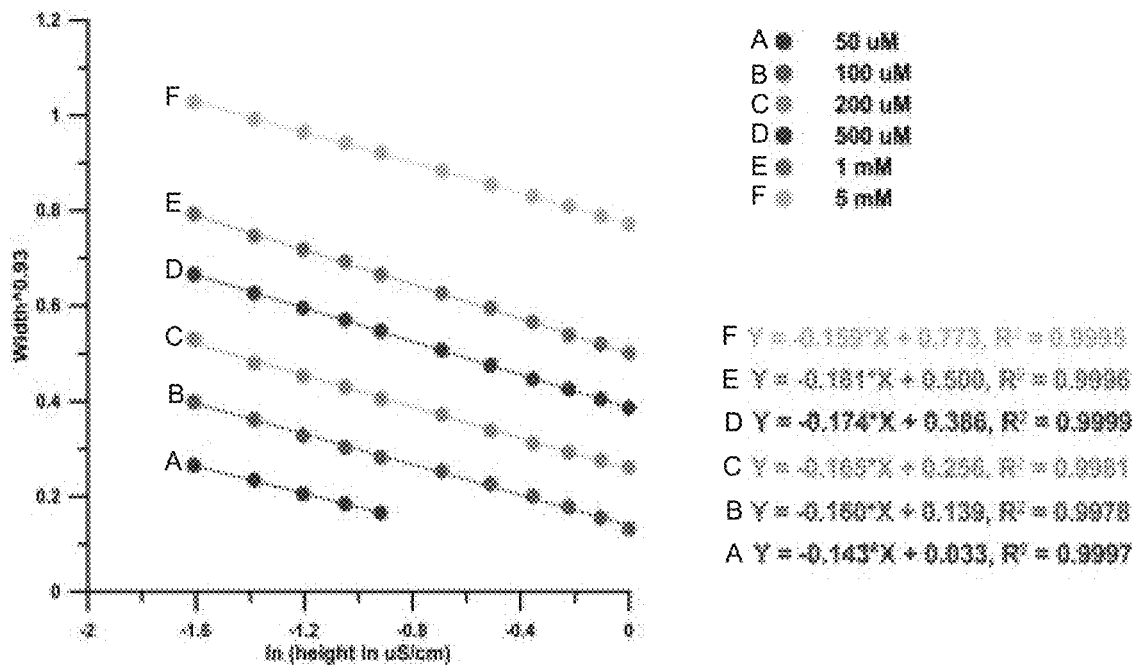
FIG. 27 illustrates a plot of the data for chloride of FIG. 11 in accordance with some embodiments.
Figure 28:
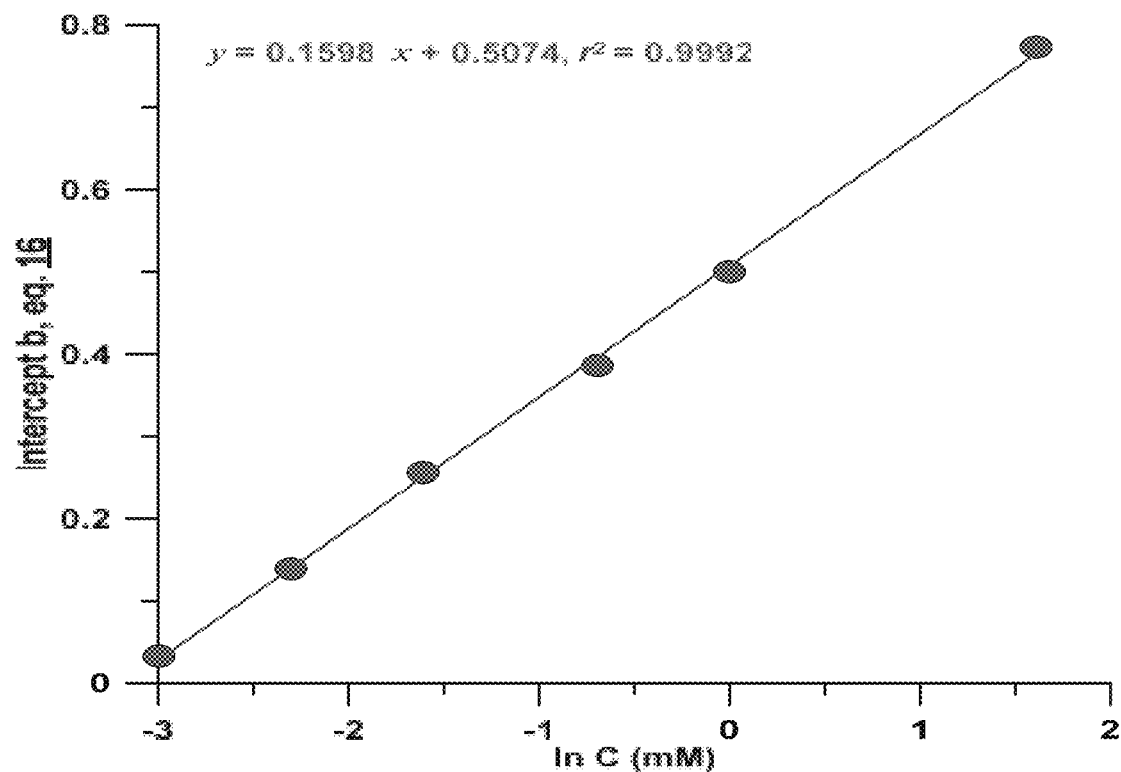
FIG. 28 illustrates a plot of the intercepts of the data of FIG. 27 in accordance with some embodiments.

Further, recognizing that in the linear response domain, $h_{max}$ is linearly related to the concentration C, the intercept b is related to the logarithm of the concentration. FIG. 27 illustrates the data for chloride in FIG. 11 along with the best fit equations in accordance with some embodiments; the data is plotted in the form of Equation (20), a linear plot results throughout. In addition, the intercept b in Equation (20) should be linearly proportional to ln C provided the data is entirely in the linear response domain. FIG. 28 illustrates the plot of the intercepts (b) in FIG. 27 vs. ln C, displaying that the correspondence of b with ln C also holds an excellent linear correlation.

Figure 29:
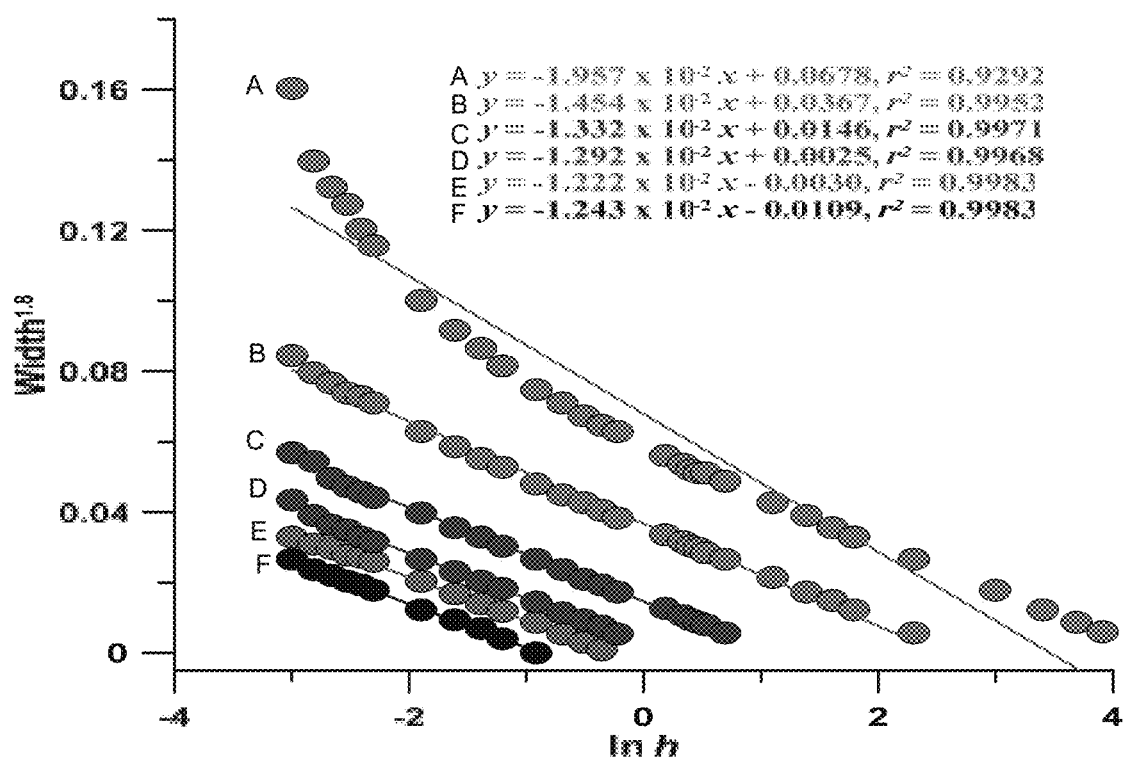
FIG. 29 illustrates a plot of chromatographic data for caffeine in accordance with some embodiments.

Chromatographic data for caffeine over a very large concentration range was generated to test the performance of a high dynamic range photodiode array spectrometer that uses two different path length cells to accomplish this objective. Neglecting those below the limit of detection, the remaining data spanned injected amounts of 0.2 to 100,000 ng, spanning 5.7 orders of magnitude. We compare here data only over 2.3 order of magnitude as shown in FIG. 29 (Caffeine chromatographic data plotted in the form of Equation (20). Column: Agilent Eclipse XDB-C18, 4.6×150 mm, 5 μm), to be comparable with the chloride data in FIG. 27. It is obvious that there is increasing departure from linearity as one approaches the top left quadrant of the plot (width measurement at a low height for higher concentrations), these are the conditions in which the relative importance of a late or early eluting impurity is enhanced.

Figure 30:
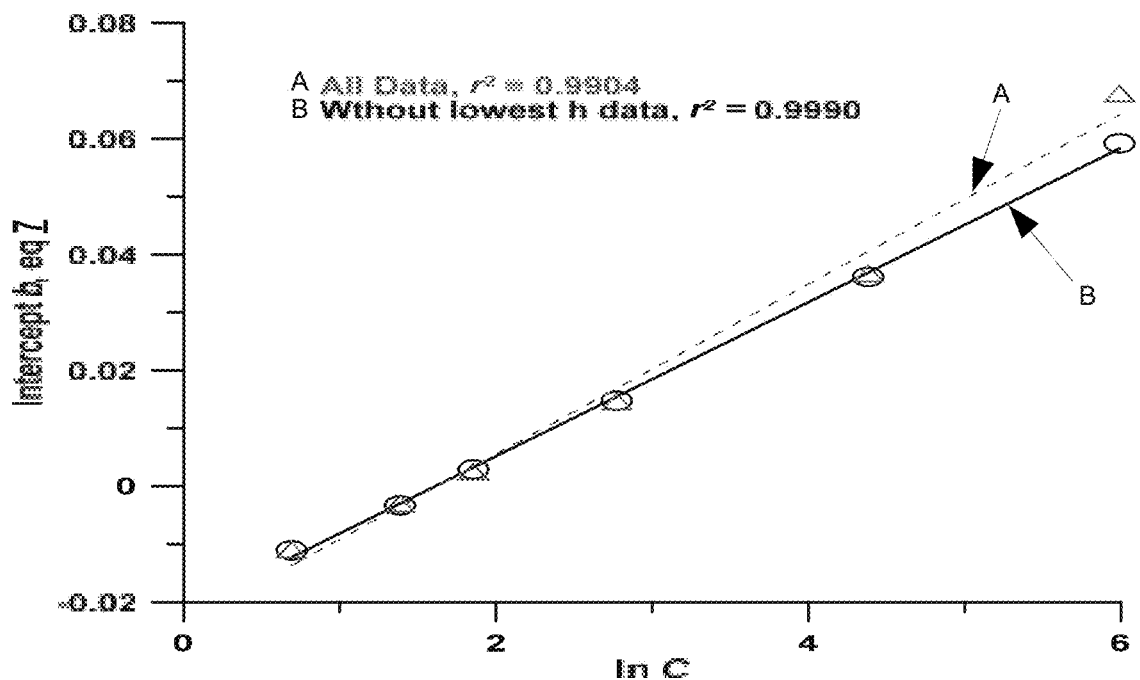
FIG. 30 illustrates a plot of linear correspondence in accordance with some embodiments.

FIG. 30 illustrates that the linear correspondence between the intercept b and ln C also breaks down in accordance with some embodiments. This plot is similar to that in FIG. 28. When all the data (red triangles) are used in the regressions done in FIG. 29, deviation from linearity at the higher concentration end is evident. If the data in the top left quadrant of FIG. 29 are omitted before performing regression (black circles), a much better linear fit is obtained. In the caffeine chromatograms, the impurity is invisible when the caffeine peak is plotted to accommodate the maximum peak height but becomes readily apparent when observed in a magnified view of the baseline being measured.

Figure 31:
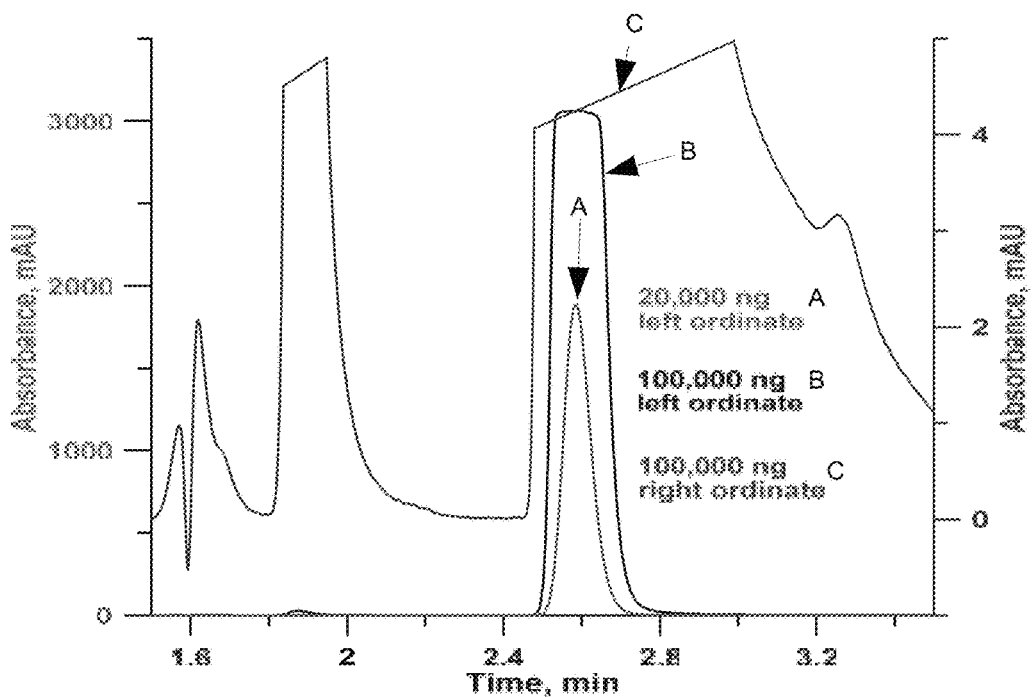
FIG. 31 illustrates a plot of chromatographic data impurity detection in accordance with some embodiments.

FIG. 31 illustrates how the trace at 20,000 ng (red trace A) would appear to be a perfectly normal peak. The detector is predictably saturated at 10,000 ng (black trace B), but no abnormality is readily evident on its tail; only when examined at a high magnification (blue trace C), the appearance of an impurity peaking at just over 3.2 min becomes readily apparent. It is clear that width measurement at low heights in the present case will lead to error. Indeed, the failure of the caffeine data to fit the general model in Equations (10) and (21)-(22) is what led us to examine the baseline of the high concentration peaks in greater detail. In other words, efforts to WBQ quantitation led to the detection of this impurity, of which those that generated the data were unaware.

In FIG. 27 or FIG. 29, the best fit value of the exponent n was determined by an a priori independent fitting effort using Microsoft Excel Solver.™ As in Equation (19), and FIG. 18, the presence of an impurity can be directly tested by a plot of ln $W_h$ as a function of ln (ln $\bar{h}$). This is demonstrated using data from others who separated various dimethylnaphthalenes by gas chromatography using a vacuum ultraviolet absorbance detector. The separation of the isomers was often less than ideal; others demonstrated deconvolution of the composite responses using the differences in the spectra.

Figure 32A:
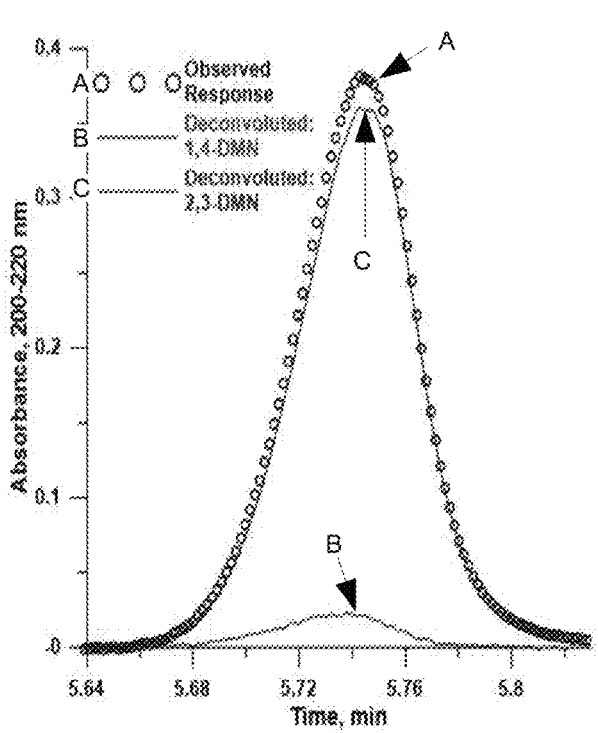
FIGS. 32A and 32B illustrate paired plots of the separation of isomers by Gas Chromatography Vacuum Ultraviolet Spectroscopy on the left panel and purity analysis plots for the same on the right in accordance with some embodiments.
Figure 32B:
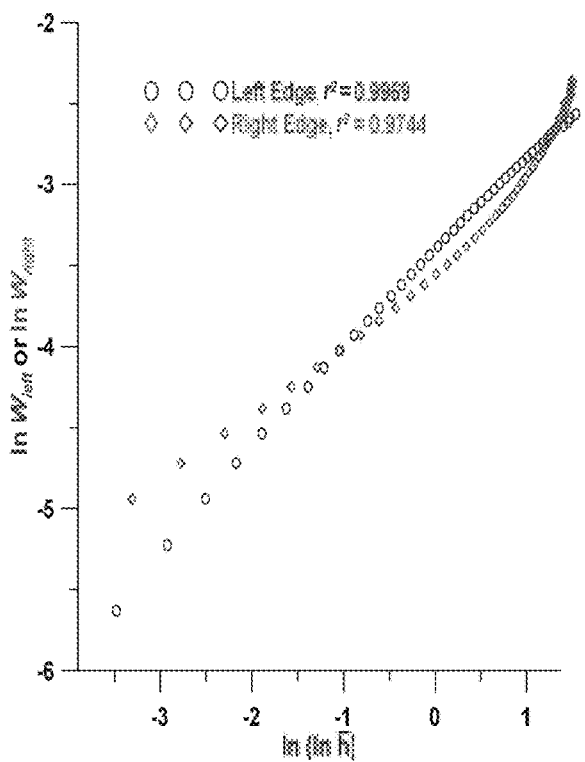

FIG. 32A illustrates the separation of Dimethylnaphthalene (DMN) isomers by Gas Chromatography Vacuum Ultraviolet Spectroscopy (from Schenk, J.; Mao, J. X.; Smuts, J.; Walsh, P.; Kroll, P.; Schug, K. A. *Anal. Chim. Acta* 2016, 945, 1-8). The mixture contained 10% 1,4-DMN and 90% 2,3-DMN. The circles represent the detector response with the red and blue lines representing best estimates on the response of each isomer based on spectral deconvolution. FIG. 32B illustrates independent left and right edge ln $W_h$ vs. ln (ln $\bar{h}$) plots to aide in the detection of impurity. Approaching a different slope at low $\bar{h}$ (top right of the plot) is an indication of possible existence of an impurity. The effective data rate is below 10 Hz, not adequate for ideal width based analysis. The abscissa scale spans 1/$\bar{h}$=0.98 on the left to 1/$\bar{h}$=0.02 on the right.

Absorption Spectrum Reconstruction Despite Detector Saturation.

Figure 33:
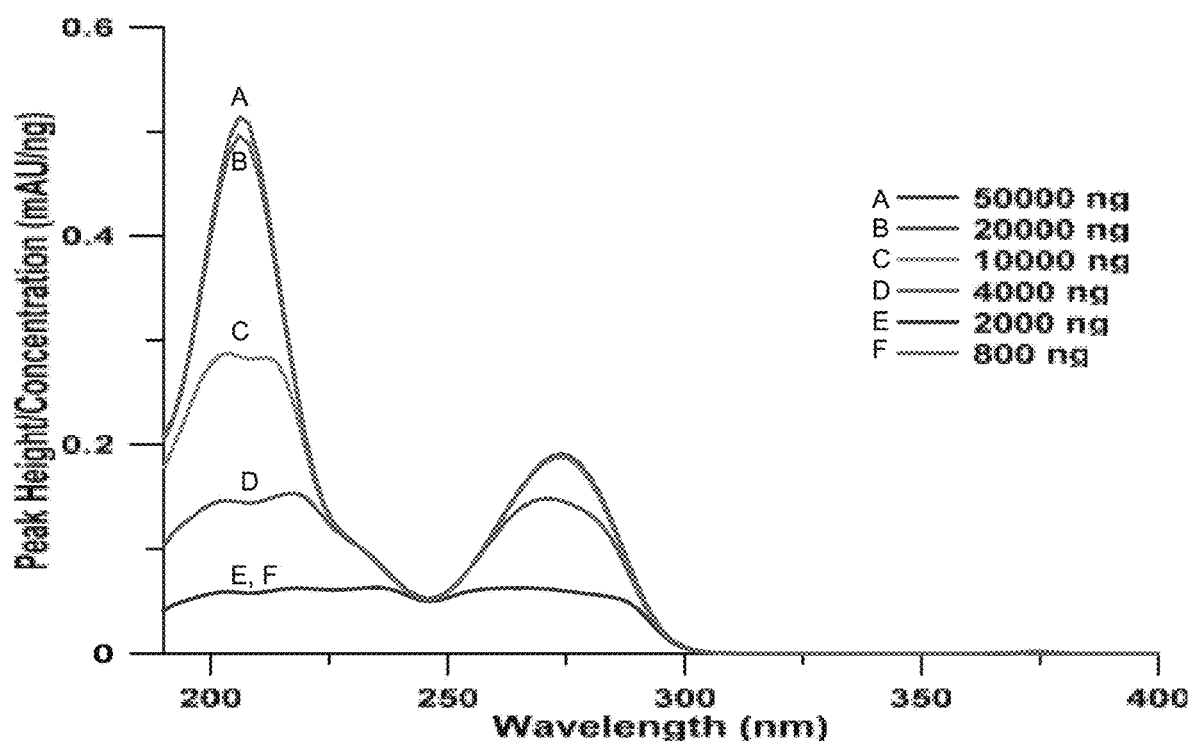
FIG. 33 illustrates a plot of normalized spectra obtained from peak height maxima at different wavelengths in accordance with some embodiments.

A photodiode array UV-VIS absorbance detector is one of the most common detectors used in high performance liquid chromatography (HPLC) and has the capability of providing an absorption spectrum of the analyte "on the fly", by taking a spectral snapshot as the eluite passes through the detector. As the absorption spectrum is unique to a particular molecule, availability of the spectrum aids in eluite identification or confirmation of the putative identity. A process for obtaining the spectrum is to simply plot the maximum absorbance (peak height) observed at different wavelengths as a function of the wavelength and this may be then optionally normalized by dividing by the sample volume (or mass, if known) injected. Obviously, if detector saturation occurs at one or more wavelengths, an accurate rendition of the spectrum is not possible. FIG. 33 illustrates normalized spectra obtained from peak height maxima at different wavelengths as described above when different amounts of solute (caffeine) are injected in a chromatographic system. The spectra at 800 ng and 2000 ng are completely overlapped and do not show any evidence of detector saturation. In contrast, by 10,000 ng there is clearly detector saturation at $\lambda \leq 225$ nm. The data makes it obvious that at higher injected amounts the spectra cannot be accurately reconstructed from this approach. Peak maxima absorbance-based reconstruction can be done in other ways. One approach is to move away from the peak maximum to a location on the rising or the trailing edge of the peak where there is no saturation. The latter approach is workable but its accuracy becomes increasingly suspect as chromatographic efficiency is steadily increasing. Presently sub-second separations are being reported. Peaks are becoming increasingly sharper with the temporal rate of change of composition in the cell becoming steeper and steeper on the edges of the peak with the attendant problem of capturing a sharp snapshot of a fast-moving object traversing the field of view. In addition, the probability that the spectra will be affected by some undiscovered impurity increases as one moves away from the peak maximum. A second approach is based on the fact that in the absence of detector saturation/nonlinearity, the peak shape will be the same regardless of the monitoring wavelength, only the ordinate scaling will vary. Another way to state this is that the depiction of a peak with time as the abscissa and $1/\bar{h}$ (rather than absolute absorbance) as the ordinate is identical for wavelengths in the absence of detector aberrations. For a truncated peak, the absorbance maximum can be calculated from any value of t where the absorbance is within the normal range and the previously determined value of $1/\bar{h}$ at that value of t.

Spectral reconstruction based on shape recognition/WBQ embodiments can be carried out in several ways, all based on the implicit basis of WBQ that the GGDM fits one or both edges of the peak as given in Equation (8). If the chromatographic peak for the non-truncated peak is presented as $1/\bar{h}$ vs. time, the appropriate form of Equation (8) here will be:

$$\bar{h} = \begin{cases} e^{\frac{|t|^m}{a}}, & t < 0 \\ e^{\frac{t^n}{b}}, & t \geq 0 \end{cases} \quad (23)$$

The exact temporal position of the peak (to define t=0) will be known from the chromatogram monitored for a non-truncated peak and these data can be fitted for the best values of a, b, m, and n. For some wavelength at which the peak is truncated at t=0, true $h_{max}$ at t=0 can be projected from either side of the peak using the obverse of Equation (23), using any value of h and t but preferably using a high enough value of h (0.5-1 AU), far enough above baseline noise issues but below the onset of detector nonlinearity:

$$h_{max} = \begin{cases} h*e^{\frac{|t|^m}{a}}, & t < 0 \\ h*e^{\frac{t^n}{b}}, & t \geq 0 \end{cases} \quad (24)$$

Another approach uses the best fit values of a, b, m, and n that has been determined above and rather than use a single value, uses multiple h vs. t values in a region of data in the truncated peak where h is high enough to be well above the noise floor (but not in the nonlinear region, e.g., h=0.5-1 AU). The best fit of the h vs. t data to Equation (24) is sought by varying $h_{max}$, which is implicit in $\bar{h}$ using any nonlinear fitting routine e.g., Microsoft Excel Solver™.

Another approach, broadly the same as the one above, does not use previously determined values of the fit parameters. Rather, it utilizes the linear forms of Equations (25a, 25b) below:

$$\ln(\ln \bar{h}) = m \ln(-t) - \ln a, t < 0 \quad (25a)$$

$$\ln(\ln \bar{h}) = n \ln t - \ln b, t > 0. \quad (25b)$$

Again, implicit in the expression of $\bar{h}$ is $h_{max}$, which is not known. The fitting routine then varies $h_{max}$ simultaneously for both the ascending and descending sides of the data to obtain the best linear $r^2$.

Figure 34:
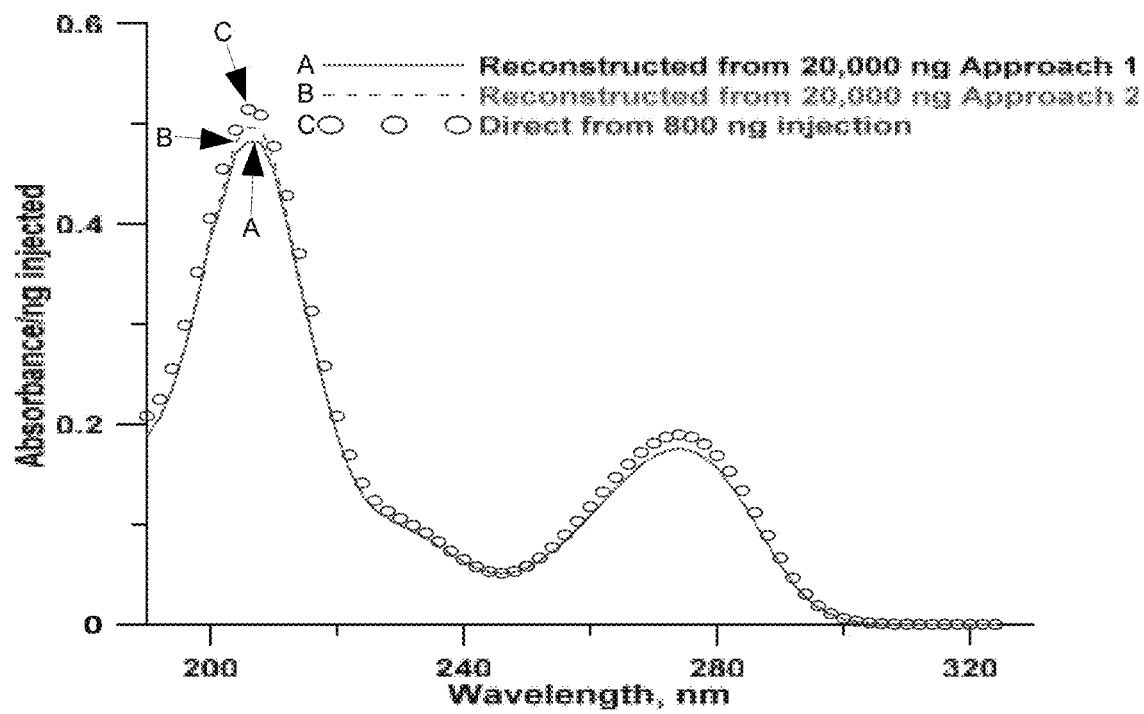
FIG. 34 illustrates a plot of spectrum reconstruction in accordance with some embodiments.
Figure 35:
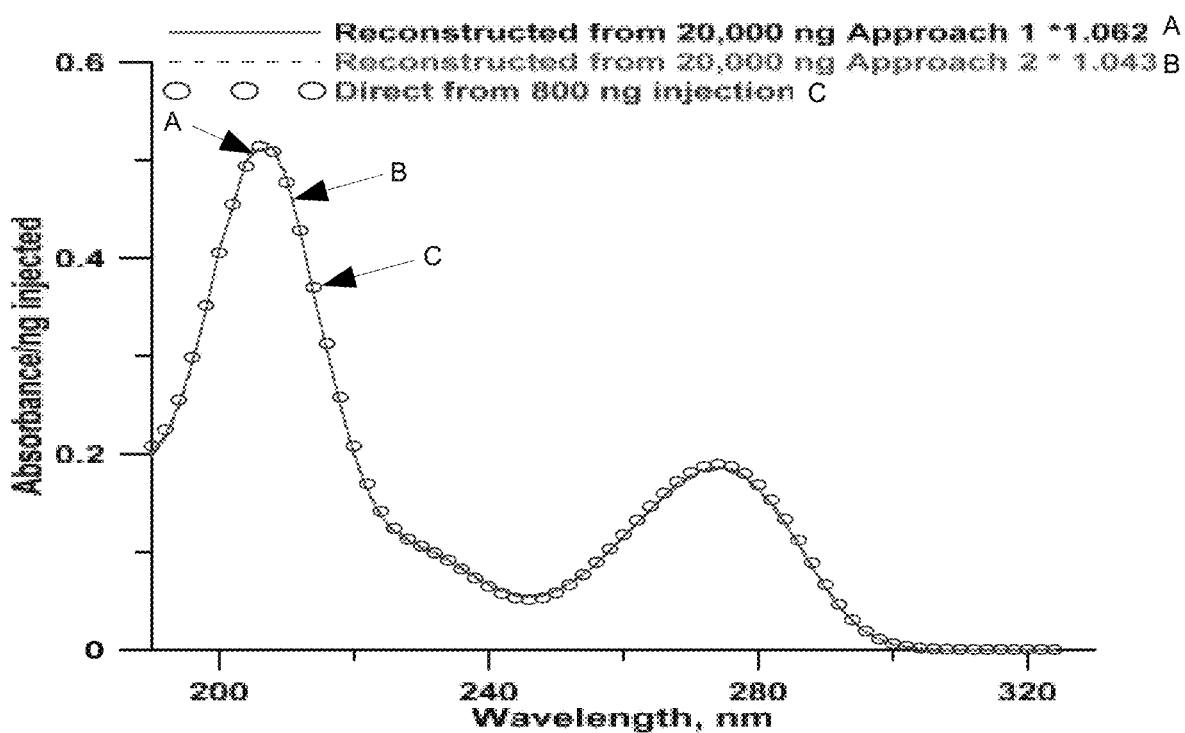
FIG. 35 illustrates a plot of the same data as FIG. 34 with multipliers applied in accordance with some embodiments.

As an example of spectrum reconstruction, we take the case of a chromatographic peak elicited by an injection of 20,000 ng caffeine. As the non-truncated reference, we used the response at 290 nm where the peak maximum absorbance is <1200 mAU, in the linear response domain for the detector. The results of spectrum reconstruction from the approaches described above are illustrated in FIG. 34 in accordance with some embodiments. The normalized spectrum for an 800 ng injection is also shown as a comparison therein. It will be observed that while the normalized spectra (absorbance/unit mass of solute injected) are not exactly the same, applying a multiplier to either of the reconstructed spectra (which can be because of minor concentration discrepancies or lack of identical focusing as different injection volumes were used for 800 and 20,000 ng) results in a near-perfect match with either approach. FIG. 35 illustrates the same data plot as FIG. 34 in accordance with some embodiments, except small multipliers have been applied to the reconstructed peaks, resulting in a near perfect match. The third approach to spectral reconstruction, however is not particularly successful, it can at best match the broad spectral envelope.

In utilization, the methods and devices are used to separate a sample with one or more chemical substances and determine the concentration of each of the chemical substances using the width-based quantitation algorithm implemented computing device and methods.

In operation, an amount of analyte is detected by a detector after passing through a chromatography column, the amount of analyte detected is converted to a signal curve (e.g., a peak shape), and a width-based quantitation algorithm is used to determine a concentration of the analyte of the signal curve.

Publications (1) Anal. Chem., 2017, 89 (7), pp 3893-3900, titled "Width Based Characterization of Chromatographic Peaks: Beyond Height and Area," (2) Anal. Chem., 2017, 89 (7), pp 3884-3892, titled "Width Based Quantitation of Chromatographic Peaks: Principles and Principal Characteristics," (3) *High Speed High Resolution Data Acquisition, Unrealized Blessings: Does Chromatography Still Live in an Analog World?*," UNIVERSITY OF TEXAS AT ARLINGTON by Akinde F. Kadjo et al., and (4) the Supporting Information/Documents of the above Publications (1)-(3), are hereby incorporated herein by reference in their entirety.

After reading the description presented herein, it will become apparent to a person skilled in the relevant arts how to implement embodiments disclosed herein using computer systems/architectures and communication networks other than those described herein. It will also be appreciated by those skilled in the relevant arts that various conventional and suitable materials and components may be used to implement the embodiments of the invention disclosed herein.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein. This disclosure may include descriptions of various benefits and advantages that may be provided by various embodiments. One, some, all, or different benefits or advantages may be provided by different embodiments.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, or otherwise altered. Similarly, this disclosure describes one or more embodiments wherein various operations are performed by certain systems, applications, module, components, etc. In alternative embodiments, however, those operations could be performed by different components. Also, items such as applications, module, components, etc. may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. The term "processor" or "microprocessor" may refer to one or more processors.

Further, the methods set forth herein may also be implemented as an article of manufacture embodiment, wherein an article of manufacture comprises a non-transitory machine-accessible medium containing instructions, the instructions comprising a software application or software service, wherein the instructions, when executed by the machine, cause the machine to perform the respective method. The machine may be, e.g., a processor, a processor-based system such as the systems described herein, or a processor-based device such as the user interface devices described herein.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

The invention claimed is:

1. A method of chromatographic quantitation of an analyte, comprising:
   a) flowing the analyte at least at a first concentration, a second concentration, and then a third concentration into a chromatographic column;
   b) detecting the analyte at the first concentration, the second concentration, and the third concentration coming out from the chromatographic column by using a chromatographic detector;
   c) obtaining a first, second, and third signal curves from the chromatographic detector, the first, second, and third signal curves being a representation of the analyte at the first, second, and third concentrations, respectively, detected by the chromatographic detector;
   d) measuring a width of a peak in each of the first, second, and third signal curves at a plurality of peak heights;
   e) calculating a plurality of calibration equations based on the first, second, third concentrations and the measured peak widths for each of the plurality of peak heights; and
   f) identifying one of the plurality of peak heights that provides the calibration equation having a lowest error.

2. The method of claim 1, wherein the width is determined by using a width-based quantitation algorithm comprising: $W_h = p(\ln \bar{h})^q$, wherein $W_h$ is the width at absolute height h of the peak, $\bar{h}$ is $h_{max}/h$, $h_{max}$ is the peak amplitude of the peak, and p and q are constants.

3. The method of claim 1, further comprising;
   g) flowing a sample into the chromatographic column, the sample including the analyte;
   h) detecting the analyte of the sample coming out from the chromatographic column by using the chromatographic detector;
   i) obtaining a signal curve of the sample from the chromatographic detector, detected by the chromatographic detector;
   j) measuring a width of a peak in the signal curve of the sample at the identified peak height; and
   k) determining a concentration of the analyte of the sample using the calculated calibration equation with the identified peak height, the calculated calibration equation having a form of: $\ln C = aW_h^n + b$, wherein $W_h$ is the width at absolute height h of the peak, wherein C is a concentration of the analyte, and further wherein n, a, and b are constants.

4. The method of claim 1, further comprising a suppressor coupled with the chromatographic column for receiving an output from the chromatographic column, wherein the suppressor is coupled with the chromatographic detector, such that an output from the suppressor is detected by the chromatographic detector.

5. A method of detecting an impurity in chromatography, comprising:
   a) flowing an analyte of a sample through a chromatographic column;
   b) detecting a concentration of the analyte coming out from the chromatographic column by using a chromatographic detector;

c) obtaining a first signal curve from the chromatographic detector, the first signal curve being a representation of the concentration of the analyte detected by the chromatographic detector;

d) measuring a first peak width $W_{h1}$ at a first absolute peak height $h_1$, a second peak width $W_{h2}$ at a second absolute peak height $h_2$, and a third peak width $W_{h3}$ at a third absolute peak height $h_3$ of a peak in the first signal curve, wherein the first absolute peak height $h_1$, the second absolute peak height $h_2$, and the third absolute peak height $h_3$ are different;

e) determining a peak shape index ratio of the sample of the peak in the first signal curve with a formula comprising $\ln(W_{h1}/W_{h2})/\ln(W_{h2}/W_{h3})$; and f) identifying a presence of the impurity in the sample where the determined peak shape index ratio of the peak in the first signal curve differs from a peak shape index ratio of a standard sample.

6. The method of claim 5 further comprising:

g) flowing the analyte of the standard sample through the chromatographic column;

h) detecting a concentration of the analyte of the standard sample coming out from the chromatographic column by using the chromatographic detector;

i) obtaining a second signal curve from the chromatographic detector, the second signal curve being a representation of the concentration of the analyte of the standard sample detected by the chromatographic detector;

j) measuring the first peak width $W_{h1}$ at the first absolute peak height $h_1$, the second peak width $W_{h2}$ at the second absolute peak height $h_2$, and the third peak width $W_{h3}$ at the third absolute peak height $h_3$ of a peak in the second signal curve, wherein the first absolute peak height $h_1$, the second absolute peak height $h_2$, and the third absolute peak height $h_3$ are different; and k) determining the peak shape index ratio of the standard sample of the peak in the second signal curve with the formula.

7. The method of claim 6 further comprising:

l) repeating the steps g) and k) on multiple injections of the standard sample;

m) calculating a confidence range of the peak shape index ratio at a confidence level above 90% for the standard sample; and n) identifying the presence of the impurity in the sample where the determined peak shape index ratio of the sample is outside of the calculated confidence range.

8. The method of claim 6, wherein the peak of the standard sample and the analyte peak of the sample under test have a same maximum peak height.

9. The method of claim 5, further comprising a suppressor coupled with the chromatographic column for receiving an output from the chromatographic column, wherein the suppressor is coupled with the chromatographic detector, such that an output from the suppressor is detected by the chromatographic detector.

10. A method of detecting an impurity in chromatography, comprising:

a) flowing an analyte of a sample through a chromatographic column;

b) detecting a concentration of the analyte coming out from the chromatographic column by using a chromatographic detector;

c) obtaining a first signal curve from the chromatographic detector, the first signal curve being a representation of the concentration of the analyte detected by the chromatographic detector;

d) measuring a first peak width $W_{h1}$ at a first absolute peak height $h_1$, a second peak width $W_{h2}$ at a second absolute peak height $h_2$, a third peak width $W_{h3}$ at a third absolute peak height $h_3$, and a fourth peak width $W_{h4}$ at a fourth absolute peak height $h_4$ of a peak in the first signal curve, wherein the first absolute peak height $h_1$, the second absolute peak height $h_2$, the third absolute peak height $h_3$, and the fourth absolute peak height $h_4$ are different;

e) determining a peak shape index ratio of the sample of the peak in the first signal curve with a formula comprising: $\ln(W_{h1}/W_{h2})/\ln(W_{h3}/W_{h4})$; and f) identifying a presence of the impurity in the sample where the determined peak shape index ratio of the peak in the first signal curve differs from a peak shape index ratio of a standard sample.

11. The method of claim 10 further comprising:

g) flowing the analyte of the standard sample through the chromatographic column;

h) detecting a concentration of the analyte of the standard sample coming out from the chromatographic column by using the chromatographic detector;

i) obtaining a second signal curve from the chromatographic detector, the second signal curve being a representation of the concentration of the analyte of the standard sample detected by the chromatographic detector;

j) measuring the first peak width $W_{h1}$ at the first absolute peak height $h_1$, the second peak width $W_{h2}$ at the second absolute peak height $h_2$, the third peak width $W_{h3}$ at the third absolute peak height $h_3$, and the fourth peak width $W_{h4}$ at the fourth absolute peak height $h_4$ of a peak in the second signal curve, wherein the first absolute peak height $h_1$, the second absolute peak height $h_2$, the third absolute peak height $h_3$, and the fourth absolute peak height $h_4$ are different; and k) determining a peak shape index ratio of the peak in the second signal curve with the formula.

12. The method of claim 11 further comprising:

l) repeating the steps g) and k) on multiple injections of the standard sample;

m) calculating a confidence range of the peak shape index ratio at a confidence level above 90% for the standard sample; and n) identifying the presence of the impurity in the sample where the determined peak shape index ratio of the sample is outside of the calculated confidence range.

13. The method of claim 11, wherein the peak of the standard sample and the analyte peak of the sample under test have a same maximum peak height.

14. The method of claim 10, further comprising a suppressor coupled with the chromatographic column for receiving an output from the chromatographic column, wherein the suppressor is coupled with the chromatographic detector, such that an output from the suppressor is detected by the chromatographic detector.

15. A method of chromatographic quantitation of an analyte, comprising:

a) flowing a first concentration of the analyte into a chromatographic column;

b) detecting the analyte coming out from the chromatographic column by using a chromatographic detector;

c) obtaining a first signal curve from the chromatographic detector, the first signal curve being a representation of the first concentration of the analyte detected by the chromatographic detector;

d) determining a first width of a first peak in the first signal curve at a first absolute height of the first peak using a computing device; and e) quantifying the first concentration of the analyte based on the first determined width of the first peak.

16. The method of claim 15, further comprising setting the first absolute height to a value between 8 to 12 times a baseline noise level.

17. The method of claim 15, wherein the first absolute height is approximately 60% of a maximum height of the first peak of the analyte.

18. The method of claim 15, wherein the method further comprising:

f) flowing the analyte at a second concentration into the chromatographic column;

g) detecting the analyte coming out from the chromatographic column by using the chromatographic detector;

h) obtaining a second signal curve from the chromatographic detector, in which the second signal curve also being a representation of the second concentration of the analyte detected by the chromatographic detector;

h) determining a first maximum height of the first peak of the analyte in the first signal curve and a second maximum height of the second peak of the analyte in the second signal curve using the computing device; and i) setting the first, the second, or both absolute heights of the analyte to a value greater an 8 times a baseline noise level and less than a smallest of the first or second maximum height; and j) determining a width at the first or the second absolute height.

19. The method of claim 15, further comprising determining best fit values of p and q in a formula $W_h = p(\ln \bar{h})^q$, wherein $W_h$ is the first width at the first absolute height h of the first peak, $\bar{h}$ is $h_{max}/h$, $h_{max}$ is the peak amplitude, and p and q are constants, which are computed from data of the first peak of the first concentration.

20. The method of claim 15, wherein the first absolute height for the first determined width is the smaller of 55%-65% of the height of a peak maximum for the first peak and 55%-65% of the height of a peak maximum for the second peak.

21. The method of claim 15, wherein the first signal curve represents a non-Gaussian peak.

22. The method of claim 21, wherein the non-Gaussian peak is modeled by two separate Generalized Gaussian distribution (GGD) functions.

23. The method of claim 22, wherein the two separate Generalized Gaussian distribution (GGD) functions have a concentration in a linear relationship with the peak amplitude $h_{max}$ represented by a formula: $\ln C = aW_h^n + b$, wherein C is a concentration of the analyte detected, and further wherein n, a, and b are constants.

24. The method of claim 15, wherein the determining the first width of the first peak comprises using independent exponential functions representing leading and trailing edges in the signal curve to model a peak.

25. The method of claim 15, wherein the determining multiple widths of the first peak in the first signal curve at multiple heights of the first peak.

26. The method of claim 15, wherein the determining the first width of the peak is performed below a peak height accommodated by the first signal curve of the lowest analyte concentration of interest.

27. The method of claim 26, wherein the determining the first width of the peak is performed at a peak height 60%-90% of a first maximum height of the peak of a lowest analyte concentration.

28. The method of claim 15, wherein the first peak is clipped.

29. The method of claim 15, further comprising a suppressor coupled with the chromatographic column for receiving an output from the chromatographic column, wherein the suppressor is coupled with the chromatographic detector, such that an output from the suppressor is detected by the chromatographic detector.

30. A method of chromatographic quantitation of an analyte, comprising:

a) flowing the analyte into a chromatographic column;

b) detecting the analyte coming out from the chromatographic column by using a chromatographic detector;

c) obtaining a signal curve from the chromatographic detector, the signal curve with a peak being a representation of the analyte detected by the chromatographic detector;

d) fitting a height of the peak of the signal curve to an equation, the equation comprising:

$$h = \begin{cases} h_{max,1} * e^{-\frac{|t|^m}{a}} & t \leq 0 \\ h_{max,2} * e^{-\frac{t^n}{b}}, & t \geq 0 \end{cases}.$$

wherein a top equation, describing a left half of the peak applies only at $t \leq 0$ while a bottom equation, describing a right half of the peak applies only at $t \geq 0$; h is the height of the peak; a maximum height of the peak appears at the intersection point of the above two equations; $h_{max,1}$ is a maximum point in the top equation, while $h_{max,2}$ is the maximum point of the bottom equation, m, n, a, and b are constants;

e) determining a width of the peak in the signal curve at a first height h of the peak using a width equation, wherein the width equation comprising:

$$W_h = (a \ln(\bar{h_1}))^{1/m} + (b \ln \bar{h_2})^{1/n}$$

where $W_h$ is the width of the peak at the height h; $\bar{h_1} = h_{max,1}/h$; $\bar{h_2} = h_{max,2}/h$; and e) quantifying a concentration of the analyte based on the determined width of the peak.

31. The method of claim 30, wherein the constants m, n, a and b are used to define a shape criterion for the peak.

32. The method of claim 31, wherein the shape criterion is used for the identification of a peak.

33. The method of claim 30, further comprising determining a purity of the peak by taking 5% to 95% of the peak maximum to fit the pair of equations in the claim 30), the step d).

34. The method of claim 30, further comprising determining an amount of impurity by deducting a maximum area that is fitted by using the pair of equations in the claim 30, the step d) from an area of the peak of the analyte detected.

35. The method of claim 30, wherein the two separate Gaussian distribution (GGD) functions have a relationship with the peak width and a concentration of the analyte represented by a formula: ln $C=aW_h{}^n+b$, wherein C is a concentration of the analyte detected, and further wherein n, a and b are constants.

36. The method of claim 30, wherein the peak is quantitated on the basis of either of the two separate Gaussian distribution (GGD) functions, such that the concentration of the analyte is related by either a left half-width $W_{h,l}$ or a right half-width $W_{h,r}$ of the peak at any absolute height h; $W_{h,l}$ and $W_{h,r}$ are defined as the respective shortest distances from a perpendicular drawn from the peak apex to the baseline and the left or the right half of the signal curve at the absolute height h, represented by a formula: ln $C=a'W_{h,l}{}^{n'}+b'$ or ln $C=a''W_{h,r}{}^{n''}+b''$ wherein C is a concentration of the analyte detected, and further wherein n', n", a', a", b' and b" are constants.

37. The method of claim 30, further comprising a suppressor coupled with the chromatographic column for receiving an output from the chromatographic column, wherein the suppressor is coupled with the chromatographic detector, such that an output from the suppressor is detected by the chromatographic detector.

38. A system for chromatographic peak quantitation, comprising:
  a) a chromatographic column;
  b) a chromatographic detector configured to detect an amount of analyte from the chromatographic column;
  c) a signal converter converting the amount of an analyte detected to a signal curve; and
  d) an algorithm implemented computing device configured to determine a width of a peak in the signal curve in at least one selected height of the peak and quantify the amount of the analyte.

39. The system of claim 38, wherein the algorithm is $W_h=p(\ln \bar{h})^q$, wherein $W_h$ is the width at the height (h) of the peak, ($\bar{h}$) is $h_{max}/h$, $h_{max}$ is the peak amplitude, wherein p and q are constants.

40. The system of claim 38, wherein a goodness of fit to the algorithm $W_h=p(\ln \bar{h})^q$ is used as an indication of the purity of the peak.

41. The system of claim 38, wherein a maximum area that can be fit by $W_h=p(\ln \bar{h})^q$ and which is completely contained in the peak is the portion of the analyte.

42. The system of claim 38, wherein determining the width of a peak comprises determining the width of the peak in the signal curve at multiple heights of the peak.

43. The system of claim 38, further comprising a suppressor coupled with the chromatographic column for receiving an output from the chromatographic column, wherein the suppressor is coupled with the chromatographic detector, such that an output from the suppressor is detected by the chromatographic detector.

* * * * *